US012274675B2

(12) United States Patent
Hayman et al.

(10) Patent No.: US 12,274,675 B2
(45) Date of Patent: *Apr. 15, 2025

(54) DELIVERY DEVICE FOR DRUG PELLETS

(71) Applicant: OnDosis AB, Gothenburg (SE)

(72) Inventors: John Hayman, Gothenburg (SE); Anders Jimgren, Kungsbacka (SE); Magnus Karemyr, Vastra Frolunda (SE); Simon Pettersson, Gothenburg (SE)

(73) Assignee: ONDOSIS AB, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,772

(22) Filed: Apr. 10, 2023

(65) Prior Publication Data

US 2023/0346646 A1 Nov. 2, 2023

Related U.S. Application Data

(63) Continuation of application No. 17/290,626, filed as application No. PCT/EP2019/079999 on Nov. 1, 2019, now Pat. No. 11,622,914.

(30) Foreign Application Priority Data

Nov. 2, 2018 (GB) ..................................... 1817978
Jun. 19, 2019 (GB) ..................................... 1908808

(51) Int. Cl.
*A61J 7/00* (2006.01)
*B65D 83/04* (2006.01)

(52) U.S. Cl.
CPC ........ *A61J 7/0076* (2013.01); *B65D 83/0409* (2013.01)

(58) Field of Classification Search
CPC ...... A61J 7/049; A61J 7/0472; B65D 83/0454
See application file for complete search history.

(56) References Cited

U.S. PATENT DOCUMENTS 11,622,914 B2 * 4/2023 Hayman ............... A61J 7/0076 221/195
2007/0145065 A1 6/2007 Anderson
(Continued)

FOREIGN PATENT DOCUMENTS

CN 202575017 U 12/2012
CN 108655291 A 10/2018
(Continued)

OTHER PUBLICATIONS

JP Office Action for JP2021-532648 dated Aug. 8, 2023.
EP Office Action for EP19798057.6 dated Aug. 27, 2024.

*Primary Examiner* — Gene O Crawford
*Assistant Examiner* — Ayodeji T Ojofeitimi
(74) *Attorney, Agent, or Firm* — Getz Balich LLC

(57) ABSTRACT

There is provided an apparatus for dispensing one or more drugs in pellet form. The apparatus includes a cartridge assembly configured to store drugs in pellet form, and dispense the drugs upon actuation of one or more dispensing mechanisms located within the cartridge assembly. The apparatus further includes a control unit configured to actuate the one or more dispensing mechanisms located within the cartridge assembly, as well as a cover including a collection region configured to receive and store drugs dispensed from the one or more dispensing mechanisms. The cover is movable between a first position in which the collection region of the cover forms an enclosed cavity, and a second position in which the collection region is exposed such that a user can access drugs contained therein.

26 Claims, 33 Drawing Sheets

(56) References Cited

U.S. PATENT DOCUMENTS

| | | | |
|---|---|---|---|
| 2011/0060457 | A1 | 3/2011 | De Vrught |
| 2011/0106064 | A1 | 5/2011 | Zou |
| 2011/0295416 | A1 | 12/2011 | Aquilonius |
| 2012/0004772 | A1 | 1/2012 | Rahilly |
| 2013/0256330 | A1 | 10/2013 | Wang |
| 2015/0359711 | A1 | 12/2015 | Ducatt |
| 2016/0107820 | A1 | 4/2016 | Macvittie |
| 2017/0210545 | A1 | 7/2017 | Graziano |
| 2020/0397662 | A1 | 12/2020 | Axelsson |

FOREIGN PATENT DOCUMENTS

| | | | |
|---|---|---|---|
| CN | 106742795 | B | 8/2019 |
| DE | 20109484 | U1 | 2/2002 |
| FR | 2655317 | B1 | 3/1992 |
| JP | 2016504141 | A | 2/2016 |
| WO | 2008085764 | A1 | 7/2008 |
| WO | 2012013723 | A1 | 2/2012 |
| WO | 2019115832 | A1 | 6/2019 |

* cited by examiner

DELIVERY DEVICE FOR DRUG PELLETS

This application is a continuation of U.S. patent application Ser. No. 17/290,626 filed Apr. 30, 2021, which is a national stage application of PCT Application No. PCT/EP2019/079999 filed on Nov. 1, 2019, which claims priority to GB Patent Appln. No. 1817978.8 filed Nov. 2, 2018 and GB Patent Appln. No. 1908808.7 filed Jun. 19, 2019, which are hereby incorporated by reference in their entireties.

BACKGROUND OF THE INVENTION

1. Technical Field

The present disclosure relates generally to delivery devices for drug pellets and various aspects of such devices relating, for example, to the dispensing of pellets from the device, the operation and mechanics of such devices and also certain aspects of the control systems for such devices.

2. Background Information

Oral dosage forms ("ODF") medications can be manufactured in, e.g., a tablet or pellet form. A tablet or pellet could contain different substances where the main ingredient (s) is/are the active pharmaceutical ingredient ("API"). Drug pellets could be administered to patients as prefilled capsules or compressed in a tablet with the help of filling materials. Dispensing mechanisms for various forms of ODF drugs are known, and can range from blister-pack type devices, wherein individual tablets can be retained within pockets and retained therein by the use of foil, to dispensing bottles. Various more complicated mechanisms are also known, in particular for other types of drug formulation, for example those in the form of pellets, which may typically be less than 10% of a particular dosage per unit. The advantage of dispensing drugs in pellet form can be that the dose can be varied using the same dispensing device. Another advantage is that the pellets could be easy to swallow by patients having difficulty swallowing, who are currently crushing the tablets in order to swallow. Crushing or dividing of tablets is also used today by patients to get, e.g., half a dose from a prescribed drug, a process which is not recommended and can be avoided if a device can dispense different flexible amounts of pellets. Variable dosing of pellets allows for a more exact tuning of the dose than what may be achieved using larger dosage forms such as tablets or capsules. Furthermore, for modified release formulations, pellets are often more robust against food interactions than larger dosage forms such as tablets.

It is desired to improve the mechanism by which drugs in pellet form are dispensed, for example in case of pediatric medicine; antibiotics for easier swallowing, in case of geriatric medicine; chronic medication for easier swallowing, in the case of certain controlled substances such as stimulants for ADHD or pain medications such as opioids; for improved control over the dispensed dose or limit the risk for overdosing, or for medications that require titration at initiation or flexible adjustments as a result of disease variability or as a result of achieved outcomes.

It is also desired to improve the control a user has when handling a dose of one or more drugs in pellet form, especially as they are received from a dispensing device, for example to transport a complete dose to a user (e.g., to a suitable receptacle or foodstuff) in a secure manner and suitable for swallowing.

It is also desired to improve the user control of a dispensing device, whilst ensuring that the device can prevent modification of the dose (e.g., overdosing) by the user, or undesired access to the drugs contained within the device. It is desired, for example, to increase the tamper resistance of a pellet drug dispenser, e.g., by ensuring the user's access is limited to only the prescribed dose.

SUMMARY OF THE INVENTION

Herewith will be described various aspects and embodiments of an apparatus for dispensing one or more drugs in pellet form. The features described in this summary may be combined with any of the aspects and embodiments of the invention described herein insofar as they are suitable therefor. As will be appreciated, all of the apparatus described herein operate on similar principles.

In accordance with an aspect of the invention, there is provide an apparatus for dispensing one or more drugs in pellet form, comprising a cartridge assembly, a control unit and a cover. The cartridge assembly is configured to store drugs in pellet form, and dispense the drugs upon actuation of one or more dispensing mechanisms located within the cartridge assembly. The control unit is configured to actuate the one or more dispensing mechanisms located within the cartridge assembly. The cover comprises a collection region configured to receive and store drugs dispensed from the one or more dispensing mechanisms, and is movable between a first position in which the collection region of the cover forms an enclosed cavity, and a second position in which the collection region is exposed such that a user can access drugs contained therein.

The above features, in particular the use of a cover movable between first and second positions to enclose and then expose a collection region, provide a drug delivery apparatus that is able to more securely and safely dispense drugs in pellet form. As described herein, such drugs, which may be referred to as an oral dosage form, may be in the form of pellets, which optionally have a diameter between about 150 μm and about 1200 μm (such as about 300 μm and about 900 μm), further optionally about 500 μm and about 700 m, are typically quite difficult to handle, and the above described apparatus leads to various advantages for handling and dispensing this type of drug as described in further detail herein.

The drugs may be referred to as an oral dosage form and may be a unit dose and/or a solid oral dosage form. It is envisaged that the oral dosage form could in some cases comprise a hard, solid (or semi-solid, e.g., gelatin or cellulose) outer shell and a softer core, such as a gel or even a liquid core.

The apparatus may form a handheld device for dispensing one or more drugs in pellet form. Such a device may be an advancement on the types of apparatus used for dispensing pellet-type drugs, especially when combined with the features that allow the apparatus to safely and securely dispense such drugs.

The apparatus and/or device may be a handheld and/or portable apparatus and/or device. In other words, the device may be held and transported using one hand and/or operable using one hand.

For example, the assembled apparatus and/or device may have a length (corresponding to its longest dimension) of no more than about 250 mm (such as less than about 200 mm, about 150 mm or about 100 mm), and a width or height (i.e., transverse to its length) of no more than about 50 mm, and optionally no more than about 40 mm (and in some embodiments less than 30 mm or even less than 20 mm).

In order to optimize its hand-held nature, the assembled apparatus and/or device may have a length between about 150 mm and about 220 mm (for example about 160 mm and about 180 mm, and optionally about 165 mm), a width (transverse to its length) between about 35 mm and about 45 mm (optionally about 40 mm), and a height (transverse to its width) of between about 22 mm and about 32 mm (optionally about 28 mm).

The assembled apparatus and/or device may weigh no more than about 500 g, about 400 g, about 300 g, about 200 g, or even about 100 g. This can ensure that the assembled apparatus and/or device is light enough to carry in one hand.

The cartridge (or cartridge assembly) may have a length (corresponding to its longest dimension) of between about 90 mm and about 120 mm (optionally about 105 mm), a width (transverse to its length) between about 33 mm and about 43 mm (optionally about 40 mm), and a height (transverse to its width) of between about 15 mm and about 32 mm, for example between about 23 mm and about 32 mm (optionally about 28 mm).

The enclosed cavity may be formed by the cover and portions of the cartridge assembly and the control unit.

The apparatus may be configured such that, when the cover occupies its first position, drugs received into the collection region from the one or more dispensing mechanisms are held securely within the collection region. In other words, when the cover occupies its first position, drugs received into the collection region cannot escape therefrom.

The second position of the cover may be a position in which the cover is detached (e.g., completely) from the remainder of the apparatus, for example detached (e.g., completely) from the cartridge, cartridge assembly and/or control unit. This permits increased versatility, for example a user can take a dose directly into their mouth with reduced chance of spilling the dose. In addition, tipping or pouring the pellets from a detached cover is easier than tipping or pouring pellets from a cover that is still attached to the apparatus. In these and other embodiments the cover may be referred to as a cap, for example a detachable cap.

The cap or cover could be connected to the remainder of the apparatus, e.g., the cartridge, cartridge assembly and/or control unit by a snap fit, which provides a convenient method of detaching and re-attaching the cap or cover. Alternatively the cap or cover could be connected to the remainder of the apparatus, e.g., the cartridge, cartridge assembly and/or control unit by an interference fit, magnetic latch, clip fastener or screw connection. The cap or cover may connect to the cartridge, cartridge assembly or control unit such that the outer surface of the cap or cover is flush with the remainder of the outer surface of the apparatus.

The cap or cover may comprise a tactile area or surface. The tactile area or surface may be positioned in a region of the cap or cover that is most likely to be held by a user, for example adjacent to a rim of the cap or cover that is configured to contact the remainder of the apparatus. Alternatively the tactile area or surface may comprise a portion of the cap or cover that corresponds to an upper or lower surface of the apparatus. The tactile area or surface may be provided as one or more of cavities, dimples, protrusions and ridges.

The cap or cover may have a flat base portion extending to an upper rim via a curved side surface (e.g., the cap or cover may be a cup and/or be cup-shaped). The curved side surface may be configured such that when placed on the curved side surface the cap or cover automatically moves to a position in which it is resting on the base portion, for example when pellets are contained in the collection region. The cap or cover may be weighted (e.g., a the base portion) to ensure the cap or cover is configured in this manner (although weighting is not essential).

The apparatus may comprise a funnel, which may be provided in place of or in addition to the cap or cover. The funnel may comprise an inlet end configured to be placed over the outlet end and/or dispensing mechanism(s) of the cartridge assembly, so as to receive pellets that are dispensed therefrom. The funnel may comprise an outlet end configured to receive pellets dispensed from the dispensing mechanism(s) of the cartridge assembly and direct them to the collection region.

If the funnel is provided in place of the cover, then the collection region referred to above would be formed by an interior volume of the funnel, which may comprise an outlet end configured to dispense pellets from the funnel into a receptacle (e.g., a user's hand).

In embodiments in which the funnel is provided in addition to the cap or cover, the outlet end of the funnel may be positioned at least partially within the collection region of the cap or cover. In this manner, the funnel may be configured to direct pellets from the dispensing mechanism(s) and into the collection region.

The outlet end of the funnel may be offset or otherwise positioned so that pellets are directed into a specific portion of the collection region. For example, the outlet end of the funnel may be positioned adjacent and/or overlying the specific portion of the collection region. The specific portion may be a corner of the cap, a central region of the cap, or a smaller cavity configured to receive a dose of the pellets. The funnel may be configured so that pellets are directed into a bottom corner of the cap, which corner is positioned on the same side as the lower surface of the apparatus. For example, the outlet end of the funnel may be positioned adjacent and/or overlying a corner corresponding to a lower surface of the apparatus.

The funnel may comprise one or more screens that extend across the outlet end of the funnel, wherein the one or more screens may be configured to catch pellets dispensed from the dispensing mechanism(s) of the cartridge assembly and temporarily arrest them before they are dispensed into the collection region. The screen may be provided as a grill, which comprises a plurality of bars configured to catch pellets dispensed from the dispensing mechanism(s) of the cartridge assembly, then temporarily arrest (e.g., slow down) the pellets before they are further dispensed from the funnel into the collection region.

The one or more screens may be configured such that pellets are more inclined to fall through the screen in a first, dispensing direction, and less inclined to fall through the screen in a second, non-dispensing direction. For example, if the screen is a grill, the bars of the grill may be teardrop shaped, e.g., comprising a curved edge opposed to a pointed edge, wherein the pointed edge faces the dispensing mechanism(s) of the cartridge assembly.

The cap or cover may comprise an insert or solid portion configured to direct pellets to a or the specific portion of the collection region. The insert or solid portion may comprise a tapered surface that is configured such that pellets flow along the surface towards the specific portion of the collection region in use, as they are dispensed from the dispensing mechanism(s).

The one or more dispensing mechanisms may be configured to store drugs in pellet form and, upon actuation thereof, move one or more drugs in pellet form from one or more storage cavities within the cartridge assembly to the collection region of the cover.

The one or more dispensing mechanisms may each comprise one or more rotatable elements, and rotation of the one or more rotatable elements causes drugs to move from a respective one of the storage cavities within the cartridge assembly to the collection region of the cover.

The one or more rotatable elements may comprise a screw pump, which may be configured as a positive-displacement ("PD") pump that uses one or several screws to move the drugs in pellet form along the screw(s) axis from the storage cavities to the collection region of the cover.

The cover may be slidable relative to the cartridge assembly and the control unit, and between its first position and its second position. This provides a relatively easy way of moving the cover between its first and second positions. In other embodiments, as described above, the cover may be detachable.

In various embodiments the collection region of the cover may take the form of an open, generally U-shaped trough, and/or a cup, and may comprise one or more pouring lips in an upper rim thereof configured to pour the drugs in pellet form from the collection region when the cover occupies its second position.

The one or more pouring lips may be formed at one or more corners of the upper rim, so as to provide a highly focused manner in which to dispense pellets from the collection region.

Additionally or alternatively, the one or more pouring lips may be formed between corners of the upper rim, wherein a wall portion of the trough or cup between the corners is at least partly convex (e.g., bulges in a direction away from the collection region), so as to provide the pouring lip. This would provide a quick indication to a user of the location of the pouring lip.

The collection region of the cover may take the form of a generally U-shaped trough, as described above, and the cover may further comprise a plate that partially encloses the collection region when the cover is moved to its second position, and wherein the plate comprises one or more apertures configured to dispense drugs in pellet form from the collection region when the cover occupies its second position.

In accordance with an aspect of the present invention, there is provided a method of using an apparatus as described above, comprising: actuating at least one of the dispensing mechanisms to dispense a dose of one or more drugs into the collection region, wherein the one or more drugs are received and stored in the collection region when the cover occupies its first position; and then moving the cover from its first position to its second position so as to expose the collection region and the dose of the one or more drugs contained therein.

In any of the aspects and embodiments described herein, the one or more dispensing mechanisms may each comprise one or more rotatable elements, and rotation of the one or more rotatable elements may cause pellets/drugs to move from a respective one of the storage cavities within the cartridge assembly to the collection region of the cover, wherein the cartridge assembly may comprise one or more locking members movable between first and second positions, wherein the locking members are each configured to prevent actuation of a respective dispensing mechanism in the first position and permit actuation of the dispensing mechanisms in the second position.

A single locking member may be provided that is movable between first and second positions, wherein the single locking member is configured to prevent actuation of multiple dispensing mechanisms in the first position and permit actuation of the dispensing mechanisms in the second position. This may simplify the assembly and/or reduce the number of parts required.

The one or more locking members may be slidable between their first and second positions.

These features are considered to be advantageous in their own right. Therefore, in accordance with an aspect of the present invention that may be claimed independently, there is provided an apparatus for dispensing one or more drugs in pellet form, comprising: a cartridge assembly configured to store drugs in pellet form, and dispense the drugs upon actuation of one or more dispensing mechanisms located within the cartridge assembly; a control unit comprising one or more actuators configured to actuate the one or more dispensing mechanisms located within the cartridge assembly, wherein the one or more dispensing mechanisms each comprise one or more rotatable elements, and rotation of the one or more rotatable elements causes drugs to move from a respective one of the storage cavities within the cartridge assembly to the collection region of the cover, wherein the cartridge assembly comprises one or more locking members movable between first and second positions, wherein the locking members are each configured to prevent actuation of a respective dispensing mechanism in the first position and permit actuation of the dispensing mechanisms in the second position.

Use of one or more locking members as described above means that actuation of the dispensing mechanisms in the cartridge can be prevented when the locking members occupy the first position, and can only be permitted once the locking members are moved to their second position. This has been found to improve the tamper-resistant properties of apparatus for dispensing drugs in pellet form, for example drugs that optionally have a diameter between about 150 μm and about 1200 μm (such as about 300 μm and about 900 μm), further optionally about 500 μm and about 700 μm The following optional features may be combined with any of the aspects or embodiments of the invention including locking members.

The one or more locking members may be configured to prevent rotation of a respective one of the rotatable elements when the locking members occupy their first, locking position. This provides a convenient and efficient way of preventing actuation of the dispensing mechanisms.

The cartridge assembly may be configured to dock and undock with the control unit, and the apparatus may be configured such that each of the locking members move from their first, locking position to their second, unlocked position upon the cartridge assembly docking with the control unit.

The locking members may each comprise one or more pins configured to contact one or more static portions of the control unit, wherein the contact between the pins and the static portion(s) causes the locking members to move from their first, locking position to their second, unlocked position upon the cartridge assembly docking with the control unit.

The rotatable elements may comprise one or more radially extending surfaces and the locking members may comprise one or more teeth configured to engage with the radially extending surfaces when the locking members occupy their first, locking position, and disengage with the radially extending surfaces when the locking members occupy their second, unlocked position.

The locking members may be restricted against rotational movement so as to prevent rotation of the rotatable elements when the locking members occupy their first, locking position and the teeth are engaged with the radially extending surfaces, and permit rotation of the rotatable elements when the locking members occupy their second, unlocked position and the teeth are disengaged with the radially extending surfaces.

The locking members may be biased towards their first, locking position by one or more respective resilient members, such that the teeth are biased into engagement with the radially extending surfaces by the resilient members.

The one or more actuators may each comprise an electric motor configured to rotate a respective one of said rotatable elements.

The cartridge assembly may comprise one or more rotatable connection elements, each connected to a respective one of the rotatable elements and configured to cooperate with a rotatable connection element on the control unit, such that rotation of the connection element on the control unit causes rotation of the connection element on the cartridge assembly to rotate the rotatable elements of the dispensing mechanisms on the cartridge assembly.

One of the connection elements on the cartridge assembly and the control unit may comprise a male connector and the other of the connection elements on the cartridge assembly and the control unit may comprise a mating female connector.

The connection element(s) on the control unit may comprise a male connector and the connection element(s) on the cartridge assembly may comprises a mating female connector.

The connectors may comprise star, cross or square connectors.

Alternatively to embodiments involving the male and female connection elements, a splined connection may be provided between the cartridge assembly and the control unit, in that cooperating splines are provided on the control unit and cartridge assembly that cooperate with each other upon engagement of the cartridge assembly and the control unit. In these embodiments, engagement of the splines means that rotation of the splines associated with the control unit causes rotation of the splines on the cartridge assembly, so as to rotate the rotatable elements of the dispensing mechanisms on the cartridge assembly.

In a refinement of these embodiments (including spline connections), the radially extending surfaces referred to above could be formed by radially extending surfaces of the splines associated with the cartridge assembly. This can reduce the number of parts required to provide the engagement mechanisms and the locking mechanisms, since the splines associated with the cartridge assembly contribute to the operation of both mechanisms.

In accordance with an aspect of the present invention, there is provided a method of using an apparatus as described above.

The method may comprise storing pellets providing an oral dosage form within the cartridge assembly (e.g., the cartridges thereof), wherein the pellets may include a medication or compound for treatment of one or more of Attention Deficit Hyperactivity Disorder ("ADHD"—wherein the medication or compound could include amphetamines and/or methylphenidate), general pain (wherein the medication or compound could include one or more of fentanyl, methadone, meperidine, tramadol, morphine, codeine, thebaine, oxymorphone, hydrocodone, oxycodone, hydromorphone, naltrexone, buprenorphine and methadone), immunosuppression post organ transplant (wherein the medication or compound could include one or more of tacrolimus, sirolimus, everolimus, corticosteroids, cyclosporine, mycophenolate and azathioprine), diabetes (wherein the medication or compound could include one or more of sitagliptin, vildagliptin, saxagliptin, linagliptin, metformin, canagliflozin, Dapagliflozin, empagliflozin and semaglutide), heart failure (wherein the medication or compound could include one or more of carvedilol, metoprolol, bisoprolol and diurethics), Parkinson's disease ("PD"—wherein the medication or compound could include levodopa and/or carbidopa), epilepsy (wherein the medication or compound could include one or more of sodium valproate. carbamazepine, lamotrigine, levetiracetam, oxcarbazepine, ethosuximide and topiramate), depression (wherein the medication or compound could include one or more of Citalopram, bupropion, paroxetine, milnacipran, fluoxetine, duloxetine, fluvoxamine and reboxetine), schizophrenia (wherein the medication or compound could include one or more of aripiprazole, asenapine, brexpiprazole, cariprazine, clozapine, iloperidone, lurasidone and olanzapine), cancer, animal health.

The method may include using the apparatus in the treatment of one or more of Attention Deficit Hyperactivity Disorder ("ADHD"), general pain, immunosuppression post organ transplant, diabetes, heart failure, Parkinson's disease ("PD"), epilepsy, depression, schizophrenia, cancer, and animal health. The oral dosage form within the cartridge assembly (e.g., the cartridges thereof), when used in a particular treatment, may include one or more of the medications or compounds referred to above in respect of that particular treatment.

The method may comprise moving the one or more locking members from their first position to their second position to permit actuation of the one or more dispensing mechanisms located within the cartridge assembly.

In any of the aspects or embodiments described above, the cartridge assembly may be configured to dock with the control unit to connect the one or more dispensing mechanisms with the one or more actuators located within the control unit to allow operation of the one or more dispensing mechanisms and dispense drugs from the apparatus, and undock with the control unit to disconnect the one or more dispensing mechanisms with the one or more actuators located within the control unit to prevent dispensing of drugs from the apparatus.

This feature is considered advantageous in its own right. Therefore, in accordance with an aspect of the present invention that may be claimed independently, there is provided an apparatus for dispensing one or more drugs in pellet form, comprising: a cartridge assembly configured to store drugs in pellet form, and dispense the drugs upon actuation of one or more dispensing mechanisms located within the cartridge assembly; a control unit comprising one or more actuators configured to actuate the one or more dispensing mechanisms located within the cartridge assembly, wherein the cartridge assembly is configured to dock with the control unit to connect the one or more dispensing mechanisms with the one or more actuators located within the control unit to allow operation of the one or more dispensing mechanisms and dispense drugs from the apparatus, and undock with the control unit to disconnect the one or more dispensing mechanisms with the one or more actuators located within the control unit to prevent dispensing of drugs from the apparatus.

Further technical effects will become apparent from the description provided below.

Definitions

The definitions referred to below relate to features of the invention that are described and claimed herein, and may be incorporated into the specification (e.g., claims) where appropriate.

Pellet—A single granule or microparticle of an oral dosage form (e.g., a medicament, drug, medication, etc.) optionally having a diameter between about 150 μm and about 1200 or 1500 μm (such as about 300 μm and about 900 μm), optionally about 500 μm and about 700 m. In various embodiments the pellets may have a dimension (e.g., a largest dimension, width or diameter) within one or more of the following ranges: 150-300 μm; 150-400 μm; 200-400 μm; 200-500 μm; 300-500 μm; 400-600 μm; 300-700 μm 500-700 μm; 200-800 μm 600-800 μm; 700-900 μm; 700-1200 μm; 800-1000 μm; 800-1100 μm; 900-1100 μm; 900-1200 μm; and 1000-1200 μm. By "diameter" it is meant that the pellets are assumed to be roughly spherical, although they could be irregular shaped. The diameter could correspond to a largest width of the pellets, if they are not assumed to be spherical. Pellets may or may not have a surface coating. A general term for pellet type drugs may be "micro-particles".

Dose— A single measurement of pellets, for example totaling between about 0.05 ml to about 0.8 ml (such as about 0.1 ml to about 0.6 ml) by volume, for example about 0.3 ml by volume.

Dispensing Mechanism—A system, e.g., an electromechanical system that converts a user's action into the dispensing of a dose.

Cartridge—A user replaceable system used to store and dispense pellets.

Dispensing Aperture—The output end of the cartridge that allows the pellets to be dispensed for consumption.

Cover—A container that covers the dispensing aperture, for collection and presentation of a dose, and protection of the stored pellets and components of the cartridge from humidity. In some embodiments the cover may take the form of a cap that is completely removable from the remainder of the dispensing mechanism. Alternatively the cover may be a sliding cover that remains attached to the dispensing mechanism during normal use.

BRIEF DESCRIPTION OF THE DRAWINGS

Various embodiments will now be described, by way of example only, and with reference to the accompanying drawings in which:

FIG. 2 shows a control unit of the apparatus of FIG. 1 in isolation, while

FIG. 4 shows the cartridge and control unit of FIG. 3 without the cover, while

FIG. 5 shows the apparatus when the cover is moved to a second position, while

FIG. 7 shows the cartridge assembly in a position wherein the cartridge is connected to the control unit and fixed and/or locked in position relative to the control unit, while

FIG. 8 shows a cross-sectional view of the assembly in its assembled stated, while

FIG. 9 shows a perspective view of the assembly in a partly disassembled state, in which the cartridge assembly is shown as approaching but not engaging the control unit, while

FIG. 11 shows a cross-section through the apparatus, while

FIG. 21 shows a side view of the apparatus of FIG. 14, while

DETAILED DESCRIPTION

Figure 1:
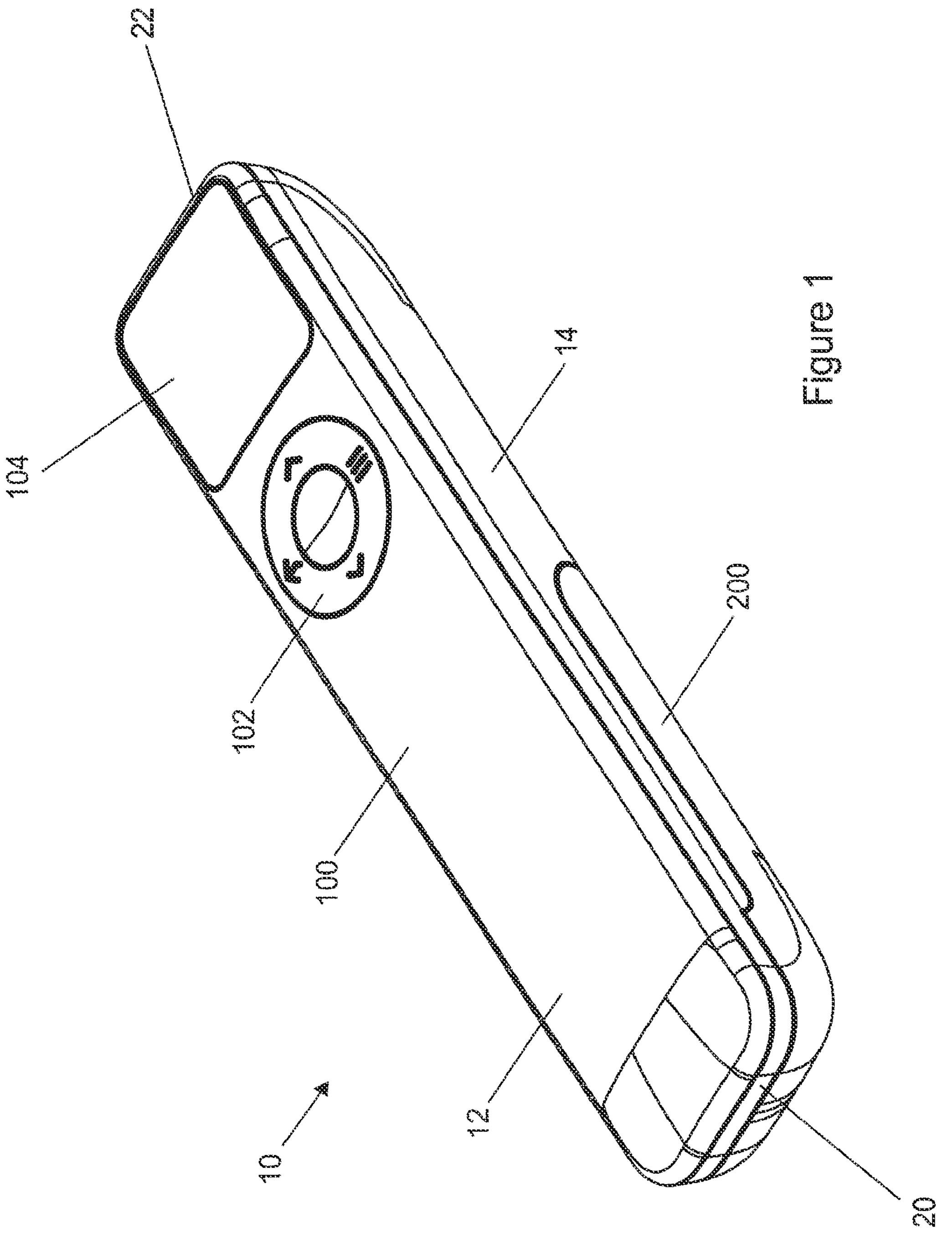
FIG. 1 shows a perspective view of an apparatus or device according to various aspects and embodiments of the invention.

FIG. 1 shows a perspective view of an apparatus or device 10 according to various aspects and embodiments of the invention, and forms a drug delivery device capable of dispensing one or more drugs in pellet form. The apparatus 10 has the aim of making the dispensing of repeat prescriptions simpler and more convenient than e.g., existing blister pack medications, and would enable changing the administered dose in a straight-forward way if desired for a certain treatment (e.g. for medications that would benefit from titrations or flexible adjustments). The apparatus 10 also aims to improve the control a user has when handling a dose of one or more drugs in pellet form, and improve the user control of a dispensing device, whilst ensuring that the device can prevent modification of the dose (e.g., overdosing) by the user.

In various embodiments the apparatus 10 can deliver doses meeting regulatory standards such as within +/−10% of a desired dose, or even within +/−5% of a desired dose.

FIG. 1 shows the apparatus or device 10 in an assembled state, wherein the apparatus 10 comprises a control unit 100 and a cartridge assembly 200. The cartridge assembly 200 is configured to mate with the control unit 100, such that the control unit 100 can operate the cartridge assembly 200 to dispense one or more doses of a drug, preferably in pellet form.

In the illustrated embodiment the apparatus 10 is a generally oblong shape having a generally flat upper surface 12 and a curved lower surface 14 opposite the upper surface 12. Although such a shape is visually appealing, the apparatus 10 is not limited to this particular arrangement, and other suitable shapes may be provided whilst achieving the functionality set out herein. The apparatus extends from a first end 22 a second, opposite end 22.

The control unit 100 shown in FIG. 1 comprises the entirety of the upper surface 12 of the apparatus 10. The control unit 100 may further comprise an input device or user interface 102, as well as a display 104, both of which may be located on the upper surface 12 and at the second end 22 of the apparatus 10, although in various embodiments they may be located at other suitable locations on the control unit 100.

The apparatus 10 is configured as a handheld unit, and sized appropriately. For example, the apparatus 10 may easily rest in the palm of a user's hand whilst the user interface 102 may be operated by a user's thumb in a similar manner to a remote control device. The size of the apparatus 10 may be no more than about 200 mm, 150 mm or 100 mm in length and/or width, for example the apparatus 10 may have a largest dimension of between about 50 mm to about 200 mm, for example about 100 mm to about 200 mm, or about 100 mm to about 150 mm.

The apparatus 10 may also be light enough that it can be easily carried and operated by a user with one hand. In various embodiments, the apparatus 10 (including the control unit 100 and cartridge assembly 200) may have a weight of about 200 g to 500 g, for example 300 g to 400 g. The weight of the apparatus 10 may be no more than 400 g.

Figure 2:
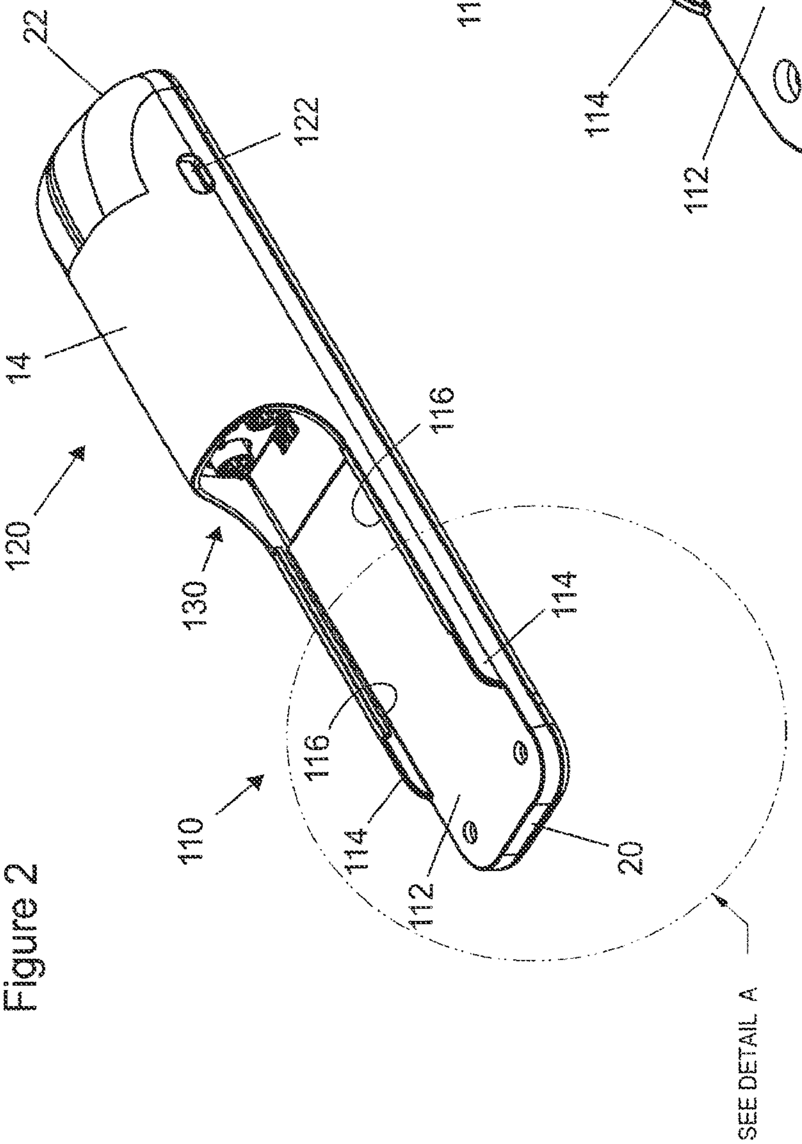

FIG. 2 shows the control unit 100 in isolation, and viewed in perspective showing the portion of the control unit forming the lower surface 14 of the apparatus 10.

The control unit 100 extends from the first end 20 to the second end 22 of the apparatus 10 (when it is assembled), so that the first end 20 and the second end 22 are also opposite ends of the control unit 100.

The control unit 100 is split into a first portion 110 located towards the first end 20, and a second portion 120 located towards the second end 22. The first portion 110 is configured to receive and hold the cartridge assembly 200, while the second portion 120 is configured to contain the various control electronics and actuator(s) that operate to control the dispensing of one or more drugs from the cartridge assembly 200. The apparatus 10 may comprise a battery, and the battery may be held within the first portion 110. This can help to distribute the weight of the apparatus 10 evenly and make it more comfortable to hold and/or easier to operate.

The control unit 100 may comprise an interface 130 at the junction between the first portion 110 and the second portion 120, which interface 130 is configured to mate and cooperate with various mechanical and electrical features located on the cartridge assembly 200 (which will be described in more detail below).

The first portion 110 and the second portion 120 of the control unit 100 may occupy roughly equal halves of the control unit 100, wherein the junction between the first portion 110 and the second portion 120 may extend across a lateral centerline of the control unit 100.

The first portion 110 comprises a substantially planar section 112 that extends from the junction between the first portion 110 and the second portion 120 to the first end 20 of the control unit 100.

Figure 2A:
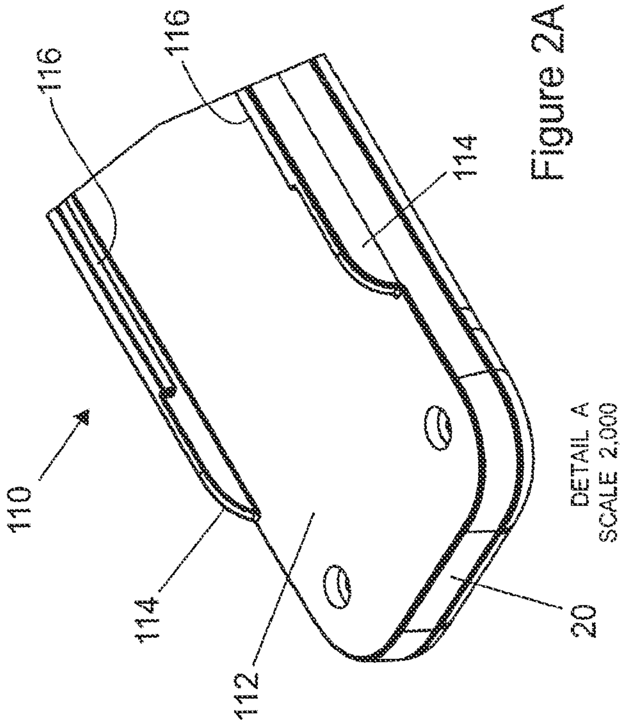
FIG. 2A shows a close-up view of the control unit.

The first portion 110 further comprises two opposing walls 114 that extend at least partially along either side of the control unit 100. The walls 114 may extend from the junction between the first portion 110 and the second portion 120 towards the first end 20 of the control unit 100, but may terminate prior to reaching the first end 20. The outer surface of the walls 114 may form the outer surface of the apparatus 10. As shown in more detail in FIG. 2A, the first portion 110 of the control unit 100 further comprises two rails 116 that may extend along an upper surface of the walls 114 (although any suitable location on the control unit 100 could be used), which rails 116 are configured to guide the cartridge assembly 200 onto the control unit 100.

The second portion 120 of the control unit 100 comprises various electronics and other components for operating/controlling the cartridge assembly 200 and user interface. The outer surface of the second portion 120 may form the outer surface of the apparatus 10 when assembled, for example the lower surface 14 thereof. The second portion 120 may comprise an input port 122 located towards the second end 22 of the control unit 100, which input port 122 may receive power and electronic control inputs via a suitable input device, such as a computer.

Figure 3:
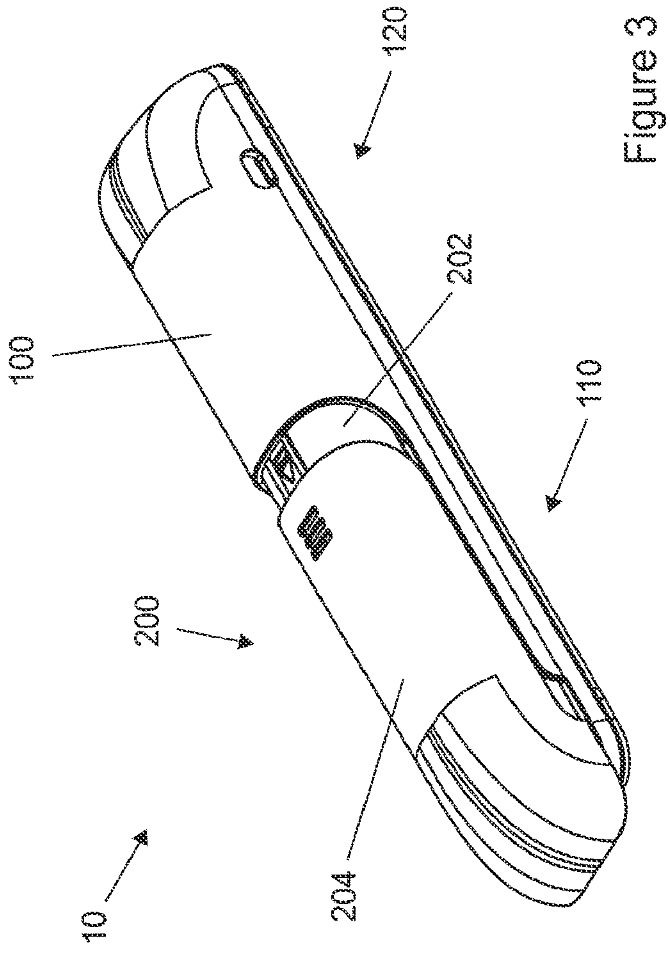
FIG. 3 shows a similar perspective view of the apparatus as seen in FIG. 2, but with a cartridge assembly of the apparatus, including a cartridge and cover therefore, mated with the control unit.

FIG. 3 shows a similar perspective view as seen in FIG. 2, but with the cartridge assembly 200 of the apparatus 10 mated with the control unit 100.

The cartridge assembly 200 comprises a cartridge 202 and a cover 204 that is slidable relative to the cartridge 202. The cartridge assembly 200, including the cartridge 202 and cover 204, is configured to slide onto the first portion 110 of the control unit 100 so as to engage with the control unit 100. When the cartridge assembly 200 is engaged with the control unit 100, the cartridge 202 may be substantially fixed in position, whilst the cover 204 may slide relative to the cartridge.

The cartridge 202 and/or cover 204 may be made from a material selected from the group of vectran, liquid crystal polymer, polybutylene terephthalate ("PBT"), acrylonitrile butadiene styrene ("ABS"), polypropylene ("PP"), polycarbonate ("PC"). In various embodiments the cartridge 202 and/or cover 204 may be made from stainless steel or aluminum. In embodiments in which the cover 204 is transparent, the cover 204 may be made from an amorphous and/or semi-crystalline polymer such as polycarbonate ("PC"), polypropylene ("PP"), styrene acrylonitrile resin ("SAN"), polyethylene terephthalate ("PET").

Figure 4:
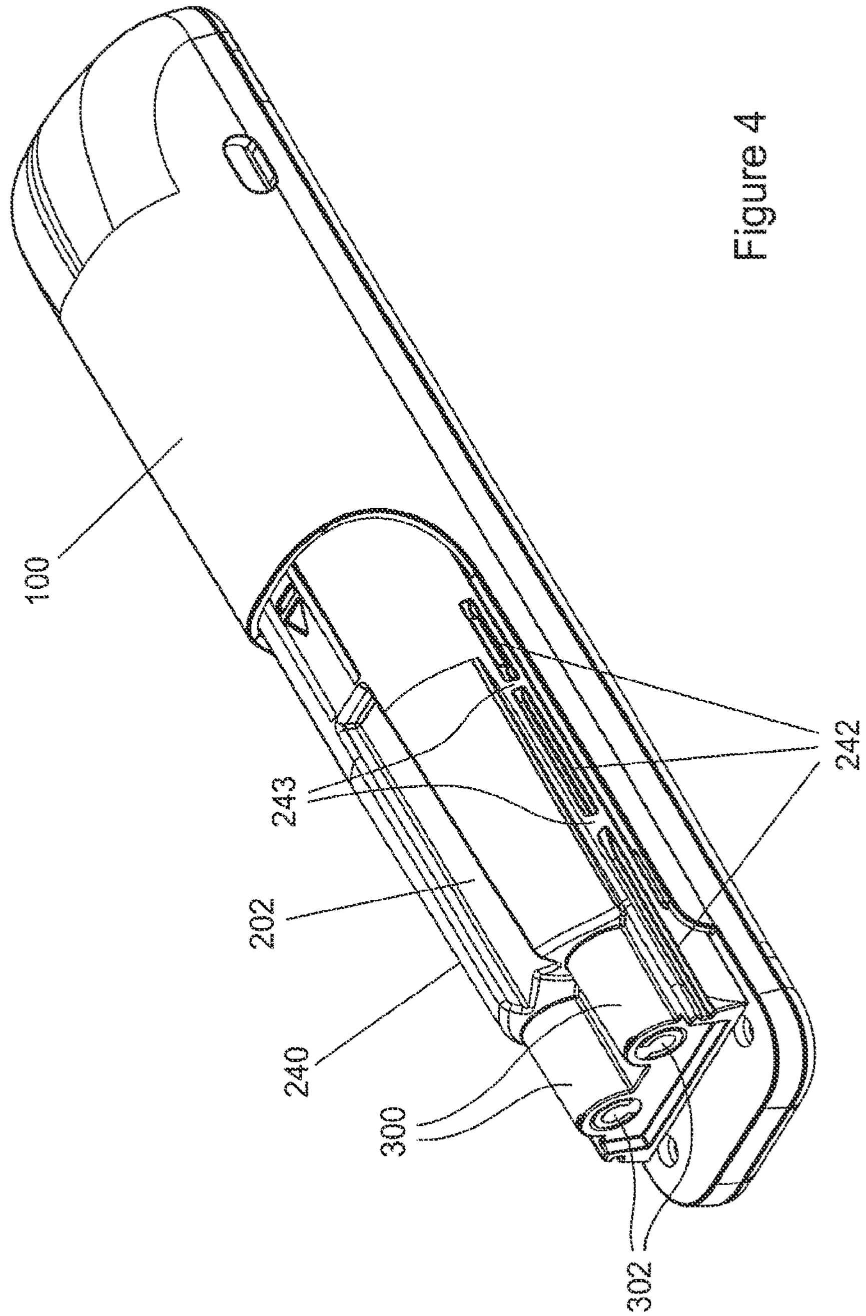

FIG. 4 shows the cartridge 202 and control unit 100 without the cover 204. The cartridge 202 may be configured to dispense one or more drugs and may be controlled by the control unit 100. In various embodiments, the cartridge 202 comprises one or more dispensing mechanisms 300 that are held within a housing 240 and configured to be actuated by the control unit 100. The one or more dispensing mechanisms 300 may comprise one or more rotatable elements (described in more detail below), such that a rotating drive within the control unit 100 is able to rotate one or more of the rotating elements of the cartridge 202 so that one or more drugs, for example in pellet form, are moved from within the cartridge 202 and dispensed from respective outlet ends 302 of each dispensing mechanism 300.

Various suitable mechanisms in this regard are described in International (PCT) Patent Publication Number WO 2019/115832, which is incorporated by reference herein in its entirety. For example, the one or more dispensing mechanisms may comprise a screw pump 306 (see, e.g., FIG. 21A) that is actuated (e.g., rotated) by the control unit 100, such that the screw pump 306 is configured to move one or more drugs, for example in pellet form, from one or more storage cavities within the cartridge 202 to be dispensed from the cartridge 202.

The cartridge 202 comprises one or more first guide cavities 242 that are formed in the housing 240 and configured to receive cooperating rails 216 (described below) on the cover 204 to aid in guiding the cover 204 onto the cartridge 202 so as to form the cartridge assembly 200. In the illustrated embodiment two sets of three first guide cavities 244 are provided, with each set being located on either side of the cartridge 200 (to cooperate with the rails 216 on the cover 204). However, according to various embodiments any suitable number of first guide cavities 242 and cooperating rails 216 may be provided.

Figure 4A:
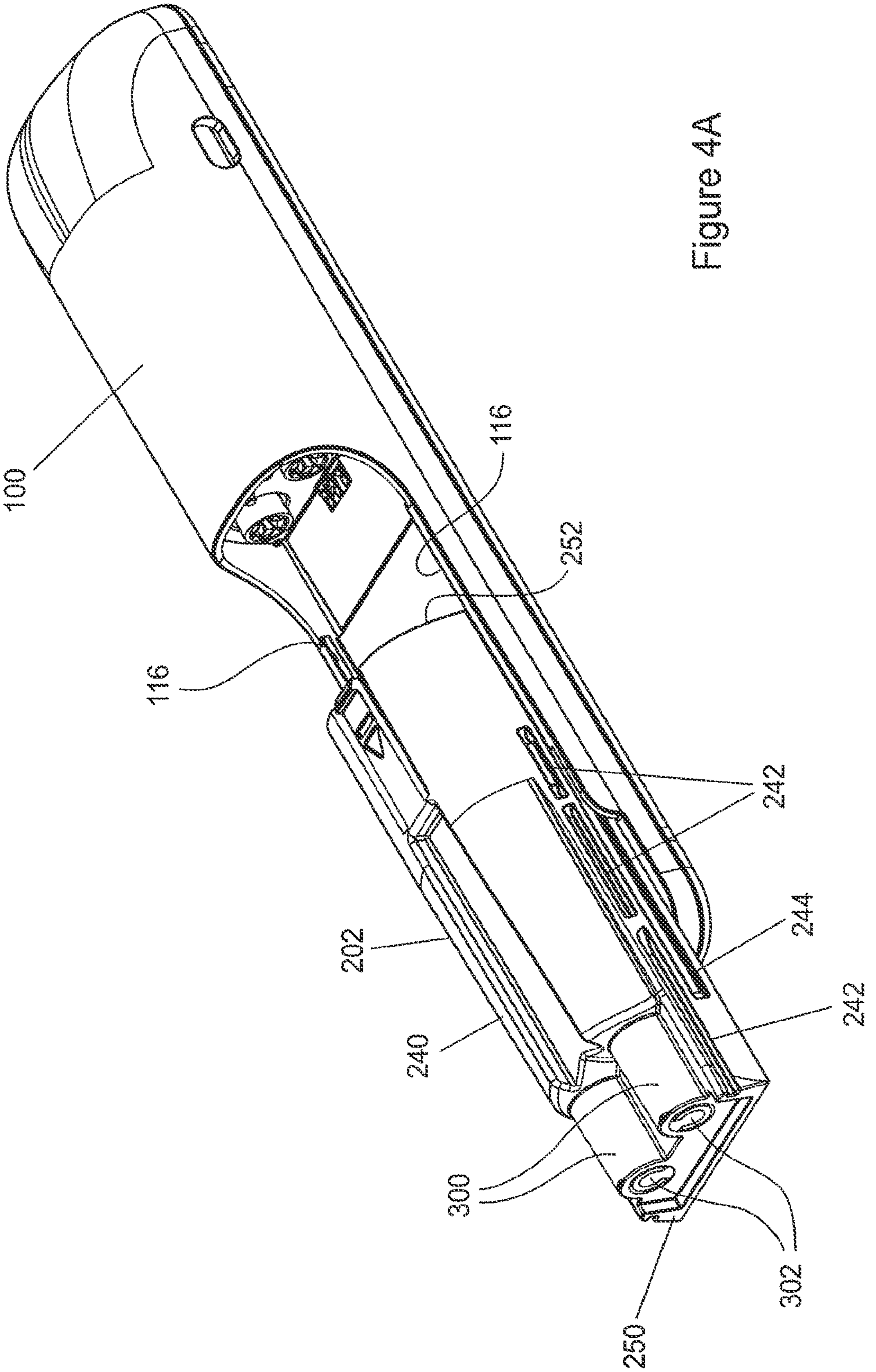
FIG. 4A shows the cartridge moved in a direction away from an interface of the control unit (i.e., in a disengaging direction)

FIG. 4A shows the cartridge 202 moved in a direction away from the interface 130 of the control unit 100 (i.e., a disengaging direction), showing one or more second guide cavities 244 provided on the outer surface of the housing 240 and configured to ride along the rails 116 on the control unit 100 to guide the cartridge 202 (and cartridge assembly 200) onto the control unit 100. In the illustrated embodiment two identical second guide cavities 244 are provided on either side of the cartridge 200 (to cooperate with the two identical rails 116 on the control unit 100). However, according to various embodiments any suitable number of second guide cavities 244 and cooperating rails 116 may be provided. For example, a single guide rail may be provided that runs along the planar section 112 in the engaging direction, which avoids the need for cavities located on the sides of the cartridge. The guide rails described herein may comprise a dovetail lateral cross-section to assist in guiding the cartridge assembly 200 onto the control unit 100.

The outlet ends 302 of the dispensing mechanism 300 are located at (or adjacent to) a first, dispensing end 250 of the cartridge 202. The cartridge 202 further comprises one or more features at a second, mating end 252 thereof (see, e.g., FIG. 9A) that are configured to mate and cooperate with features of the control unit 100 at the interface 130. This corporation will be described in more detail below.

Figure 4B:
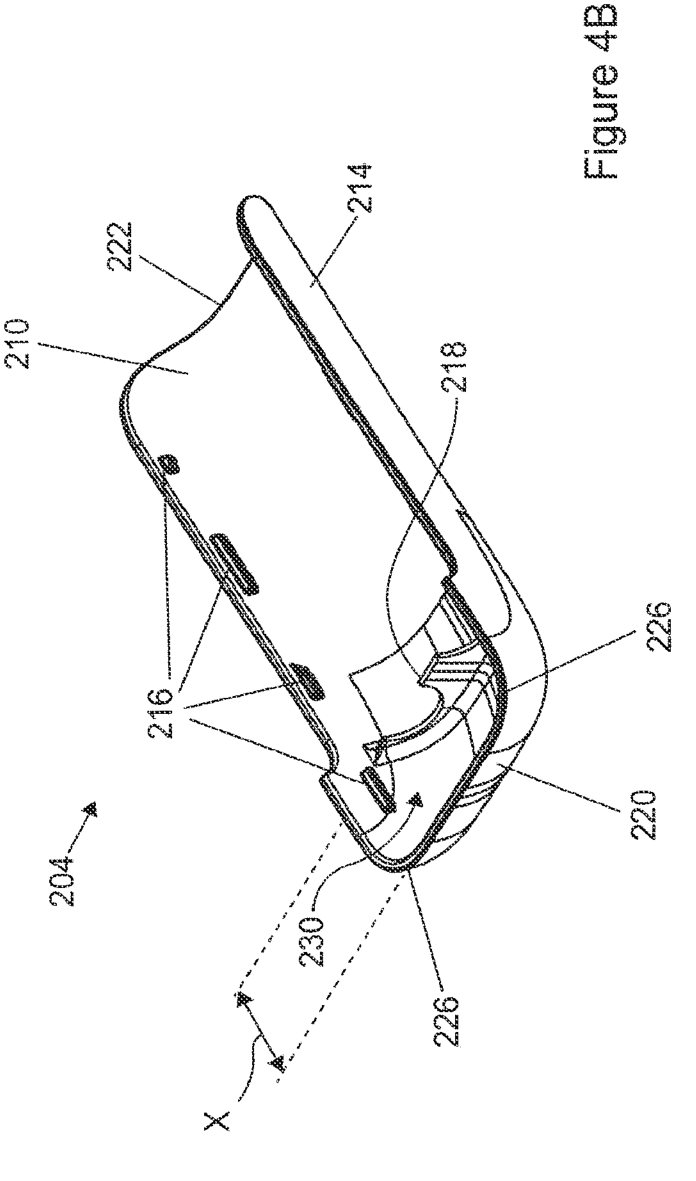
FIG. 4B shows the cover in isolation.

FIG. 4B shows the cover 204 in isolation, which can be seen to have a generally U-shaped cross-section, so that the cover 204 sits flush with the surfaces of the control unit 100 when the cover 204 is engaged therewith.

The cover 204 comprises an inner, generally concave surface 210 and an outer, generally convex surface 214, wherein the outer surface 214 may correspond to the curved lower surface 14 of the apparatus 10 in its assembled state. The inner surface 210 comprises a plurality of protrusions or rails 216 that are configured to cooperate with (e.g., fit into) the one or more first guide cavities 242 (see, e.g., FIG. 4) on the cartridge 202 to aid in guiding the cover 204 onto the cartridge 202. The rails 216 are configured to permit sliding movement of the cover 204 relative to the longitudinal axis of the cartridge 202, while preventing other movement or disengagement (e.g., laterally with respect to the longitudinal axis of the cartridge 202) of the cover 204 and the cartridge 202.

Referring to both FIGS. 4 and 4B, the first guide cavities 242 and the rails 216 on the cover 204 permit sliding movement of the cover 204 relative to the cartridge 202 by a limited amount. That is, one or more walls 243 are provided between the guide cavities 242 and situated on (e.g., coinciding with) the longitudinal axis thereof, the walls 243 acting as a stop for respective ones of the rails 216 on the cover 204 upon relative sliding movement of the cover 204 and the cartridge 200.

In order to fit the cover 204 onto the cartridge 202 initially (to form the cartridge assembly 200), the cover 204 will need to be deformed so that the rails 216 can move over the walls 243 and into their respective guide cavities 242. Once the rails 216 are positioned within their respective guide cavities 242 they cannot move out unless the cover 204 is again plastically deformed. The cover 204 is, however, able to slide relative to the cartridge 202 a limited amount depending on the length(s) of the guide cavities 242 and the rails 216.

Referring now to FIG. 4B, the cover 204 extends from a first end 220 to a second end 222, wherein the first end 220 is configured to substantially coincide with the first end 20 of the apparatus 10, and the second end 222 is configured to contact the outer surface 14 portion of the control unit 100 at the interface 130 thereof when the apparatus 10 is in its assembled state (as shown in FIG. 1).

The cartridge assembly 200 is configured such that the pellets that are dispensed from the cartridge 202 are collected within a portion of the cover 204 located adjacent to the first end 220 thereof, so that they are not lost and can be easily accessed by a user. The cover 204 comprises a plate or baffle 218 located a distance X from the first end 220 and extending laterally (with respect to the longitudinal axis of the cover 204). The distance X may be between about 10 mm and 20 mm, for example 11 mm and 14 mm.

In the illustrated embodiment, the cartridge 202 comprises two dispensing mechanisms 300, each of which is separately configured to dispense a drug in pellet form and comprises an outlet end 302 that rests on a portion of the baffle 218. In accordance with various aspects, the apparatus 10 is configured so that one or more drugs dispensed from the dispensing mechanism(s) 300 will fall into a collection region 230 of the cover 204. This means, for example, that a user can control the dispensing and subsequent handling of one or more drug with greater ease. In various embodiments, more than two dispensing mechanisms 300 may be provided, or a single dispensing mechanism 300 may be provided.

A further function of the cover 204 is to contain the pellets as they are expelled from the dispensing mechanisms 300 of the cartridge 202. For example, upon exiting the dispensing mechanisms 300 the pellets may have a large amount of energy (e.g., the method of dispensing may input a large amount of kinetic energy to the pellets) and so the pellets may be liable to, e.g., bounce off opposing surfaces if the cover 204 were not present.

The collection region 230 of the cover 204 forms an enclosed cavity when the apparatus 10 is in its assembled state (e.g., as shown in FIG. 1). As such, any drug that is dispensed into the collection region 230 in this state are retained by the apparatus 10 and cannot be lost to the environment.

Figure 5:
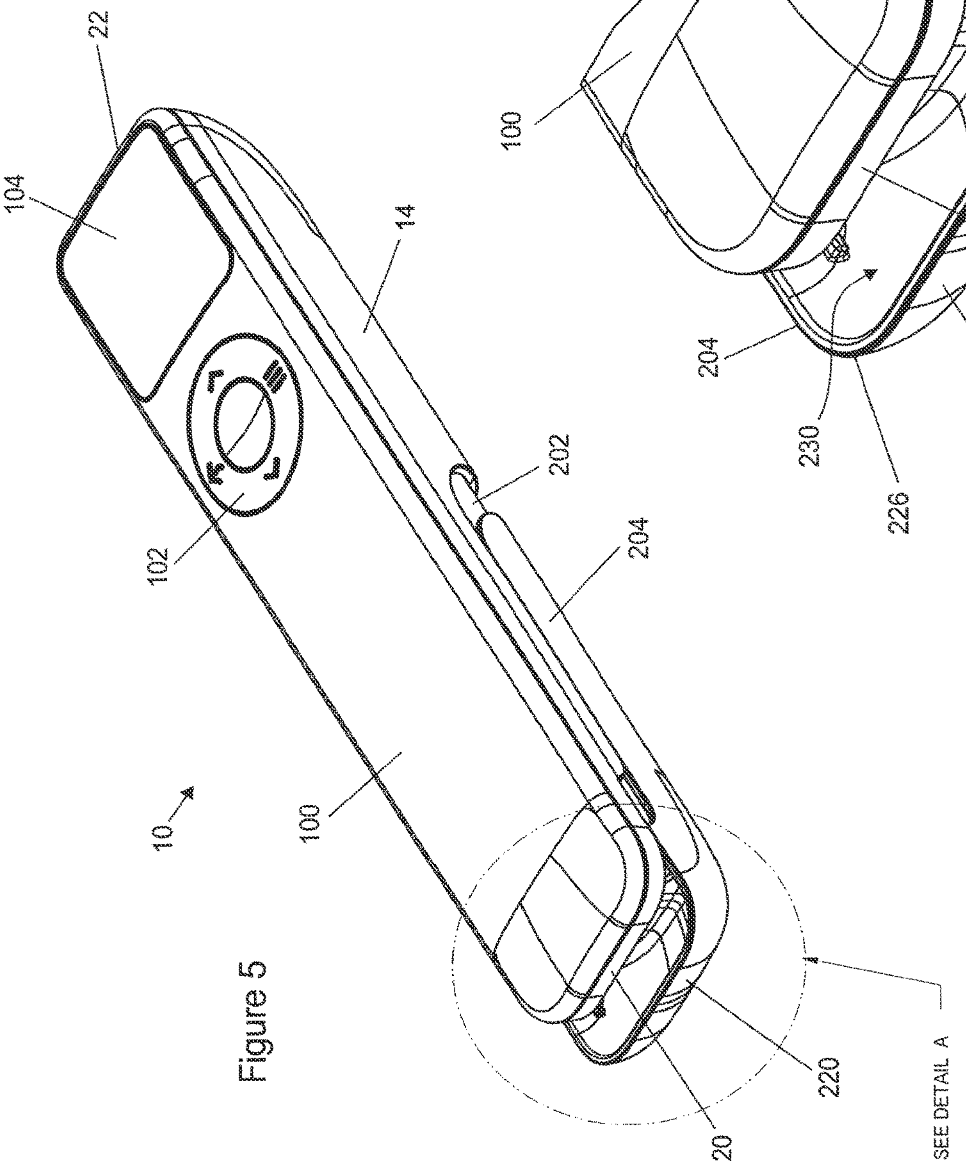

In order to access the one or more drugs contained within the cartridge 202, a user may move the cover 204 from its first position as shown in FIG. 1 to a second position (see FIG. 3). As shown in FIG. 5, when the cover 204 is moved to the second position, the first end 220 of the cover 204 moves away from the first end 20 of the control unit 100, which exposes the collection region 230 of the cover 204 and permits access to drugs contained therein.

Referring back to FIG. 4B, the cover 204 comprises means for accurately pouring one or more drugs from the collection region 230 into a suitable receptacle (e.g., a glass, cup or spoon), especially when the one or more drugs are in pellet form. For this purpose, the cover 204, and specifically the collection region 230 thereof comprises one or more pouring lips 226 configured to dispense pellet type drugs accurately, e.g., into a receptacle. In the illustrated embodiment, two pouring lips 226 are provided that are formed by rounded corners of the cover 204, which corners also form corners of the apparatus 10 in its assembled state shown in FIG. 1. Although this is considered a visually appealing and also convenient arrangement, other types of pouring lip may be provided. For example, a single pouring lip may be provided.

Figure 5A:
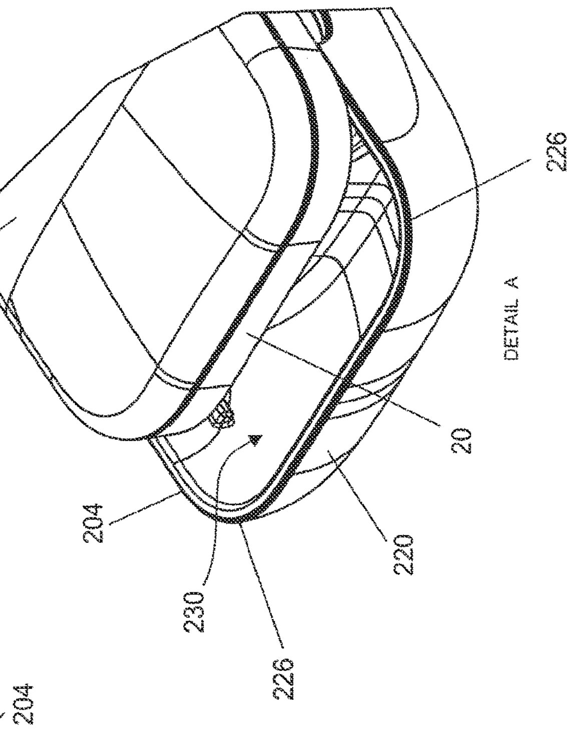
FIG. 5A shows how the cover moves out to expose a collection region of the cover.

FIG. 5A shows how the cover 204 moves out from underneath the top surface 12 of the apparatus 10 and control unit 100 to expose the collection region 230 of the cover 204, as well as the pouring lips 226 located on either side of the cover 204.

In the assembled state of the apparatus 10 (as shown, e.g., in FIG. 1), and when the cover 204 in its first position, the collection region 230 is an enclosed cavity, such that a drug cannot be dispensed from the apparatus 10. When the cover 204 is moved to its second position, as shown in FIGS. 3, 5 and 5A, the collection region 230 is exposed so that one or more drugs held therein can be accessed and/or dispensed from the apparatus 10. In various embodiments the apparatus 10 (e.g., the control unit 100 thereof) may comprise a sensor that is configured to detect if the cover 204 is in its first and/or second position.

Figure 6:
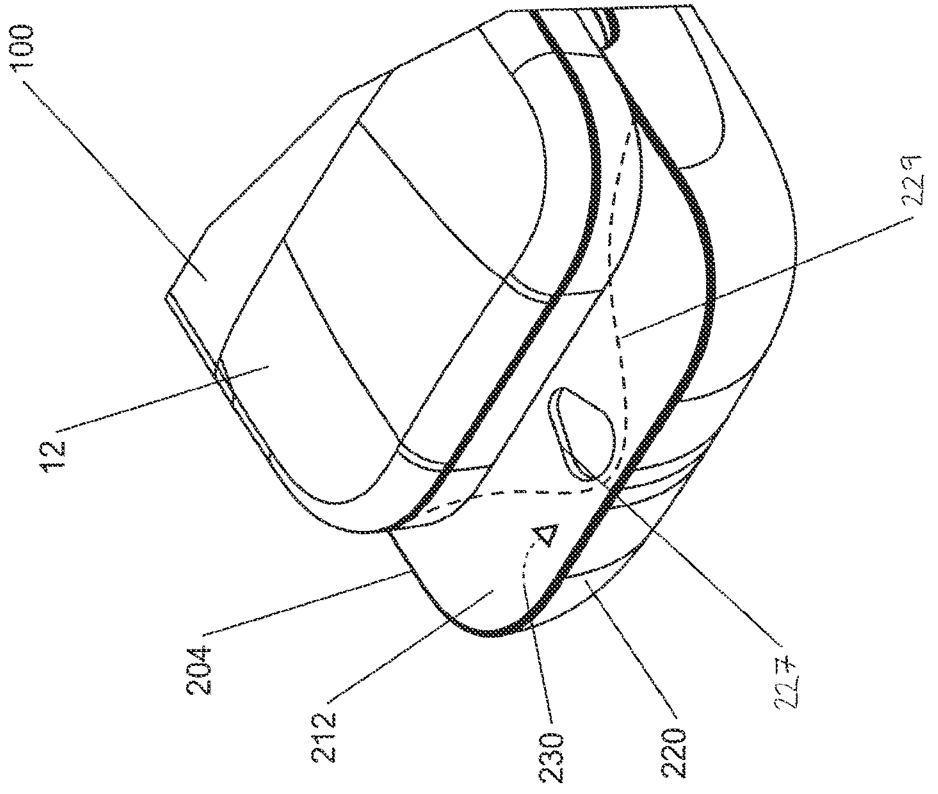
FIG. 6 shows an embodiment in which the cover comprises an plate that partially encloses the collection region when the cover is moved to its second position.

FIG. 6 shows an alternative embodiment in which the cover 204 comprises an plate 212 that partially encloses the collection region 230 when the cover 204 is moved to its second position. The plate 212 comprises an aperture 227 configured to permit one or more drugs contained within the collection region 230 to pass therethrough and be dispensed, e.g., into a suitable receptacle. The aperture 227 may be sized appropriately for a drug or drugs in pellet form. For example, the aperture 227 may have a largest width (e.g., for any dimension of the aperture 227) that is less than about 20 mm, for example 15 mm. Additionally, or alternatively, the aperture 227 may have a largest width (e.g., for any dimension of the aperture 227) that is at least about twice the width (e.g., an average width) of the pellets contained within the cartridge 200, for example between about 300 μm and about 3 mm.

In the illustrated embodiment the aperture 227 is teardrop shaped, which directs pellets easily from the collection region 230. However, other shapes are possible, for example circular, square, etc. This embodiment may allow for enhanced tamper resistance, since it would restrict users from accessing the collection tray 230, and specifically the output ends of the cartridge cylinders.

As described above, therefore, various embodiments of an apparatus 10 are described that includes a cover 204 that is configured to collect and dispense pellets during a dosing operation. Once a dosing operation is complete (for example, once the cartridge 202 has dispensed one or more doses of one or more drugs), the user can slide the cover 204 outwards to reveal the collection region 230. This allows one or more drugs, in particular drugs in pellet form, to be poured from the apparatus 10 onto e.g. a suitable receptacle or compatible foodstuff in a controlled manner.

When the cover 204 is in its first, closed or engaged position (as shown in FIG. 1) access to the collection region 230 is prevented, which also provides an improved shield for the output ends of the cartridge 202 to help prevent the cartridge 202 from unwanted environmental effects, such as moisture access. The cover 204 may be slid open by the user using either one or two hands to the second, dispensing position (see, e.g., FIGS. 5 and 5A), and in various embodiments tactile feedback may be provided by, e.g., detents in the form of protrusions and cavities on the cover 204 and the control unit 100 or cartridge 202.

The one or more drugs may be dispensed by a user upon operation of the control unit 100, such that the drugs in pellet form are dispensed from the cartridge 202 into the collection region 230. The pellets are then held in this collection region and are prevented from leaving at least in part by the baffle 218, which baffle 218 is configured to follow the contour of the cartridge housing 240 and/or dispensing mechanisms 300 and assist in providing the enclosed cavity of the collection region 230 when the cover 204 is in its first position.

As described above, in one embodiment (see, e.g., FIG. 6), the cover 204 is provided such that upon moving the cover 204 to the second, dispensing position an opening is formed that is as wide as the apparatus 10 itself. This provides a simple mechanism in which two opposite corners of the cover 204 may form pouring lips 226 from which a user can pour pellets, e.g., with either the left or right hand.

In another embodiment, as described with above with reference to FIG. 6, the cover 204 includes an plate 212 formed by a flat plate that extends across the width of the cover 204, wherein an aperture 227 is provided in the plate 212 so that one or more drugs can be poured from a single, concentrated point. In this embodiment, one or more internal ribs 229 may be provided to direct the drugs (e.g., pellets) held within the collection region 230 into the aperture 227, to help ensure that all of the drugs contained within the collection region 230 are poured from the apparatus 10. In addition, and as described above, the small aperture 227 allows for enhanced tamper resistance, by restricting access to the collection region 230. The dimensions of the aperture 227 may vary with the size of the drug(s), e.g., pellets contained within the cartridge assembly 200. The relationship between a width (e.g., an average width) or diameter of drugs, e.g., pellets and the width of the aperture may be at least 1:1, and in various embodiment the width of the aperture 227 may be between 1 and 1.5 times a width (e.g., an average width or diameter) of the pellets. The internal ribs 229 that assist in directing the drugs must also be larger than the angle of repose of the pellets.

In various embodiments the cover 204 may be replaced by other features that achieve a similar function.

For example, in various embodiments as shown in FIGS. 12A-D, the cover 204 could be replaced with a housing 400 comprising a rotating barrel 404. The housing 400 may comprise an inlet end 405 configured to be placed over the outlet end of the cartridge 202 so as to receive one or more drugs therefrom. The pellets would be dispensed from the cartridge 202 into a collection region 430 of the housing 400 in a similar manner as described above in respect of the collection region 230 of the cover 204. The collection region 430 of the housing 400 forms an enclosed cavity bounded by the housing 400, rotating barrel 404 and the cartridge 202, and may be sealed from the outside of the apparatus 10. The barrel 404 comprises a circumferential notch 407 having a volume corresponding to a required dose of a drug. When the user is ready to dispense a dose of one or more drugs contained within the circumferential notch 407, they can rotate the barrel 404. The circumferential notch 407 then moves around the rotational axis of the barrel 404 and tips the pellets into an outlet end 406 of the housing 400 located on an opposite side of the housing 400 to the collection region 430. The pellets then fall out of the housing 400 onto, e.g., a suitable receptacle.

Although not shown at present in FIGS. 12A-D, it is submitted that a person of skill in the art would appreciate how the rotating barrel 404 and housing 400 thereof may be incorporated into an apparatus 10 as described above and herein. For example, modifications may be made to the apparatus 10 such that the housing 400 (which is shown only schematically in FIG. 12A-D) could be attached to the cartridge 202 instead of the cover 204 by any suitable means. In various embodiments it is envisaged that the housing 400 and rotating barrel 404 could be combined with the cover 204, for example the rotating barrel 404 could be placed between the dispensing mechanisms 300 of the cartridge 202 so that a user could rotate the barrel 404 and tip the pellets into a collection region (e.g., similar to collection region 230) of the cover 204. As will be appreciated, in such embodiments the length of the apparatus 10 (and the collection region of the cover) would have to be increased to accommodate the rotating barrel 404 and housing 400.

Figure 13B:
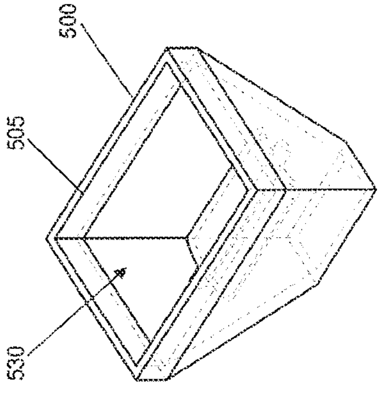
FIGS. 13A-C show a funnel that may be used as a replacement for the cover.
Figure 13C:
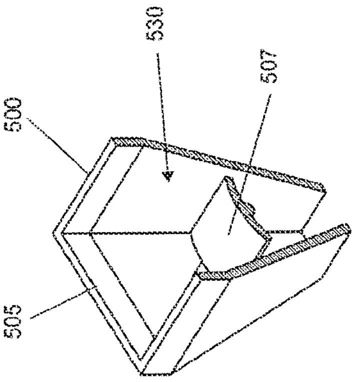
Figure 13A:
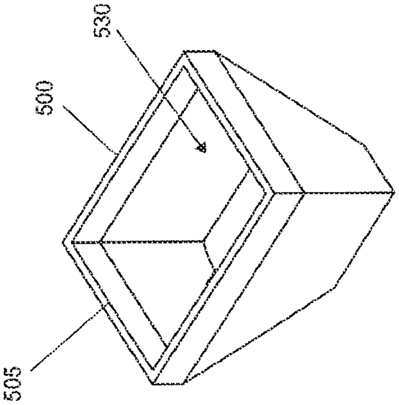

In various embodiments as shown in FIGS. 13A-C, the cover 204 could be replaced by a funnel 500. The funnel 500 comprises an inlet end 505 configured to be placed over the outlet end of the cartridge 202 so as to receive one or more drugs therefrom. The funnel 500 may, therefore, be configured to receive one or more drugs in a collection region 530 thereof in the same manner as described above in respect of the collection region 230 of the cover 204. However, the collection region 530 of the funnel 500 may not form an enclosed cavity, and instead would allow a user to dispense drugs in pellet form directly, e.g., onto a suitable receptacle or foodstuff. The funnel 500 may include features (e.g., one or more baffles or plates 507 located within the collection region 530) to prevent clear line-of-sight to the outlet end of the cartridge 202, which may increase the tamper resistance of the apparatus 10 including a funnel 500. The funnel 500 may, additionally or alternatively comprise a flexible plate (not shown) comprising an aperture located at an outlet 502 thereof.

Similar to the rotating barrel 404 embodiment of FIGS. 12A-D, it will be appreciated that the depiction of the funnel 500 in FIGS. 13A-C is schematic, and a person of skill in the art would appreciate how the funnel 500 may be incorporated into an apparatus 10 as described above and herein.

Figure 7:
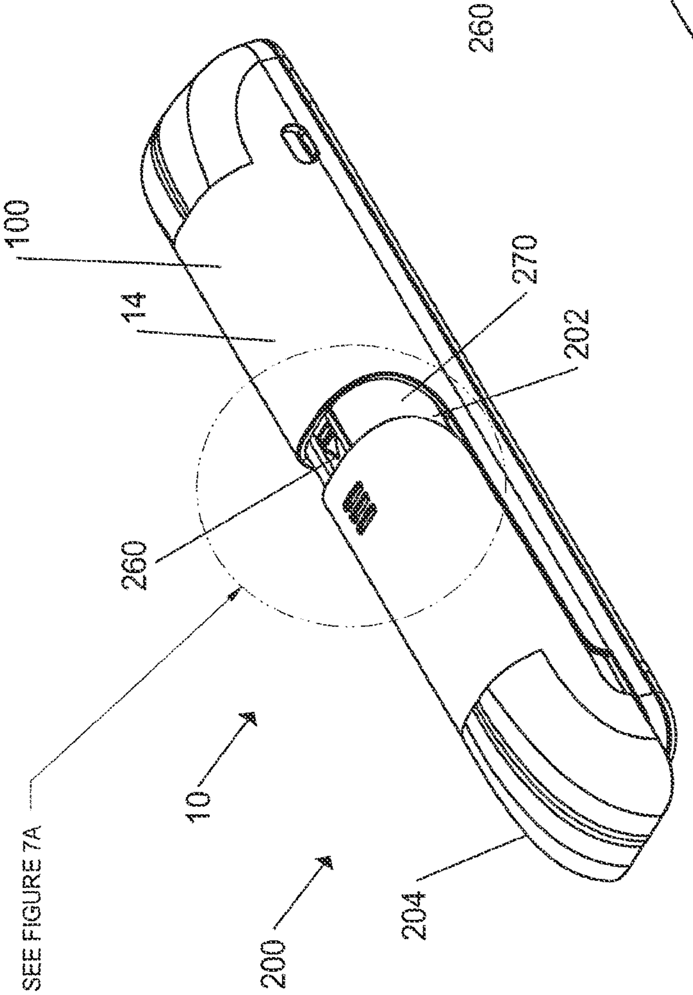
Figure 7A:
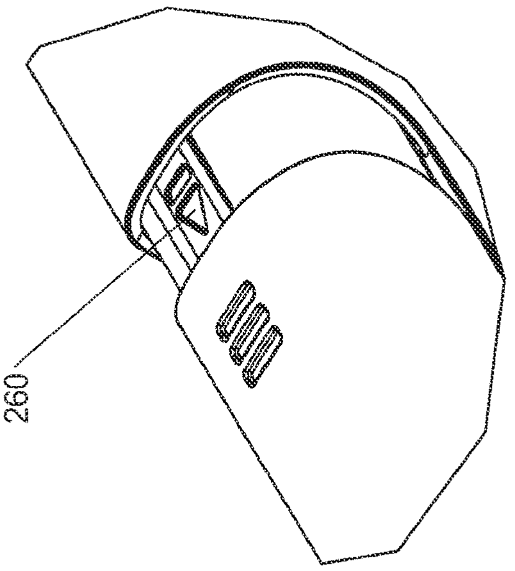
FIG. 7A shows a locking tab movable with the main body of the cartridge.

Referring now to FIGS. 7 and 7A, the cartridge assembly 200 comprising the cartridge 202 and the cover 204 is shown with the control unit 100.

FIG. 7 shows the cartridge assembly 200 in a position wherein the cartridge 202 is connected to the control unit 100 and fixed and/or locked in position relative to the control unit 100. That is, user input is required to unlock the cartridge 202 and cartridge assembly 200 from the control unit 100. In addition, the cover 204 of the cartridge assembly 200 is in its second, dispensing position to illustrate the cover 204 as slidable relative to the cartridge assembly 200 when the cartridge 202 is locked in position with respect to the control unit 100.

In order to lock the cartridge 202 into position with the control unit 100, a locking tab 260 is provided on the cartridge that is configured to engage (and disengage) with features of the control unit 100. The locking tab 260 is provided on an outer surface 270 of the cartridge housing 240, which outer surface 270 opposes the inner surface 110 of the cover 204. As shown in FIG. 7A, the locking tab 260 is movable with the main body of the cartridge 202 and is configured to slide underneath the lower surface 14 of the control unit 100 to lock the cartridge 202 in position.

On the rear of the cover 204, there may be provided one or more tactile features (in FIG. 7A this is shown as three parallel, depressed lines 228) configured to assist the user in sliding the cover between its first and second positions. Additionally, or alternatively, the cover 204 may comprise a rough texture, friction coating, etc. added to or on the outer surface 214 thereof to increase grip.

In various embodiments, the cover 204 may be made from a substantially rigid, durable material to assist in protecting the cartridge 202 from physical damage and also increasing tamper resistance. Additionally, or alternatively (and as discussed below) the cover 204 may be made from a translucent and/or transparent material to allow a user to view the one or more drugs (e.g., pellets) deposited in the collection region 230 prior to moving the cover 204 to its second, dispensing position.

Figure 8:
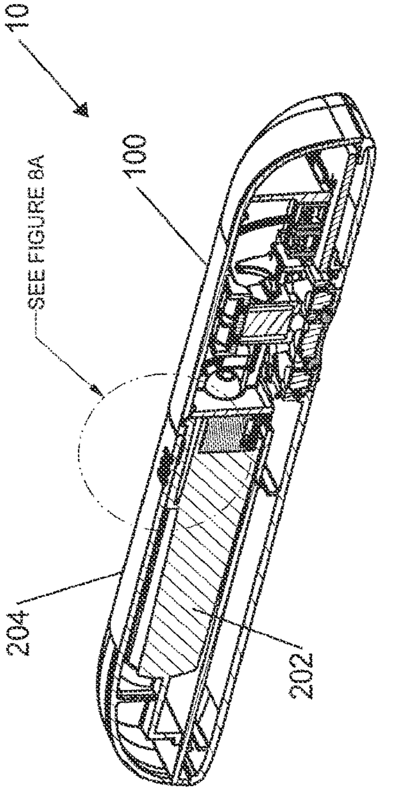
Figure 8A:
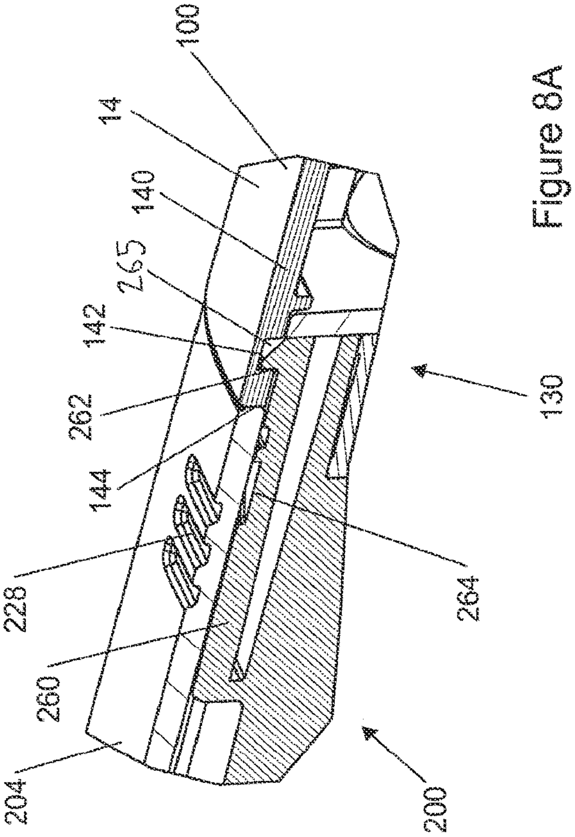
FIG. 8A shows a close up of FIG. 8 to illustrate the mechanism by which the locking tab engages and disengages with the control unit.

FIG. 8 shows a cross-sectional view of the assembly 10 in its assembled stated and wherein the cover 204 is in its first position. FIG. 8A shows a close up of FIG. 8 to illustrate the mechanism by which the locking tab 260 engages and disengages with the control unit 100.

The control unit 100 comprises an outer wall 140, the exterior surface of which forms the lower surface 14 of the control unit 100. In the region of the interface 130, the outer wall 140 comprises a recess or cavity 142 that is configured to mate with a flange or lip 262 of the locking tab 260. The flange or lip 262 may comprise a triangular shape so that as the cartridge 202 is moved into engagement with the control unit 100, the flange or lip 262 comprises a ramped surface 265 that contacts an end surface 144 of the outer wall 140, such that the ramped surface 265 rides along the end surface 144 and forces the locking tab 260 downwards so that it passes the end surface 144 of the outer wall 140. The locking tab 260 is resilient, such that upon reaching the recess or cavity 142, the flange or lip 262 will spring back into the recess or cavity 142. In this position (as shown in FIG. 8A)

a user is unable to move the cartridge 202 away from the control unit 100 without pressing on the locking tab 260, since the flange or lip 262 cannot move in the disengaging direction.

The locking tab 260 may comprise a tactile feature 264 (in the illustrated embodiment an eject symbol) that is configured to prompt the user to depress the locking tab 260 when it is desired to disengage the cartridge 202 and cartridge assembly 200 from the control unit 100. In doing so, the flange or lip 262 moves downwards and out of the recess or cavity 142 so that the cartridge 202 and cartridge assembly 200 can slide away from the control unit 100.

The cover 204 also comprises a tactile feature 228 on the outer surface 214 thereof (in the illustrated embodiment three parallel lines or depressions) and adjacent to the locking tab 260 when the cartridge assembly 200 is engaged with the control unit 100. The tactile feature 228 on the outer surface 214 of the cover 204 is configured to prompt the user to use this portion of the cover 204 to slide the cover 204 into its second, dispensing position so that a user can access one or more drugs contained within the collection region 230 thereof. Sliding the cover 204 into its second position in this manner also reveals the tactile feature 264 located on the locking tab 260 of the cartridge 202. In other words, the tactile feature 264 that prompts the user to depress the locking tab 260 to disengage the cartridge 202 is hidden behind the cover 204 prior to dispensing of any drugs from the cover 204. This reduces the chance that the cartridge 202 will be ejected accidentally during dispensing.

In various embodiments, the cover 204 may be made of a transparent or translucent material so that a user may see the drugs (e.g., pellets) deposited in the collection region 230 when the cover 204 is in its first position, i.e., prior to moving the cover 204 to its second, dispensing position. This can reduce the chance that a user will open the cover 204 unintentionally, and, e.g., accidentally spill part or all of a dosage. Additionally, or alternatively the cover 204 may be colored or marked differently to the other portions of the apparatus 10, for example the cartridge 202 and/or control unit 100, so that a user can easily distinguish and/or determine the function of the cover 204 from the other parts of the apparatus 10.

Generally, as discussed above the cartridge assembly 200 and control unit 100 are configured to engage one another to allow the control unit 100 to operate the cartridge mechanism so as to dispense drugs contained within the cartridge 202. This engagement is initiated by inserting the cartridge assembly 200 into the first portion 110 of the control unit 100 (see FIG. 2) such that the guide cavities 244 on the cartridge 202 engage the cooperating rails 116 on the control unit 100 to allow the cartridge assembly 200 to slide along the planar section 112, and towards the interface 130 of the control unit 100.

Figure 9:
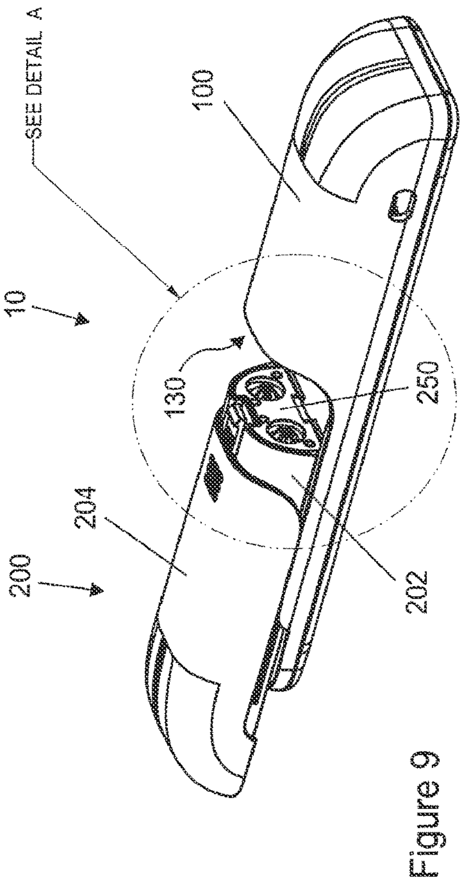

FIG. 9 shows a perspective view of the assembly 10 in a partly disassembled state, in which the cartridge assembly 200 is shown as approaching but not engaging the control unit 100. Furthermore, the cover 204 is also slid back away from the control unit 100 to expose the locking tab 260.

Figure 9A:
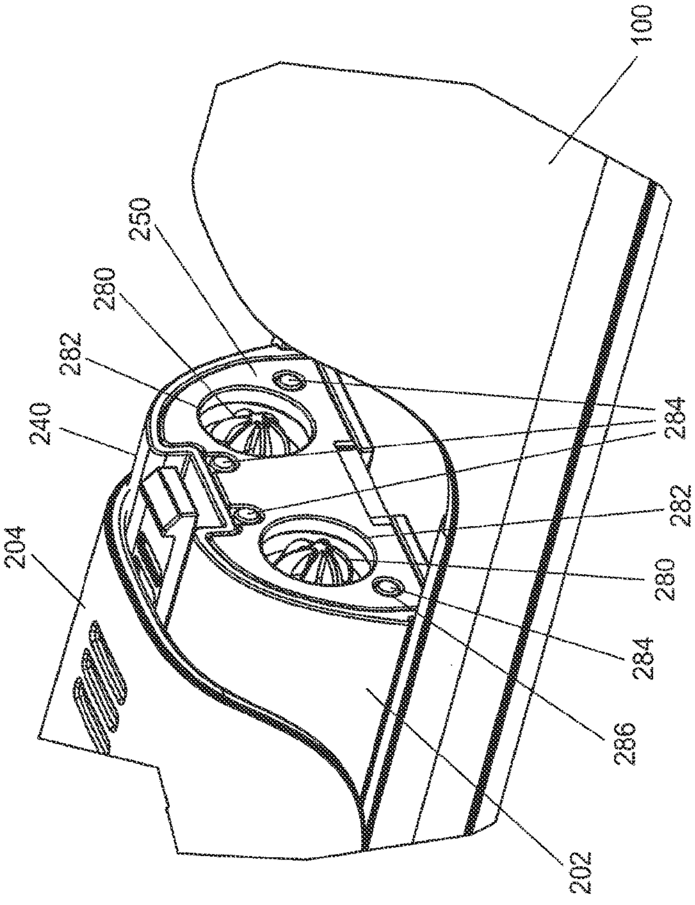
FIG. 9A shows a close-up view of the cartridge in sliding engagement with the control unit prior to docking therewith.

FIG. 9A shows a close-up view of the cartridge 202 in sliding engagement with the control unit 100 prior to docking therewith, and showing various features located on the second, mating end 250 of the cartridge 202 that are configured to mate with cooperating features at the interface 130 of the control unit 100.

The cartridge 202 comprises one or more male connection elements 280 that each form part of a respective dispensing mechanism 300 located within the cartridge 202 as described above. The male connection elements 280 are located at the mating end 250 of the cartridge 202 and are held within circular cavities 282 formed in the external surface of the mating end 250 (although the cavities 282 need not be circular). Rotation of the male connection elements 280 may cause actuation of a respective dispensing mechanism 300, such that, upon rotation of the male connection element 280 one or more drugs, e.g., in pellet form, are dispensed from the cartridge 202. In the illustrated embodiment, the male connection elements 280 are presented as star elements, although any suitable rotatable, connection element may be used.

Figure 11:
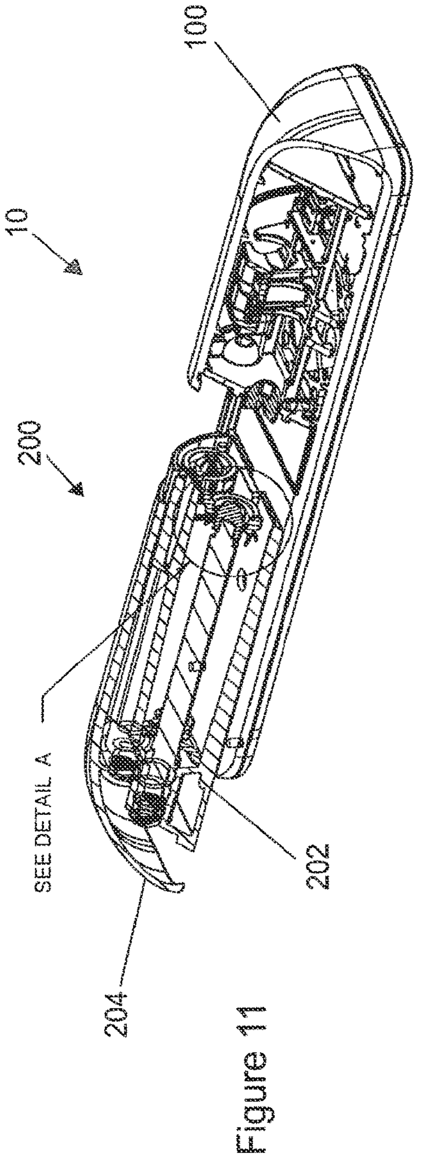
Figure 11A:
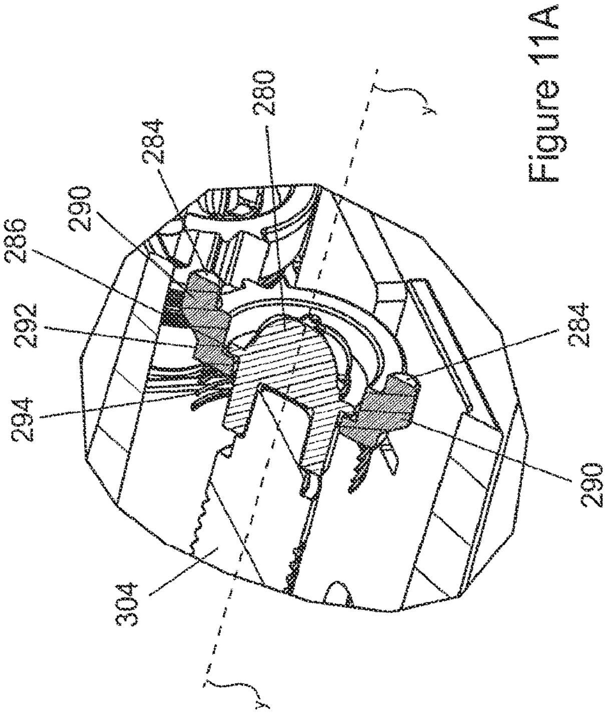
FIG. 11A shows a close-up in which locking plates of the cartridge can be seen in more detail.

The cartridge 202 further comprises one or more movable pins 284 that form part of respective locking members or plates 290 (see FIGS. 11 and 11A). The one or more movable pins 284 are located at the mating end 250 of the cartridge 202 and held within cavities 286 formed in the external surface of the mating end 250. The pins 284 are movable into the cavities 286 within which they are held, the reasons for which will become apparent based on the description below. In the illustrated embodiment, a total of 4 pins are provided, although any suitable number of pins may be used while still providing the functionality described herein. The pins 284 are shown as having a solid, circular cross section; however, the pins 284 may comprise other cross sections to aid in the tamper resistant properties of the cartridge assembly 200, for example a hollow cylinder or cross-shaped cross section. It may be more difficult to depress the pins if they have such cross sections, or other irregular cross sections, which can aid in the tamper resistance properties of the cartridge.

Figure 10A:
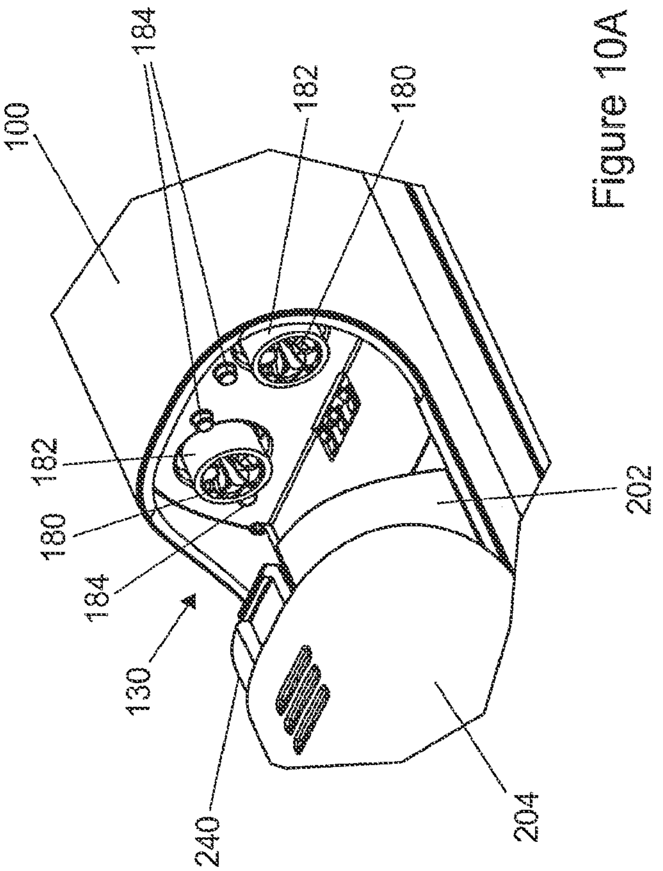
FIGS. 10 and 10A show views of the assembly similar to FIGS. 9 and 9A, but with the view rotated so that the features of the interface of the control unit can be seen in more detail.
Figure 10:
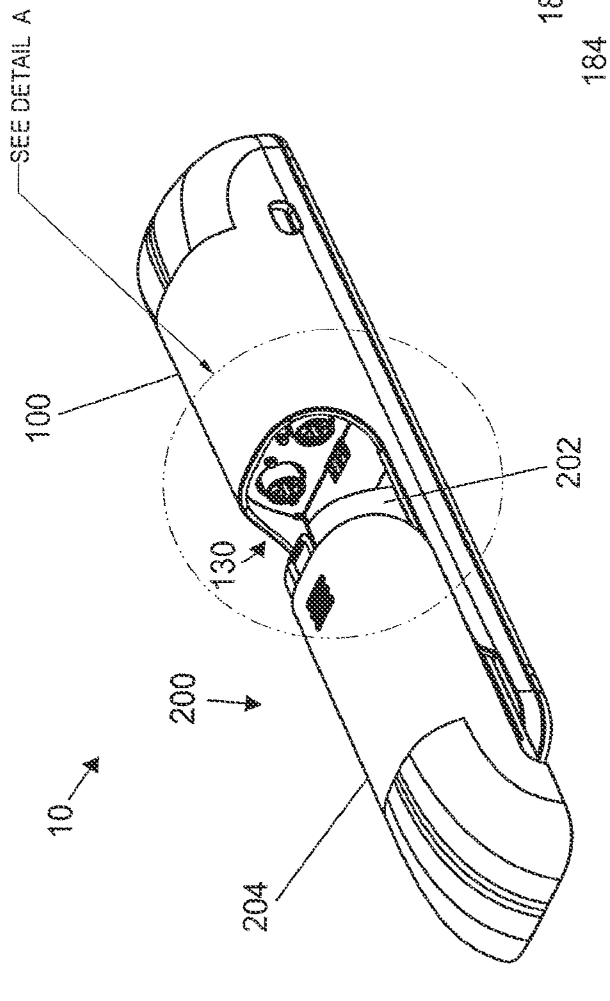

FIGS. 10 and 10A show views of the assembly 10 similar to FIGS. 9 and 9A, but with the view rotated so that the features of the interface 130 of the control unit 100 can be seen in more detail, which features are configured to cooperate with the features on the mating end 250 of the cartridge 202 shown in FIGS. 9 and 9A.

As seen in FIG. 10A, the interface 130 comprises one or more female connection elements 180 that are each configured to mate with a corresponding male connection element 280 located on the cartridge 202. The female connection elements 180 are configured to drive (e.g., rotate) the male connection elements 280 so as to cause actuation of respective dispensing mechanisms 300 as aforesaid. The female connection elements 180 may be driven by one or more actuation mechanisms (e.g., one or more electric motors) located within the control unit 100. The female connection elements 180 may be surrounded by respective cylindrical covers 182 that fit into and engage the circular cavities 282 of the cartridge 202. The fit between the cylindrical covers 182 and the circular cavities 282 may be a snug fit, although may not be a friction or interference fit so as to avoid interference between the connection elements 180, 280.

Although the interface 130 is described as comprising female connection elements, and the cartridge 202 as comprising male connection elements, in various embodiments these may be switched so that the interface 130 comprises male connection elements, and the cartridge 202 comprises female connection elements. It will be appreciated that the function of the connection elements on the interface 130 may remain the same, that is, to drive the connection elements on the cartridge, and in turn the dispensing mechanisms 300 within the cartridge 202. The use of male connection elements on the cartridge, as shown, can lead to improved tamper resistance since it is generally more difficult to actuate a male connection element without the corresponding female connection element than it would be vice versa.

The interface 130 further comprises one or more static pins 184 that are configured to abut the movable pins 284 of the cartridge 202 upon engagement of the cartridge 202 with the control unit 100. The one or more static pins 184 are configured to push the movable pins 284 in a direction away from the interface 130 when the cartridge 202 is moved into engagement with the control unit 100.

According to various aspects, the dispensing mechanism (s) 300 within the cartridge 202 may only be actuated upon engagement of the cartridge 202 with the control unit 100. In order to achieve this, the movable pins 284 form part of respective locking plates 290 (as mentioned above) that are configured to prevent actuation of the dispensing mechanism (s) 300 in a first, locking position and permit actuation of the dispensing mechanisms 300 in a second, unlocked position.

FIG. 11 shows a cross-section through the apparatus 10, and FIG. 11A shows a close-up in which the locking plates 290 can be seen in more detail.

With reference to FIG. 11A, the one or more male connection elements 280 of the cartridge 202 are each connected to one or more components of the respective dispensing mechanism 300 (e.g., the shaft 304 shown in FIG. 11A), such that rotation of the male connection elements 280 causes actuation of the respective dispensing mechanism 300 so that a dosage of a drug may be dispensed from the apparatus 10.

The locking element 290 is disposed generally concentrically around the male connection element 280, and is biased by a resilient member 294 (e.g., a spring) in a direction towards the interface 130 of the control unit 100 when the cartridge 202 is approaching an engaged position therewith. The locking plate 290 is movable in a direction along a longitudinal axis Y of the connection element 280 (and optionally the shaft 304), wherein the connection element 280 is configured to rotate about the longitudinal axis Y to actuate the dispensing mechanism 300 as described above.

Figure 11B:
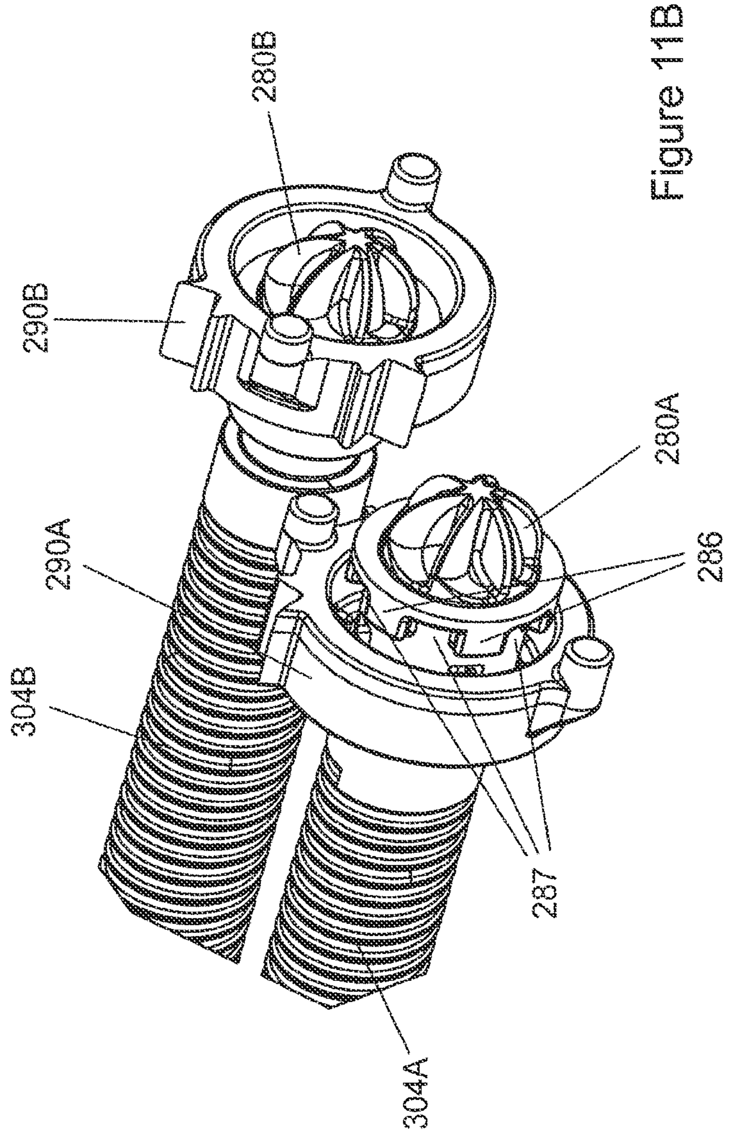
FIG. 11B shows the locking plates and rotating members of the actuation assembly in isolation.
Figure 12A:
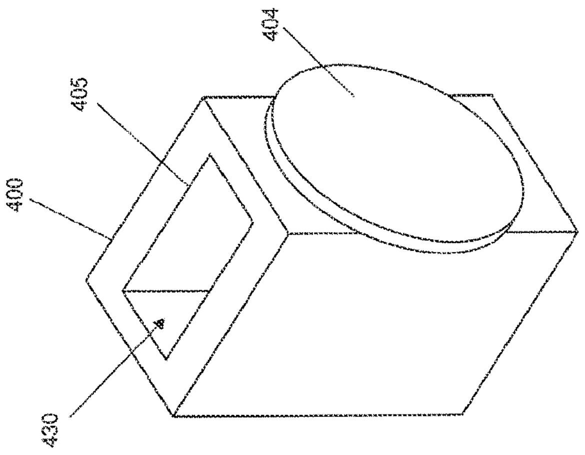
FIGS. 12A-D show a housing comprising a rotating barrel, which may be used in conjunction with, or instead of the cover.
Figure 12B:
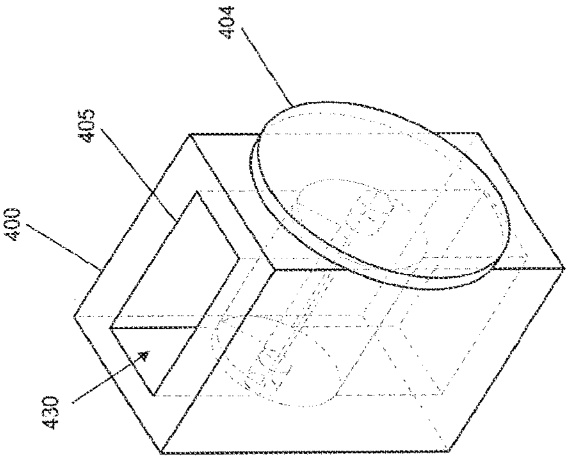
Figure 12C:
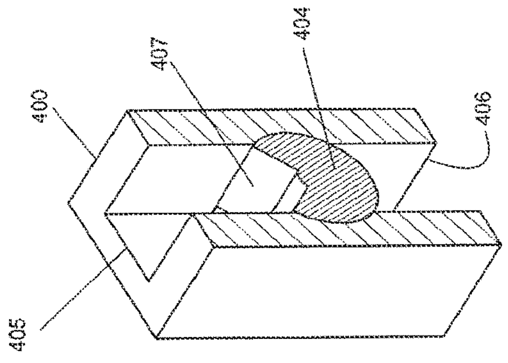
Figure 12D:
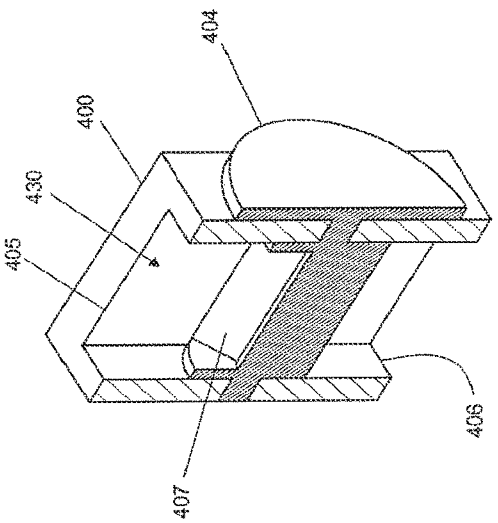

FIG. 11B shows two male connection elements 280A, 280B and respective locking plates 290A, 290B in isolation with shafts 304A, 304B of respective dispensing mechanisms, wherein for illustrative purposes a first locking plate 290A is shown as being moved to an unlocked position, and a second locking plate 290B is shown in its first, locking position. Other than the position in which they are shown, the first locking plate 290A is identical to the second locking plate 290B and both have the same structure as the locking plate(s) 290 described above.

In its unlocked position the first locking plate 290A exposes one or more radial extensions 286 of the male connection element 280A that define circumferential cavities 287 therebetween. The radial extensions 286 may comprise radially and axially extending surfaces with respect to a rotational axis of the respective shaft 304. The locking plates 290A, 290B comprise one or more teeth 292 that are configured to enter respective ones of the cavities 287 in the locking position, and move out of their respective cavity 287 in the unlocking position. The teeth 292 may extend circumferentially with respect to the rotational axis of the respective shaft 304.

The locking plates 290A, 290B are both restricted from rotational movement, which means that in the locking position (as exhibited by the second locking plate 290B) the male connection element 280B cannot rotate due to the engagement of the teeth 292 within their respective cavities 287. In contrast, in the unlocked position (as exhibited by the first locking plate 290A) the male connection element 280A is free to rotate due to the disengagement of the circumferential teeth 292 from their respective cavities 287. That is, in the locking position the teeth 292 of the locking plates 290 may occupy the same circumferential plane as the radial extensions 286, with respect to the rotational axis of the respective shaft 304, preventing rotation of the respective shaft 304, and then as the locking plates 290 move to their unlocked position the teeth 292 move out of the same circumferential plane to permit rotation of the respective shaft 304.

In order to operate the assembly 10, a user may slide the cartridge assembly 200 into the control unit 100, during which they will receive minimal resistance, until the interface of the cartridge assembly 200 contacts the cooperating interface of the control unit 100. At this point the pins 284 on the cartridge assembly 200 contact the cooperating pins 184 on the control unit 100, which begins to move the locking plates 290 from their first, locking positions to their second, unlocked positions. Prior to any interaction between the interfaces of the cartridge assembly 200 and the control unit 100, as discussed above the locking plates 290 prevent rotation of the shaft 304 and actuation of the dispensing mechanisms 300. Once the interfaces of the cartridge assembly 200 and the control unit 100 are connected, and the cartridge assembly 200 is fully docked with the control unit 100, the locking plates 290 move into their second, unlocked position, which permits rotation of the shaft 304 and actuation of the dispensing mechanism 300.

The apparatus 10 may comprise one or more features configured to latch the cartridge assembly 200 to the control unit 100 when it is fully docked therewith, and prevent relative movement between the cartridge assembly 200 and the control unit 100. For example, the locking tab 260 (FIG. 8A) may be provided on the cartridge assembly 200, which grips a cooperating recess or cavity 142 inside the control unit 100. The force of the resilient members 294 may bias the cartridge assembly 200 in a direction away from the interface 130 of the control unit 100, to minimize relative movement between the cartridge assembly 200 and the control unit 100. These features can also assist in holding the cartridge assembly 200 securely in place.

A user may eject the cartridge assembly 200 by drawing back the cover 204 to expose the locking tab 260, e.g., an eject button thereon. The user may then push down on the locking tab 260, flexing it downwards and allowing the cartridge assembly 200 to slide relative to the control unit 100. In embodiments involving the use of resilient members 294, these may push back against the control unit 100, and assist in sliding the cartridge assembly 200 away from the control unit 100.

The control unit 100 may comprise a computing device, for example including a processor and memory, wherein the computing device may be configured to receive instructions or signals from the user interface 102 and process these to output one or more commands or control signals. For example, a control signal may be sent from the computing device to one or more motors contained within the control unit 100 that are configured to actuate the one or more dispensing mechanisms 300 within the cartridge assembly 200 as described above.

In various embodiments, the control unit 100 (e.g. the computing device thereof) may be configured to detect the cartridge assembly 200 being fully docked with the control unit 100. The control unit 100 may be configured to actuate the one or more dispensing mechanisms 300 within the cartridge assembly 200 only when the cartridge assembly 200 is fully docked therewith. For example, the computing device may only send a control signal to operate one or more motors contained within the control unit 100 once the cartridge assembly 200 is fully docked.

In various embodiments, the cartridge assembly 200 may contain a memory chip that, when docked, the control unit 100 (e.g., the computing device thereof) can detect and read. The memory chip on the cartridge assembly 200 may contain information regarding the cartridge assembly 200, such as the type and amount of drugs contained within the cartridge assembly 200. Additionally, or alternatively the memory chip may contain a specific identifier for that particular cartridge assembly 200. The control unit 100 may detect that a specific cartridge assembly 200 has been docked therewith, and from that point onward pair with that cartridge assembly 200 such that the control unit 100 does not work with other cartridge assemblies. This can prevent cartridge assemblies being swapped between control units, effectively forming a digital security seal.

Figure 14:
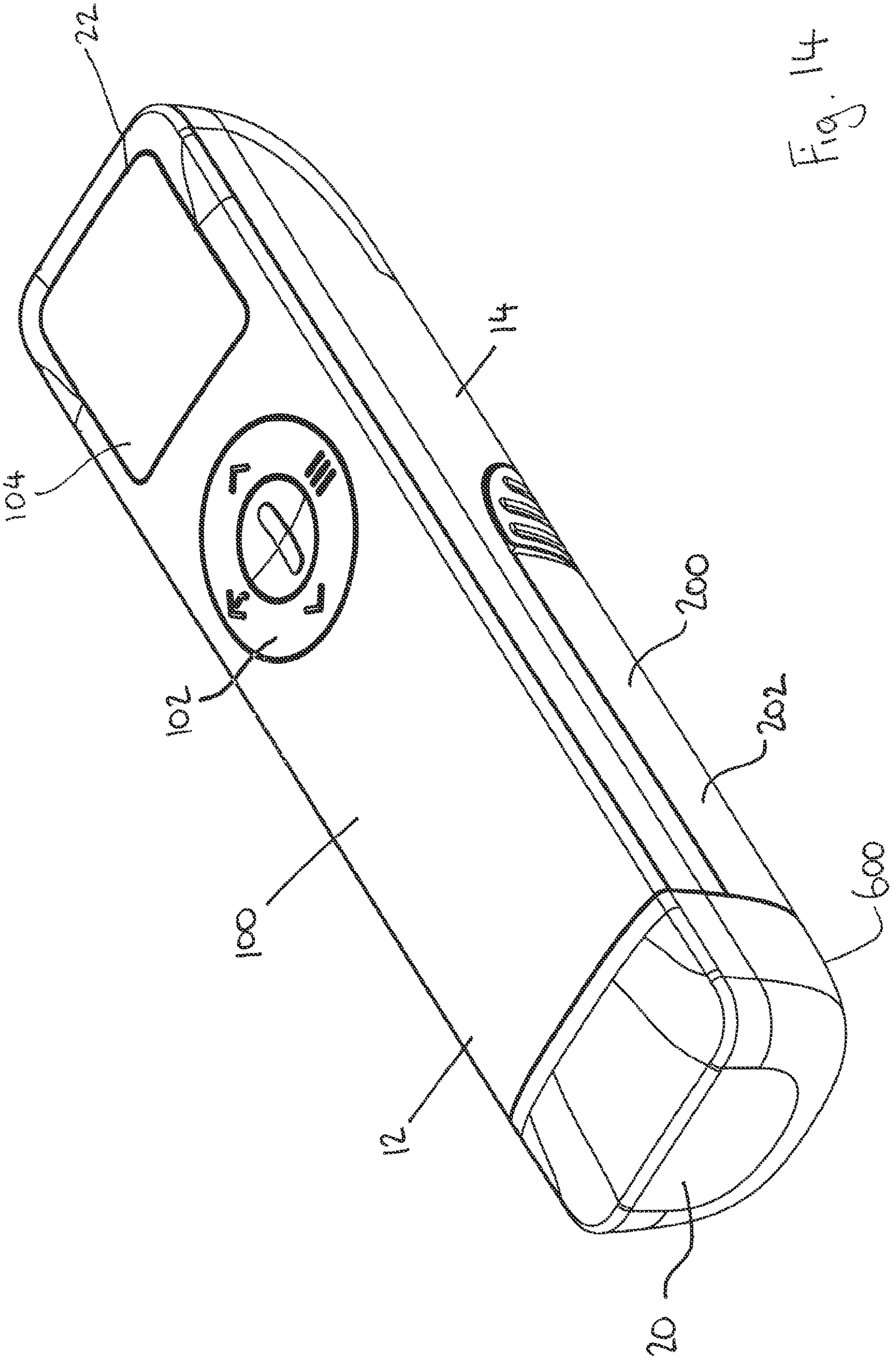
FIG. 14 shows an apparatus that is similar to that shown in FIG. 1, where like elements are indicated by like reference numerals, but with a cover or cap that is detachable (e.g., completely) from the remainder of the apparatus.

FIG. 14 shows an apparatus 10 that is similar to that shown in FIG. 1 and described above, where like elements are indicated by like reference numerals, but with the sliding cover 200 of that embodiment replaced with a cover or cap 600 that is detachable (e.g., completely) from the remainder of the apparatus 10.

The apparatus 10 comprises a control unit 100 that may comprise any of the features referred to above in respect of the previous embodiments, including for example the display 104 and input device or user interface 102. The apparatus 10 further comprises a cartridge assembly 200 configured to mate with the control unit 100 in the same manner as the previous embodiments, that is comprising the various actuation and dispensing mechanisms 300 that are described above. Instead of having a sliding cover 204 that forms the outer surface of the apparatus 10, in this embodiment the cartridge 202 itself is configured to mate with the control unit 100 such that the outer surface of the cartridge sits flush with the outer surface of the control unit 100 as shown in FIG. 14.

Figure 15:
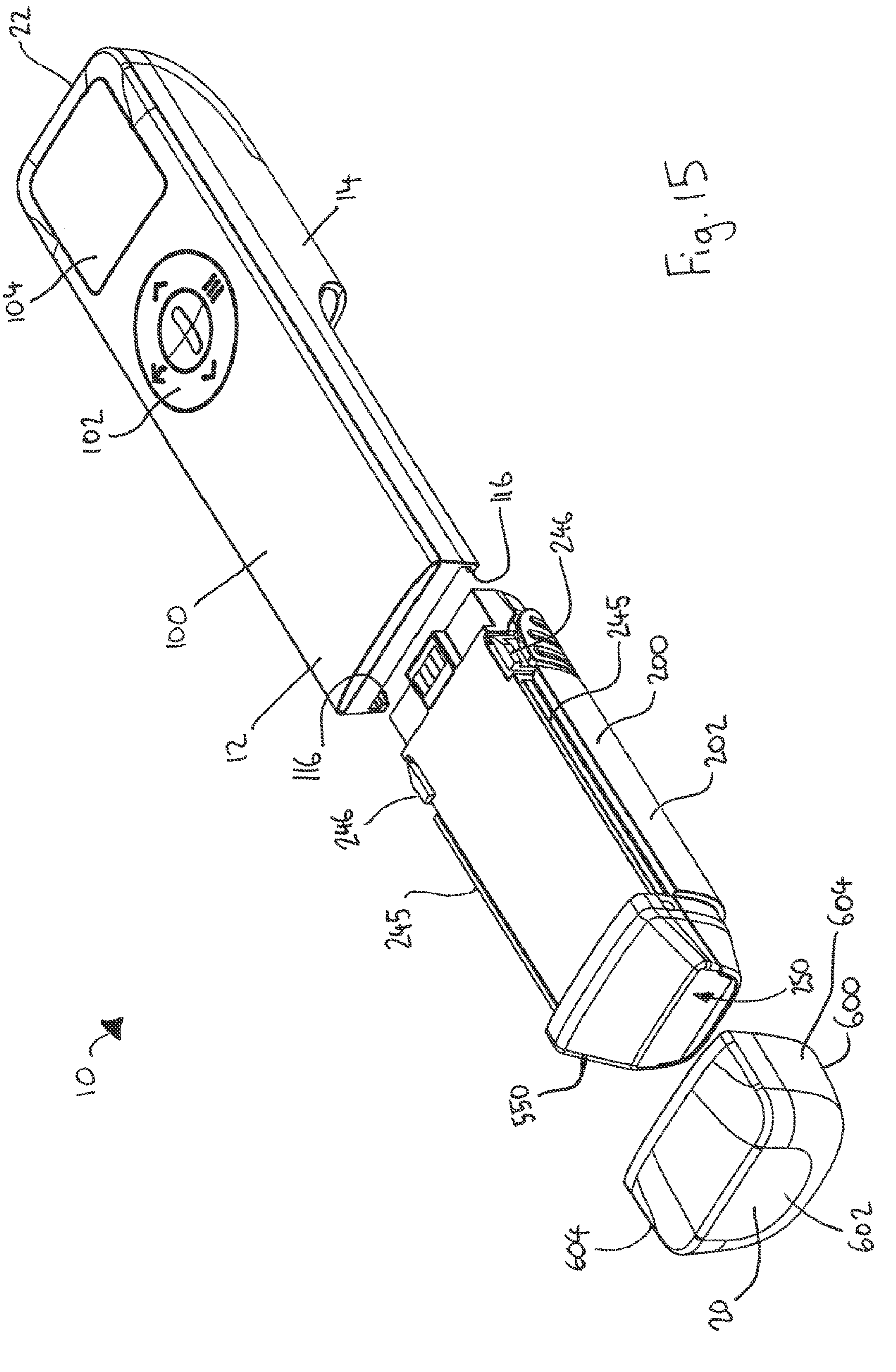
FIG. 15 shows an exploded view of the apparatus of FIG. 14.

FIG. 15 shows an exploded view of the apparatus 10, in which the cartridge 202 and cap 600 are separated from the control unit 100. In order to connect the cartridge 202 to the control unit 100 it may be slid into the control unit 100 in a similar manner as described above in respect of the previously described embodiment. The control unit 100 comprises rails 116 as in the previous embodiment, and the cartridge 202 comprises rails 245 (e.g., instead of guide cavities 244) that slide onto the rails 116, wherein the cartridge 202 is held in place by the cooperating rails 116, 245. One or more latches 246 may be provided on the cartridge that are configured to latch onto cooperating features (not shown) on the control unit 100 to retain the cartridge 202 in place once it is fully mated with the control unit 100.

The cap 600 is removable and/or detachable (e.g., completely, as shown in FIG. 15) from the remainder of the apparatus 10, for example the cartridge 202 and/or control unit 100. This permits increased versatility, for example a user can take a dose directly into their mouth with reduced chance of spilling the dose. It will be appreciated that a small, lightweight (detachable) cap is typically easier to handle than larger or heavier device, especially when pouring pellets from the cap into the mouth or into food.

The cap 600 may be configured to connect to remainder of the apparatus 10 (e.g., the cartridge 202 and/or control unit 100) by any suitable manner, for example an interference fit, magnetic latch, clip fastener or screw connection. The cap 600 could be connected to the remainder of the apparatus 10, e.g., the cartridge 202 and/or control unit 100 by a snap fit, which provides a convenient method of detaching and re-attaching the cap or cover.

The cap 600 may comprise a base portion 602 and one or more side portions 604 extending from the base portion 602. The one or more side portions 604 may be configured to connect to the cartridge 202 and/or control unit 100 so as to provide a seal (e.g., a hermetic seal) between the cap 600 and the remainder of the apparatus 10 (e.g., cartridge 202 and/or control unit 100). In this manner, the cap 600 may form a cup configured to hold pellets dispensed from the cartridge 202 (e.g., the dispensing mechanisms 300 thereof).

The apparatus 10 may comprise a funnel 550, which may be similar to the funnel 500 described above in respect of FIGS. 13A-C.

Figure 16:
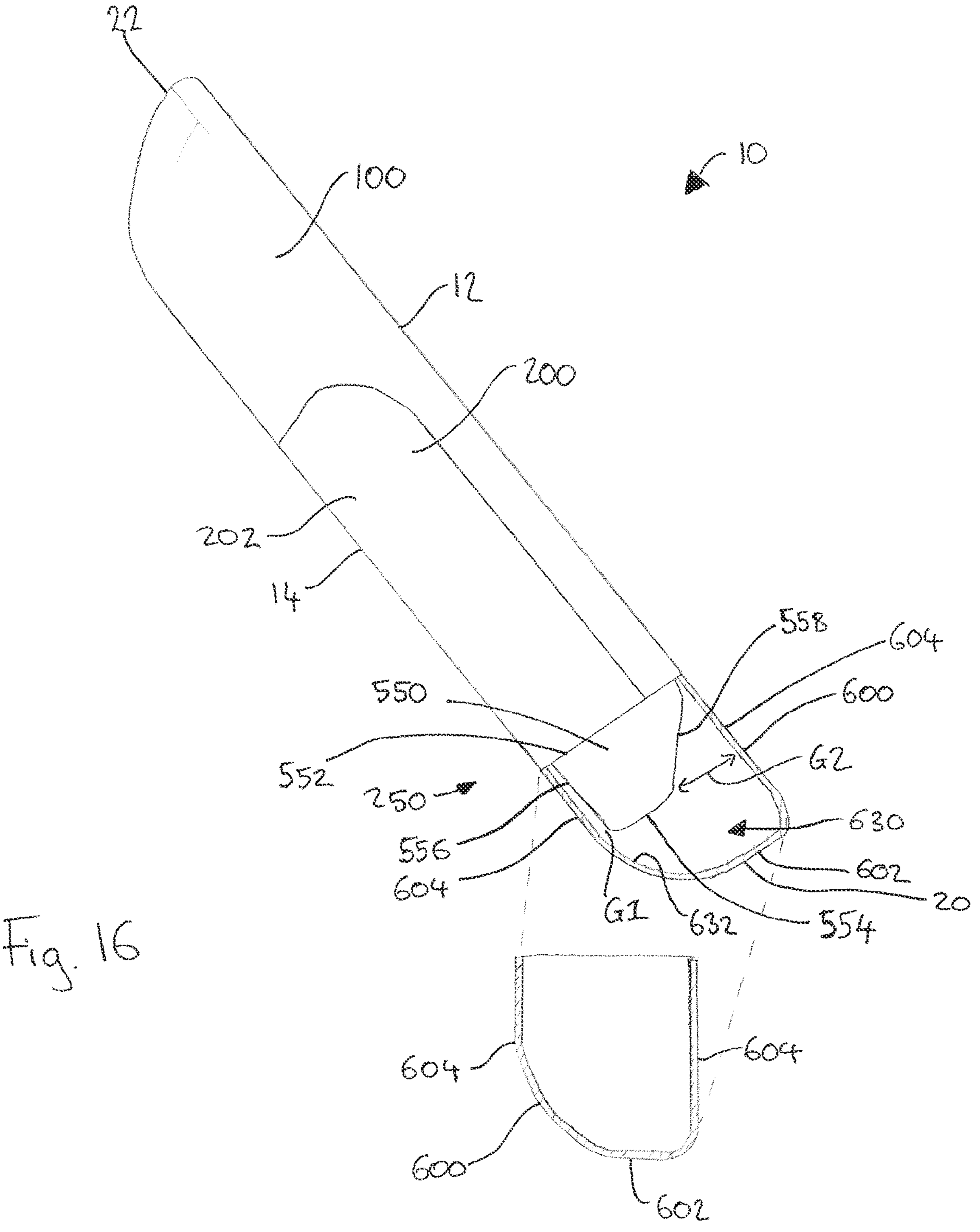
FIG. 16 shows the apparatus of FIG. 14 with the cap partially cut away.

FIG. 16 shows the apparatus 10, with the cap of 600 partially cut away and also indicates one non-limiting method of removing the cap, which is described in more detail below.

The cap 600 may be configured to connect to the cartridge 202 at the dispensing end 250 thereof so as to cover the dispensing end 250 and create a collection region 630 configured to receive and store drugs dispensed from the one or more dispensing mechanisms 300 of the cartridge 202. The cap 600 is movable between a first position in which the collection region 630 forms an enclosed cavity, and a second position (i.e., detached) in which the collection region 630 is exposed such that a user can access drugs contained therein.

In various embodiments, and similar to the cover 200, at least part of the cover or cap 600 in various embodiments may be made of a transparent or translucent material so that a user may see the drugs (e.g., pellets) deposited in the collection region 630 of the cover or cap 600. For example, at least the portion of the cap 600 corresponding to the upper and/or lower surface of the apparatus 10 may be transparent or translucent.

The funnel 550 may comprise an inlet end 552 configured to be placed over the outlet end and/or dispensing mechanism(s) 300 of the cartridge 202, so as to receive pellets that are dispensed therefrom. The funnel 550 may further comprise an outlet end 554 that is positioned at least partially within the collection region 630. In this manner, the funnel 550 may be configured to direct pellets from the cartridge 202 and into the collection region 630.

The funnel 550 tapers from the inlet end 552 to the outlet end 554, wherein the outlet end 554 may be offset or otherwise positioned so that pellets are directed into a specific portion of the collection region 630. For example, the outlet end 554 of the funnel 550 may be positioned adjacent and/or overlying the specific portion of the collection region 630.

The outlet end 554 of the funnel 550 may be biased towards a surface 632 of the collection region 630, which surface 632 may be positioned on the side of the cap 600 corresponding to the lower surface 14 of the apparatus 10, and/or may correspond to a side portion 604 of the cap 600 that itself forms part of the lower surface 14 of the apparatus 10. The specific portion may be a corner of the cap 600, a central region of the cap 600 or any other suitable portion as will be described in more detail below.

The funnel 550 may be configured so that pellets are directed into a bottom corner of the cap 600 (wherein the bottom corner comprises the surface 632 described above), which corner is positioned on the same side as the lower surface 14 of the apparatus 10. That is, the outlet end 554 of the funnel 550 may be positioned adjacent and/or overlying this corner or surface 632 of the cap 600.

The funnel 550 may be configured to allow a directed removal of the cap 600, such that a user is directed to remove the cap 600 in a certain direction. For example, and as shown in FIG. 16, the funnel 550 may comprise a lower surface 556 that is substantially parallel with an adjacent side portion 604 of the cap 600, and situated in close proximity to it. The funnel 550 may further comprise an upper surface 558 that is opposite the lower surface 556, wherein the upper surface 558 tapers away from the adjacent side portion 604 of the cap 600.

Accordingly, a relatively small gap G1 will be present between the outlet end 554 of the funnel 550 and the respective side portion 604 of the cap 600 on one side (in this case the lower surface 14 of the apparatus 10), and a relatively large gap G2 will be present between the outlet end 554 of the funnel 550 and the respective side portion 604 of the cap 600 on the other, opposing side (in this case the upper surface 12 of the apparatus 10).

As a result of this, a user will be directed to remove the cap 600 in a direction as shown in FIG. 14 using the dashed lines, since the large gap G2 means that it is easier to rotate the cap 600 in this direction. For example, if a user tried to rotate the cap 600 in the other direction, the side portion 604 of the cap 600 would meet the lower surface 556 of the funnel 550 very quickly and present an obstacle, making this more difficult.

The above features can combine to lower the chance that pellets dispensed into the collection region 630 are lost (e.g., spilled) as the cap 600 is removed. In the embodiment of FIGS. 14-16, for example, the funnel 550 is configured to direct pellets into the corner portion of the cap 600, whilst in addition a user is directed to remove the cap 600 with a downward motion that means this corner of the cap 600 is not inverted or moved upwards, which could cause loss of pellets in the process.

The cap 600 may be further optimized to facilitate the pouring of pellets therefrom, and in various embodiments may have certain features that assist in this action as described below.

Figure 17:
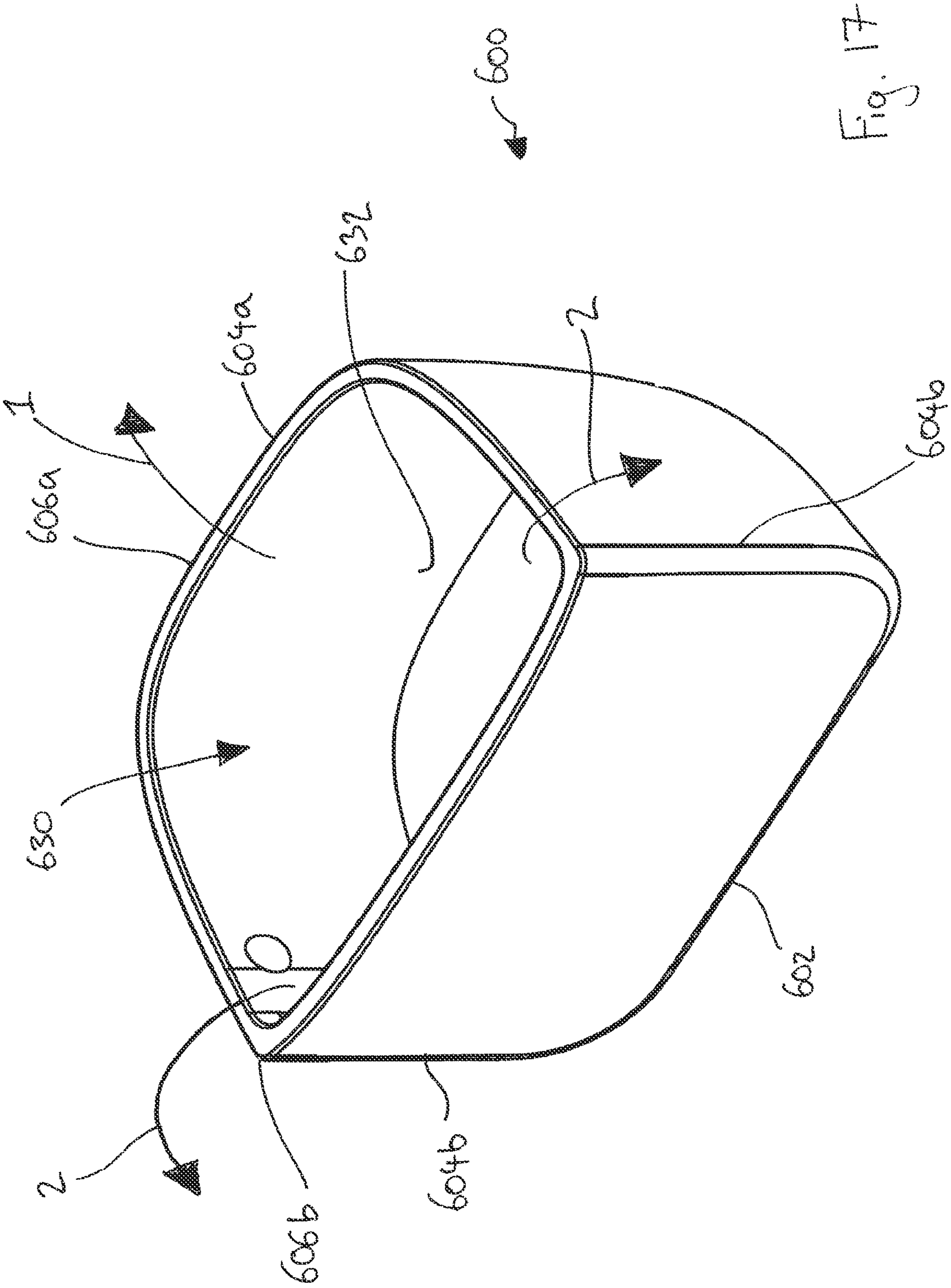
FIG. 17 shows an embodiment of a cap for use in the apparatus of FIG. 14, which comprises a number of features that facilitate the pouring of pellets in a targeted manner.

FIG. 17 shows an embodiment of a cap 600 that comprises a number of features that facilitate the pouring of pellets in a targeted manner. The cap 600 may comprise a lower surface 604*a* that corresponds to a lower surface 14 of the apparatus 10. The lower surface 604*a* may be located on the opposite side of the respective side portion 604 to the surface 632 described above. In various embodiments, the lower surface 604*a* may be curved, such that the side portion 604 of the cap 600 corresponding to the lower surface 604*a* is convex, e.g., bulges in a direction away from the interior and/or collection region 630 of the cap 600. This provides a first pouring lip 606*a* of the cap 600 that facilitates a user pouring pellets from the cap 600 as indicated by arrow 1.

The cap 600 may comprise corner portions 604*b* located on the side portions 604 of the cap 600 corresponding to the upper surface 12 of the apparatus 10. These corner portions 604*b* may provide separate (but identical) pouring lips 606*b* of the cap 600 that are opposite the pouring lip 606*a* formed by the lower surface 604*a*. Since the pouring lips 606*b* involve the sharp corners of the cap 600, they may be used for more targeted pouring of pellets than the wider pouring lip 606*a*, as indicated by arrows 2.

Other arrangements are envisaged wherein one or more pouring lips are provided on the cap 600 by manipulating the one or more side portions 604 thereof. Any suitable shape of the side portions 604 may be used as will be appreciated by a person of skill in the art.

The curved nature of the cap 600 as shown in FIGS. 16 and 17 (and onwards) can assist in providing a self-righting feature. The cap 600 comprises, in various embodiments, a flat base 602 that is configured such that the cap 600 can remain at rest when positioned on the flat base. In addition to this, the cap 600 may comprise a curved side portion 604*a* that extends from the base 602 to the upper rim 608 of the cap 600. The flat base 602 allows the cap 600 to be stable when placed on a table, whilst the curved rear side portion 604*a* of the cap extending from the base 602 to the rim 608 acts to ensure the cap always sits vertically on a table, no matter the angle that the user places it down (unless placed on the substantially flat side portion at the front). When the user removes the cap, they can place the cap down on any portion of the curved rear face, and the cap will self-right, without spilling pellets. The weight of the pellets in the collection region may be used to assist this self-righting feature and/or the base portion 602 may itself be weighted to assist this functionality (although this is not essential).

Figure 18:
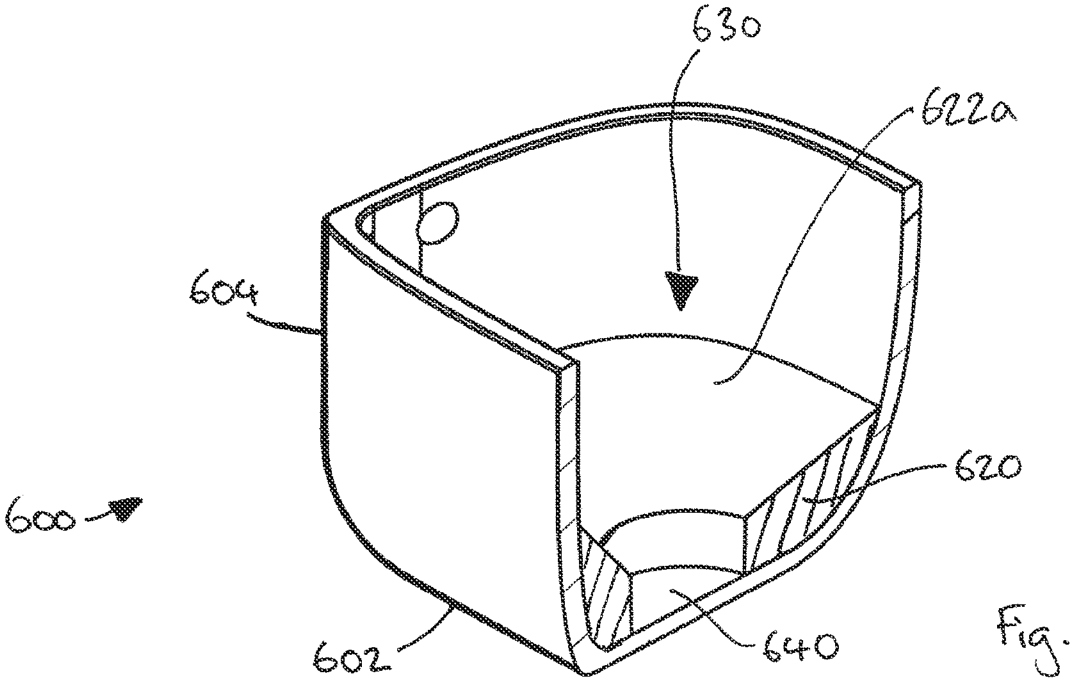
FIGS. 18 and 19 show embodiments of a cap that comprise one or more inserts or solid portions configured to direct pellets into a specific portion of the cap.
Figure 19:
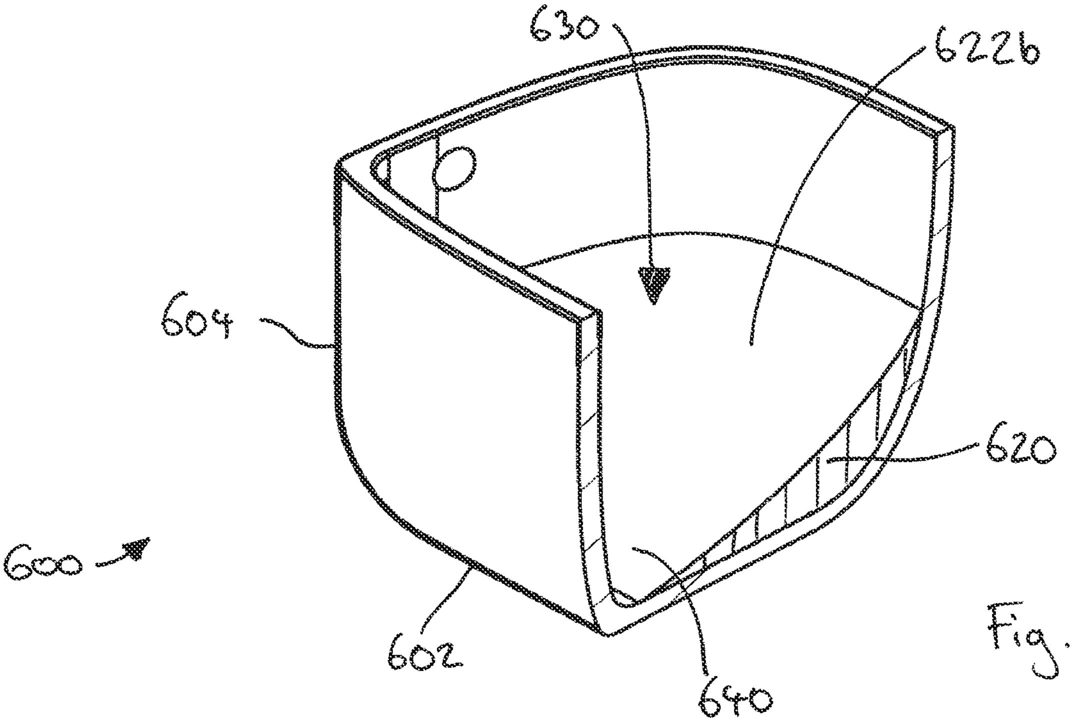

FIGS. 18 and 19 show embodiments of a cap 600 that comprise one or more inserts or solid portions 620 configured to direct pellets into a specific portion 640 of the cap 600 and/or collection region 630. In various embodiments a funnel 550 as described above may be used, wherein the outlet end 554 is positioned so that pellets are directed predominantly into the specific portion 640 of the collection region 630. For example, the outlet end 554 of the funnel 550 may be positioned adjacent and/or overlying the specific portion 640 of the collection region 630. The outlet end 554 of the funnel 550 may be biased towards the specific portion 640 of the collection region 630.

The specific portion 640 may correspond to a region or portion of the cap 600 in which pellets are configured to pool or gather as they fall into the cap 600 (e.g., when it is upright). One or more surfaces (e.g., a tapered surface(s) 622) of the inserts or solid portions 620 may lead to the specific portion 640.

Various suitable geometries could be used in connection with the one or more inserts or solid portions 620, which could depend on pellet size and the required pouring characteristics (e.g., for different users). The one or more inserts 620 may be provided in modular form, so that a user or manufacturer could select a plurality of different inserts that provide the most practical pouring technique for all users. In various embodiments the steepness of one or more surfaces of the one or more inserts or solid portions 620 could be varied or tailored for specific requirements. In addition, or a location of the specific portion 640, curvature of the one or more surfaces (e.g., the tapered surface(s) 622), height or thickness of the insert or solid portion 620 could be varied.

In various embodiments the one or more inserts or solid portions 620 may comprise one or more of contours, protrusions, bump, ridges, cavities, embossments, etc., which may be configured to direct or channel pellets towards the specific portion 640.

In the embodiment of FIG. 18, the insert 620 comprises a tapered surface 622*a* that forms a bowl leading from the outer periphery of the cap 600 to the specific portion 640, which in this case may be provided in the form of a cylindrical cavity at the bottom of the cap 600 (although it could be formed simply by a bottom of the bowl). In use, as pellets are dispensed into the cap 600 they will be directed into the collection region 630, where they will then fall down the tapered surface 622*a* if necessary and be directed towards and into the specific portion 640.

In the embodiment of FIG. 19, the insert 620 also comprises a tapered surface 622*b*, although in this case the tapered surface 622*b* forms a slope or slide leading from the outer periphery of the cap 600 at one side thereof and down to a specific portion 640 of the cap 600 at the opposing side thereof, which is also at the bottom of the cap 600. In use, therefore, as pellets are dispensed into the cap 600 they will be directed into the collection region 630, where they will then fall down the tapered surface 622*b* if necessary and be directed towards and into the specific portion 640.

Of course, many other arrangements of insert are envisaged that could be configured to direct pellets into a specific portion similar to the embodiments described in respect of FIGS. 18 and 19. These will typically include some sort of tapered surface as shown in respect of those embodiments that may lead from an outer periphery of the cap 600 to the specific portion 640. Using an insert as described herein may facilitate the collection of doses of pellets (e.g., relatively small doses) into a more concentrated area. This can improve the visibility of the pellets for a user so that they can then subsequently direct pellets into their mouth or elsewhere more easily.

It is further envisaged that an insert or solid portion may be used to create a funneling effect during pouring of the pellets from the cap 600. For example, an insert or solid portion of the cap 600 could be shaped so as to direct pellets contained within the collection region 630 to one or more of the pouring lips, for example a pouring lip 606*a*, 606*b* as described above. The skilled person could envisage how an insert or solid portion may be configured in this manner, for example an insert or solid portion could provide a channel or valley for pellets that leads from the collection region to one or more of the pouring lips.

Figure 20B:
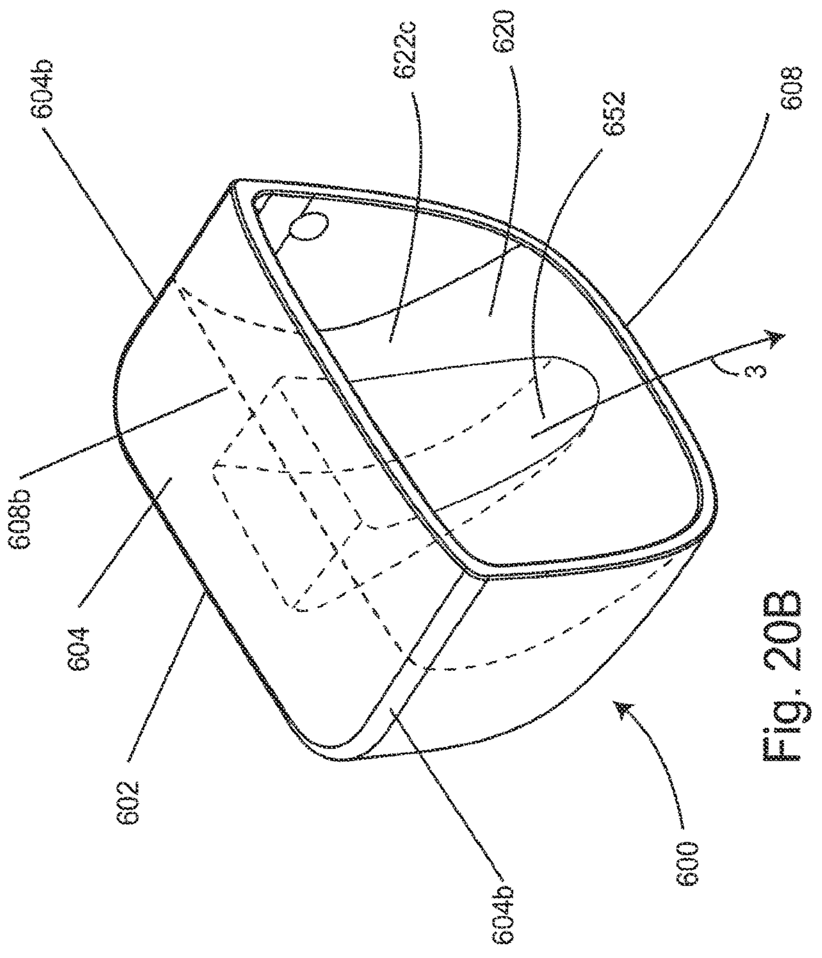
FIGS. 20A and 20B show a further embodiment of a cap that comprises solid portion or insert.
Figure 20A:
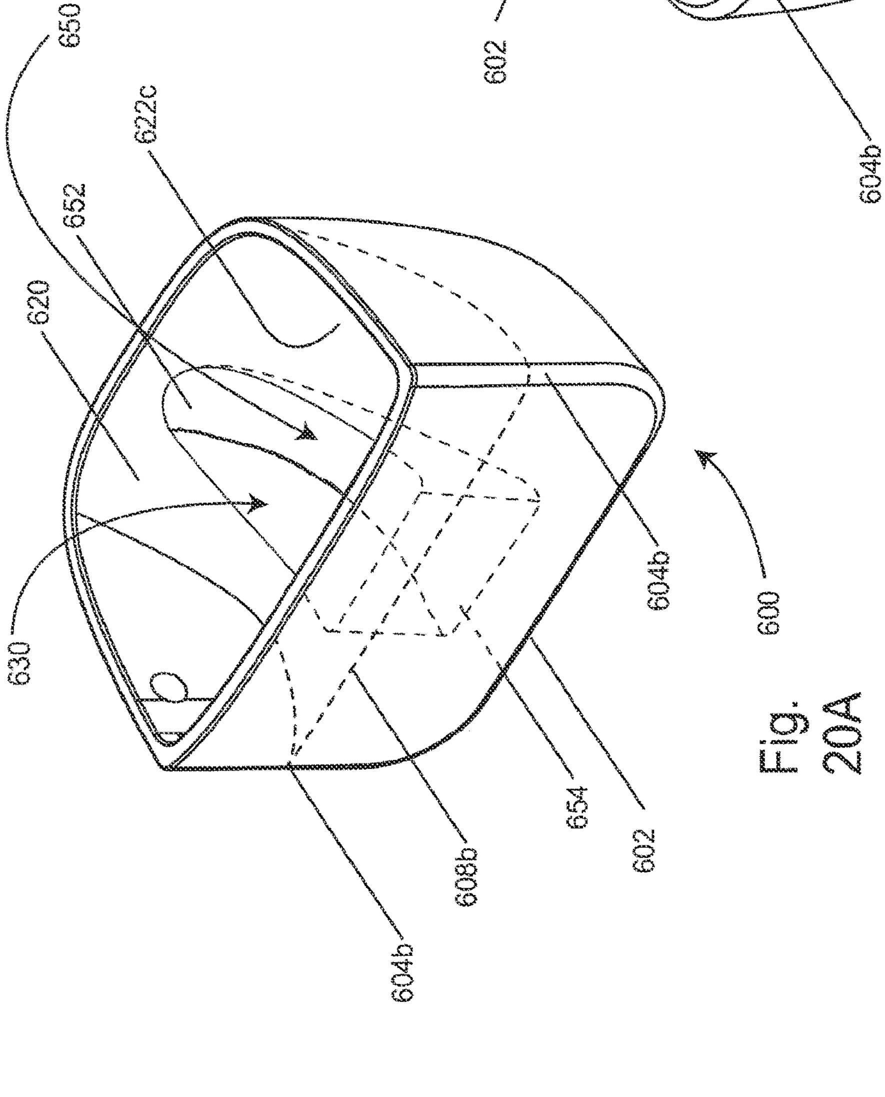

FIGS. 20A and 20B show an embodiment of a cap 600 that comprises solid portion or insert 620 comprising a tapered surface 622*c* that is similar to the tapered surface 622*b* of FIG. 19, except that it is steeper and extends from a portion of an upper rim 608 (which may correspond to the pouring lip 606*a* referred to above) of the cap 600 and slopes down to an opposing side portion 604 that extends between two corner portions 604*b*. The tapered surface 622*c* may meet the opposing side portion 604 roughly halfway along the height of the side portion 604, as indicated at 608*b*.

In this embodiment the cap 600 further comprises a cavity 650 located within the insert 620 and tapered surface 622*c*, such that it forms a depression in the tapered surface 622*c* towards the base 602 of the cap 600. The cavity 650 is shaped so as to form a collection region 630 at a base 654 thereof, wherein the tapered surface 622*b* is configured to direct pellets into the cavity 650 as they are dispensed into the cap 600. The cavity 650 itself increases in size as one moves from the top (e.g., the rim 608) of the cap 600 to the base 602 of the cap 600, and itself comprises a sloping surface 652 configured to direct pellets to the base 654 of the cavity 650 once they enter the cavity 650, e.g. from the tapered surface 622*b*.

The features of this embodiment mean that the cap 600 can be inverted, as shown in FIG. 20B, such that cavity 650 itself becomes a pouring lip, with the sloping surface 652 of the cavity 650 forming a slide that direct pellets out of the cap 600 in a directed fashion, as indicated by arrows 3.

The insert or solid portion (e.g., the insert 620 shown in FIG. 19) may be configured to direct pellets to a front portion of the cap 600, for example a portion (e.g., a side portion 604) of the cap located towards or forming the upper surface 12 of the apparatus 10. This may facilitate a user seeing that a dose has been dispensed as the pellets will be located closer to them once dispensed.

Figure 21A:
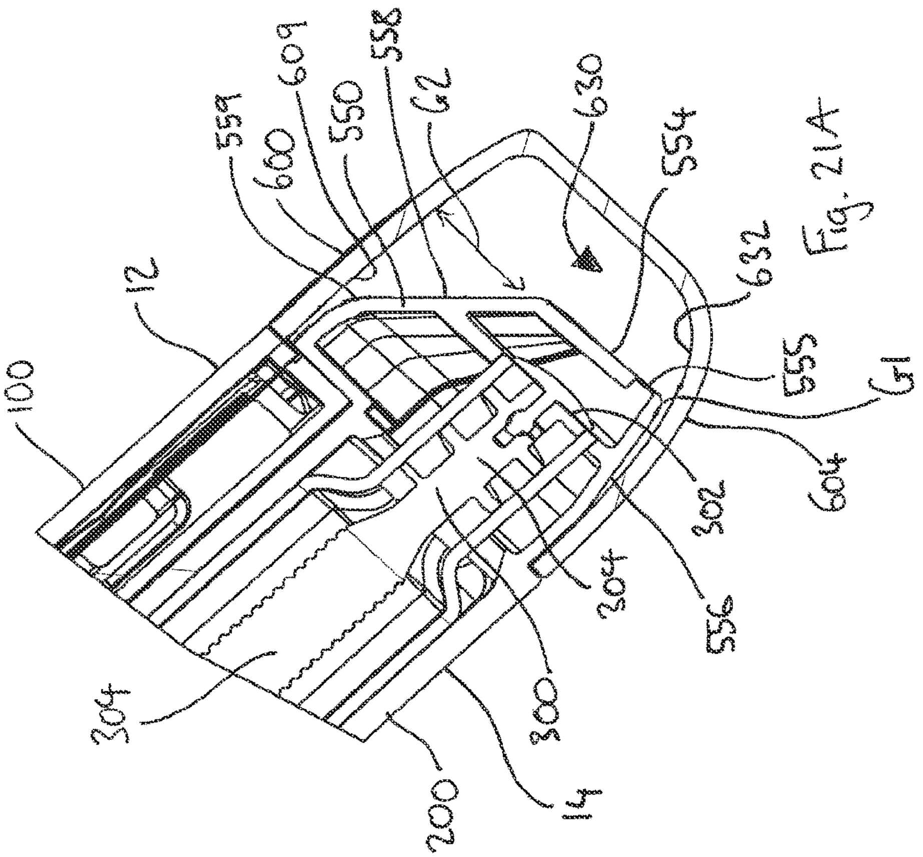
FIG. 21A shows a cross-section of the lower end of the apparatus of FIG. 14 in its assembled state.
Figure 21:
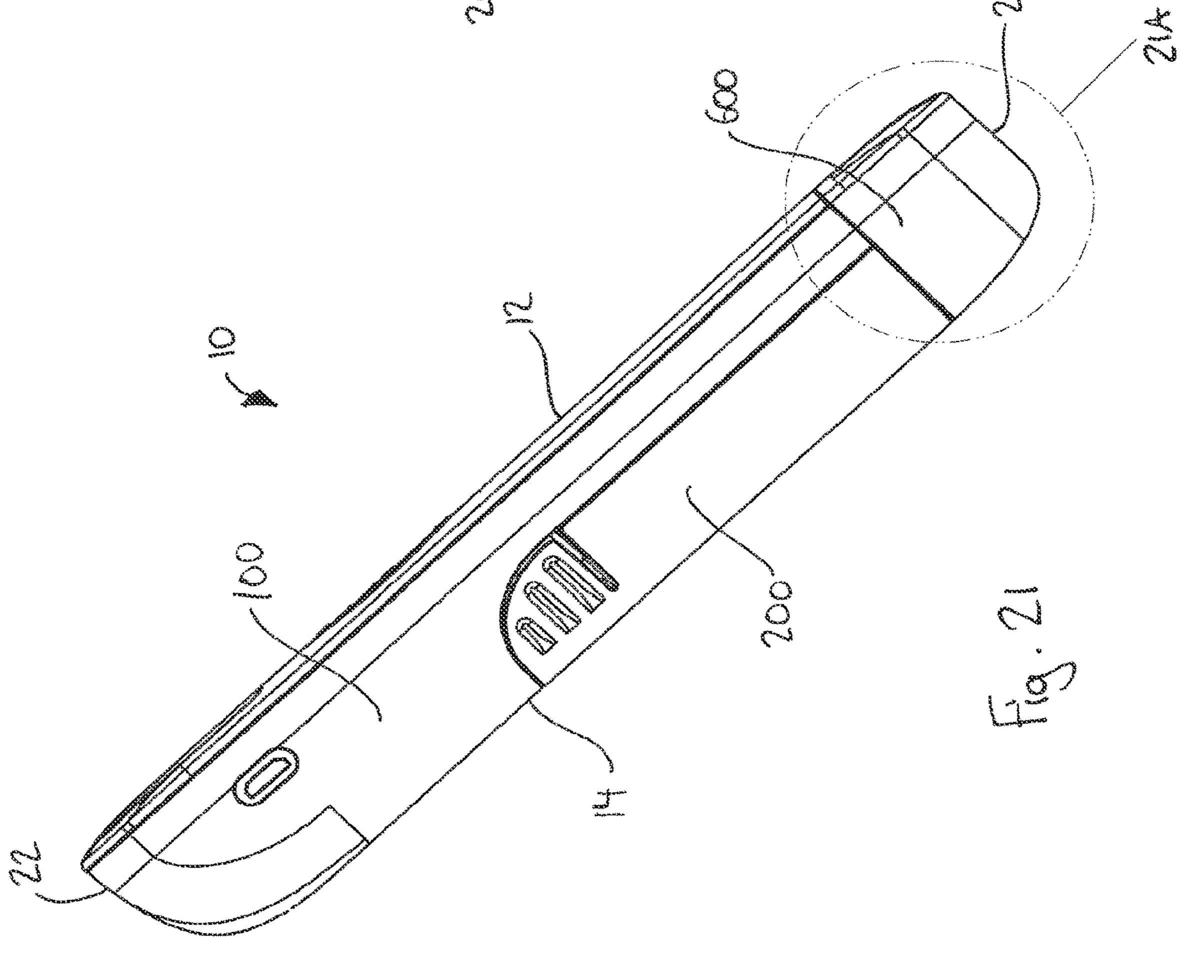

FIG. 21 shows a side view of the apparatus 10 including a cap 600 when fully assembled and showing the cartridge assembly 200 connected to the control unit 100, and the cap 600 placed over both the control unit 100 and cartridge assembly 200 to form the collection region 630 in the form of an enclosed cavity within the cap 600 as described above.

FIG. 21A shows a cross-section of the lower end of the apparatus 10 in its assembled state, and showing the funnel 550 that direct pellets from the dispensing mechanism 300 of the cartridge assembly 200 into the collection region 630 of the cap 600. The dispensing mechanism 300 comprises a screw pump 304 as discussed above, which is configured to transport pellets from within the cartridge assembly 200 to an outlet 302 thereof. The funnel 550 comprises an outlet end 554 as described above having an aperture 555 that is situated adjacent to a surface 632 that is positioned on the side of the cap 600 corresponding to the lower surface 14 of the apparatus 10, and/or may correspond to a side portion 604 of the cap 600 that itself forms part of the lower surface 14 of the apparatus 10.

The predominant direction of removal of the cap 600, as described above in respect of FIG. 16, can provide a simple mechanism for using the cap, which can be appreciated by studying FIGS. 21 and 21A.

A rolling pivot may be provided between the cap 600 and the funnel 550. For example, the funnel 550 may comprise a curved surface 559 and the cap 600 may be configured to roll over the curved surface 559 as it is removed (e.g., in the predominant direction of removal described above). In the illustrated embodiment, the upper surface 558 of the funnel 550 comprises a curved portion 559 adjacent an opposing inside surface 609 of the cap 600. As the cap 600 is removed the inside surface 609 thereof is configured to roll over and/or across the curved portion 559 of the funnel 550, which can create a ramp to gently rotate the cap 600 to an open position. The use of a rolling pivot or curved surface lowers the chances of a jerky opening, which can leads to pellets being lost through spillage.

It should also be noted that the funnel 550 can aid in the replacement of the cap 600, by ensuring that the cap 600 aligns properly with the remainder of the apparatus 10 as it is being connected thereto.

Figure 22:
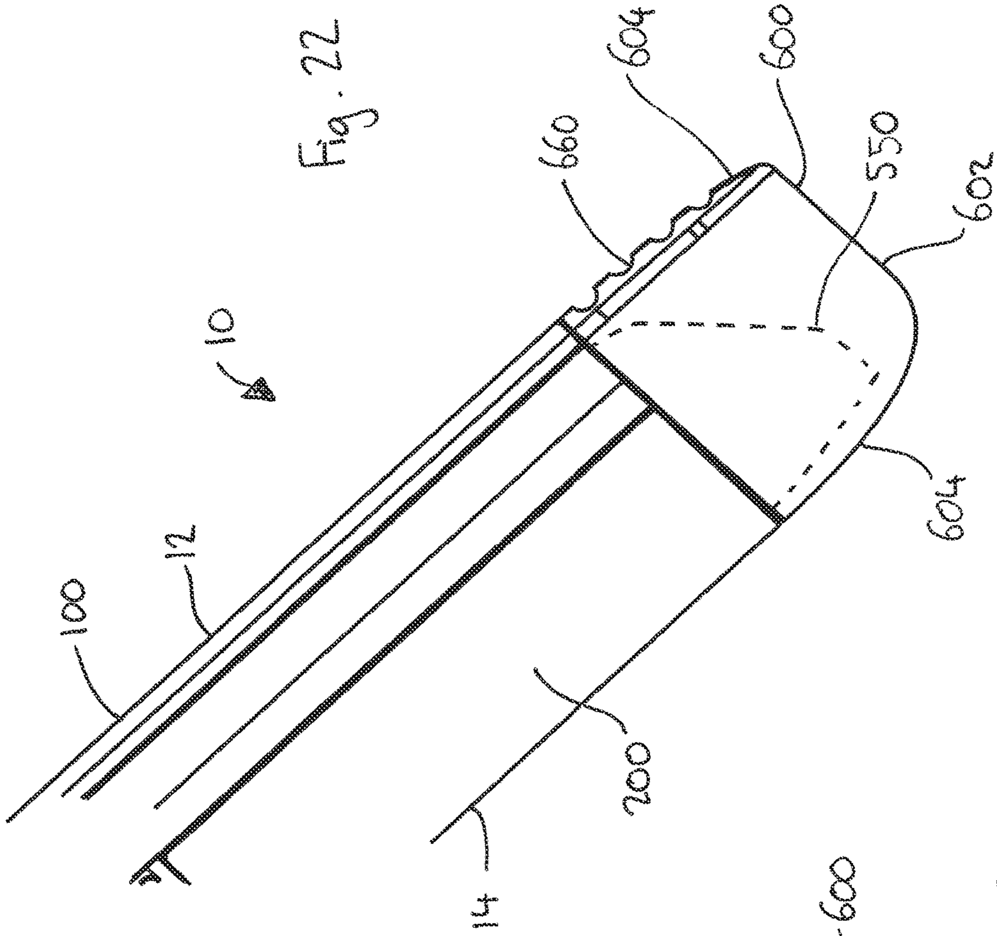
FIGS. 22 and 22A show an embodiment of a cover for use with the apparatus of FIG. 14 that includes a tactile area or surface.
Figure 22A:
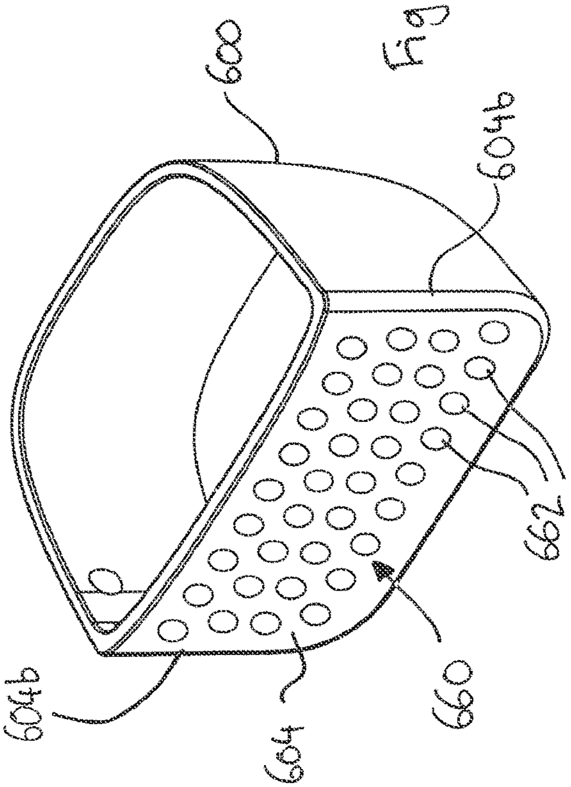

FIGS. 22 and 22A show an embodiment of a cap 600 that is similar to those described above, but comprises a tactile area 660 as part of or on an outer surface thereof. In the illustrated embodiment, the tactile area 660 is provided as a textured surface on one of the side portions 604 of the cap 600, and in particular on the side portion 604 that forms part of the upper surface 12 of the apparatus 10, which corresponds to the side portion 604 that extends between the two corner portions 604*b*. As shown in FIG. 22A, the tactile area 660 may be formed from a plurality of cavities 662, but any suitable texture may be provided that provides a tactile sensation for a user. For example, the tactile area 660 may be provided by protrusions or dimples.

The tactile area 660 may be used to improve a user's grip as they manipulate the cap 600, for example as shown and described above, such as in respect of FIG. 16. The tactile area 660 may also provide a visual cue to a user, for example to signify that they should interact with that part of the apparatus 10 in order to remove the cap 600 as aforesaid. Finally, using a tactile area 660 may improve the ability of the apparatus 10 to withstand wear and tear during use, for example to disguise scuffs or scratches.

As shown in the illustrated embodiment, the tactile area 660 may be applied only to the side portion 604 of the cap 600 that forms part of the upper surface 12 of the apparatus 10. This can help to indicate to a user that they should push on this region of the cap 600 in order to remove the cap 600 as described above, e.g., in respect of FIG. 16.

Figure 23:
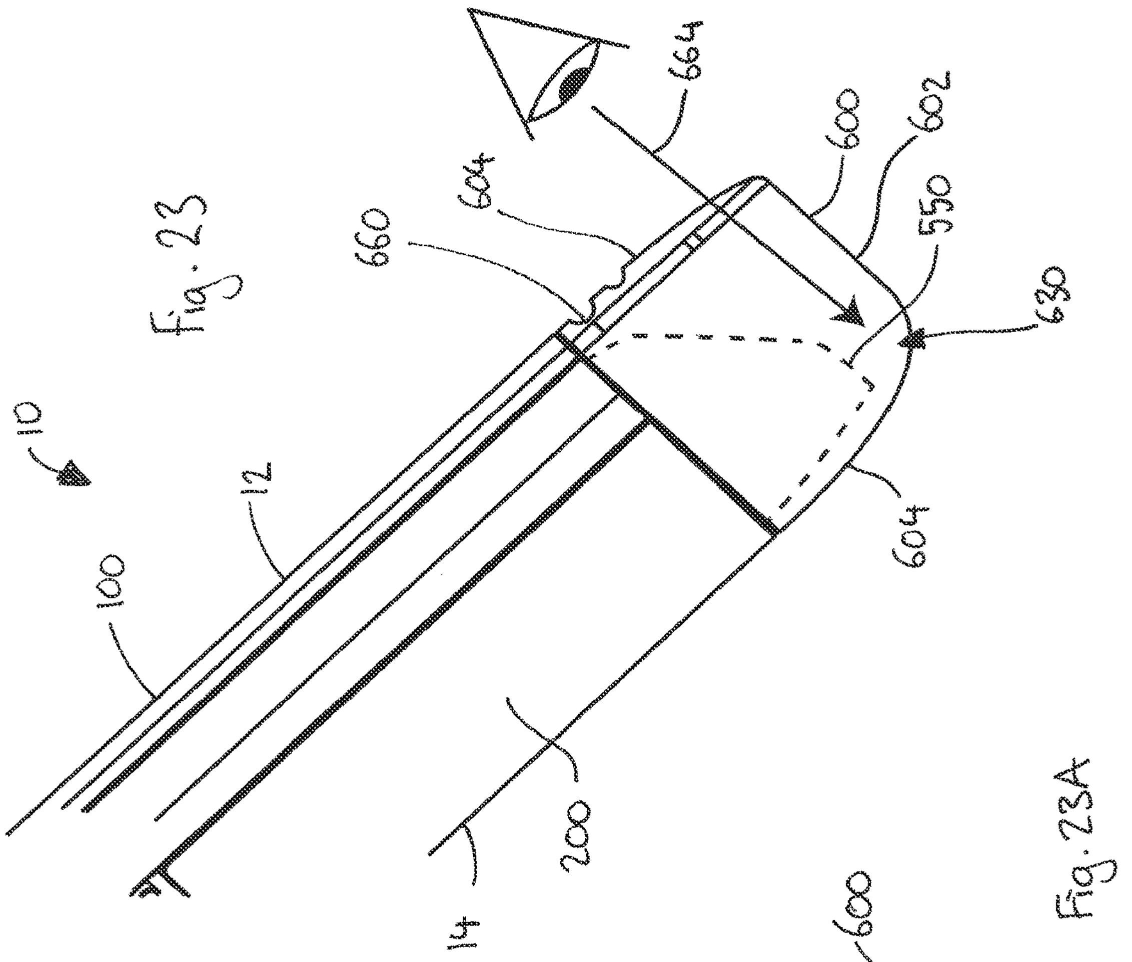
FIGS. 23, 23A, 24, 24A, 25 and 26 show various embodiments of the tactile surface described in respect of FIGS. 22 and 22A.
Figure 23A:
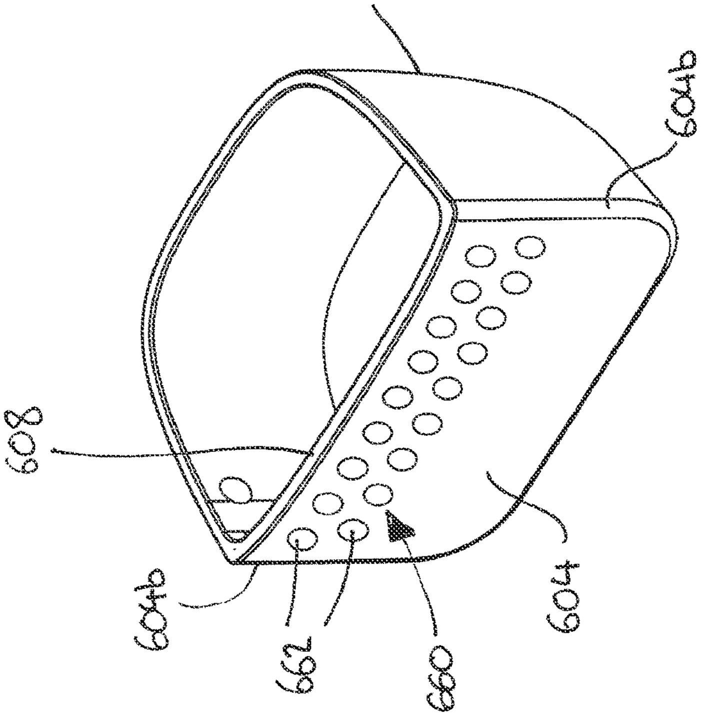

FIGS. 23 and 23A show a slight variation of the embodiment shown in FIGS. 22 and 22A, in which the cap 600 comprises a tactile area 660 only on about half of the side portion 604 that forms part of the upper surface 12 of the apparatus 10. More specifically, the tactile area 660 may be located adjacent the upper rim 608 and may only extend about halfway along the side portion 604 from the upper rim 608. This can provide a more specific indication to a user regarding where to push on the cap 600 in order to remove it.

These embodiments may be combined with those in which the cap 600 (or at least the side portion 604 that forms part of the upper surface 12 of the apparatus 10) is provided as transparent or translucent, in which case positioning the tactile area 660 on this portion of the cap 600 would mean that a user is able to easily view drugs (e.g., pellets) that are dispensed into the collection region 630 of the cap 600. This is indicated by the arrow 664 in FIG. 23.

Figure 24:
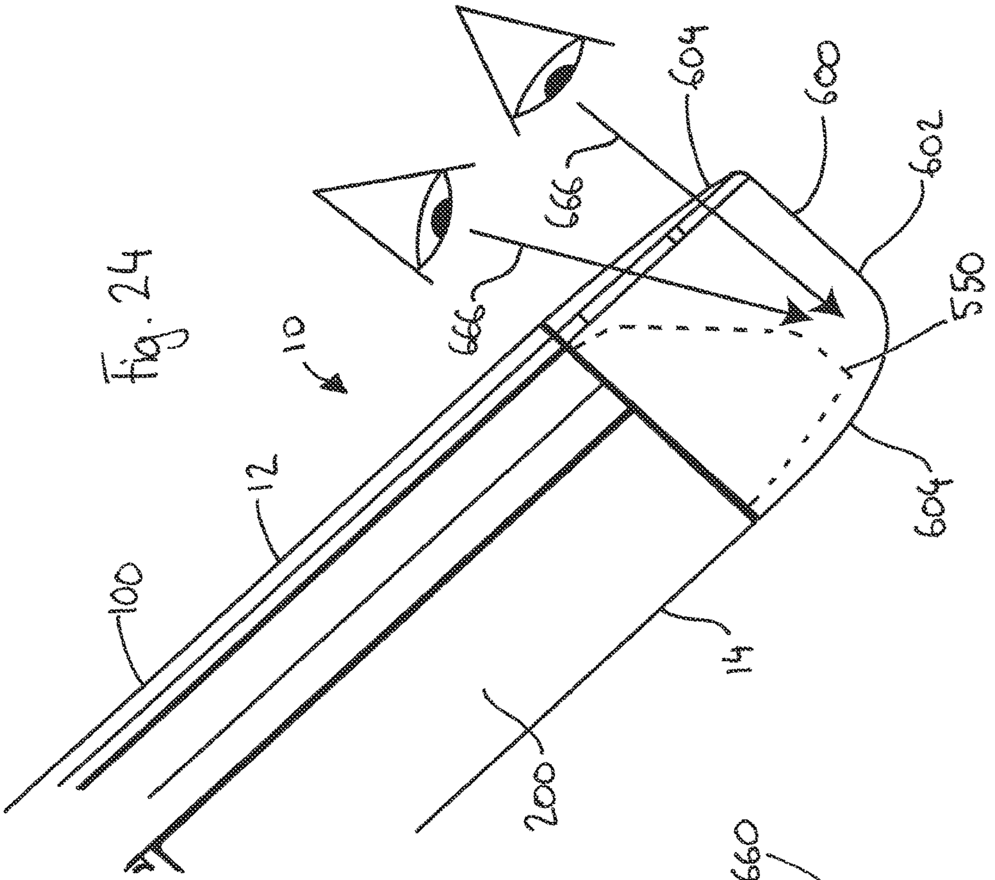
Figure 24A:
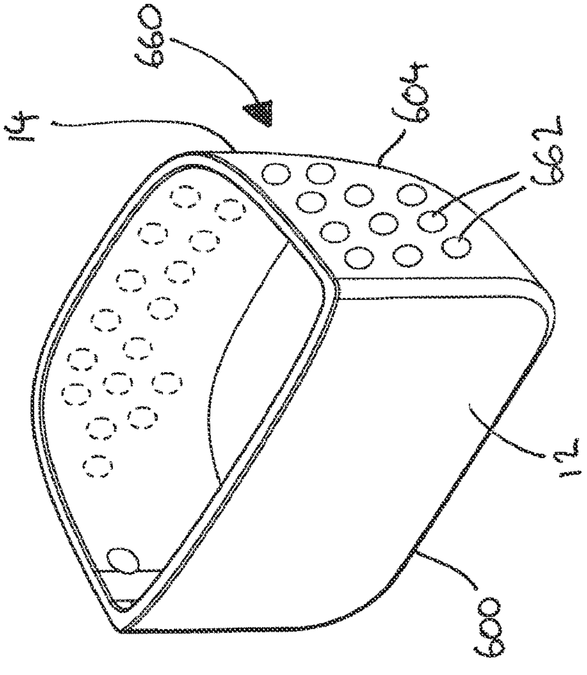

FIGS. 24 and 24A show a further variation on the embodiment shown in FIGS. 22 and 22A, in which the cap 600 comprises a tactile area 660 on a side portion 604 of the cap 600 that forms part of the lower surface 14 of the apparatus 10. The side portion 604 of the cap 600 forming part of the upper surface 12 of the apparatus 10 may be plain, e.g., kept free of any surface variations. By providing the tactile area 660 on this portion of the cap 600, a user may still achieve an improved grip of the cap 600, but the upper surface 12 of the apparatus 10 would be more visually appealing.

In addition, when combined with embodiments in which the cap 600 (or at least the side portion 604 that forms part of the upper surface 12 of the apparatus 10) is transparent or translucent, positioning the tactile area 660 on this portion of the cap 600 would mean that a user is able to very easily view drugs (e.g., pellets) that are dispensed into the collection region 630 of the cap 600. This is indicated by the arrows 666 in in FIG. 23.

Figure 26:
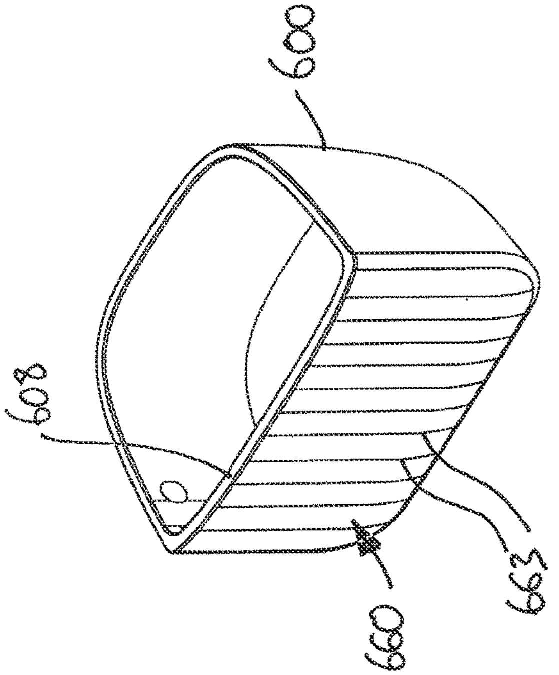
Figure 25:
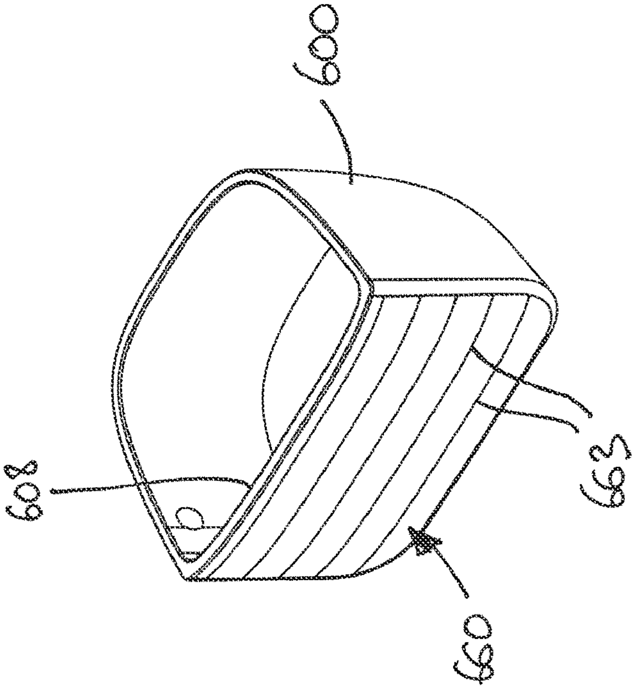

Alternatively, or additionally to the texture shown in FIGS. 22A, 23A and 24A, the tactile surface 660 may comprise ridges or stripes 663 on an outer surface of the cap 600, which may be any of the services described above with reference to the tactile surface 660 in the form of cavities 662. Horizontal ridges 663 (e.g., parallel to the upper rim 608 of the cap 600) are shown in FIG. 25, while vertical ridges 663 (e.g., perpendicular to the upper rim 608 of the cap 600) are shown in FIG. 26. Horizontal ridges may provide an improved grip, since they would more easily allow a user to remove the cap 600 as described above. Vertical ridges may be easier to manufacture (e.g., through injection molding) and more visually appealing given the aspect ratio of the apparatus 10 as a whole.

Figure 27A:
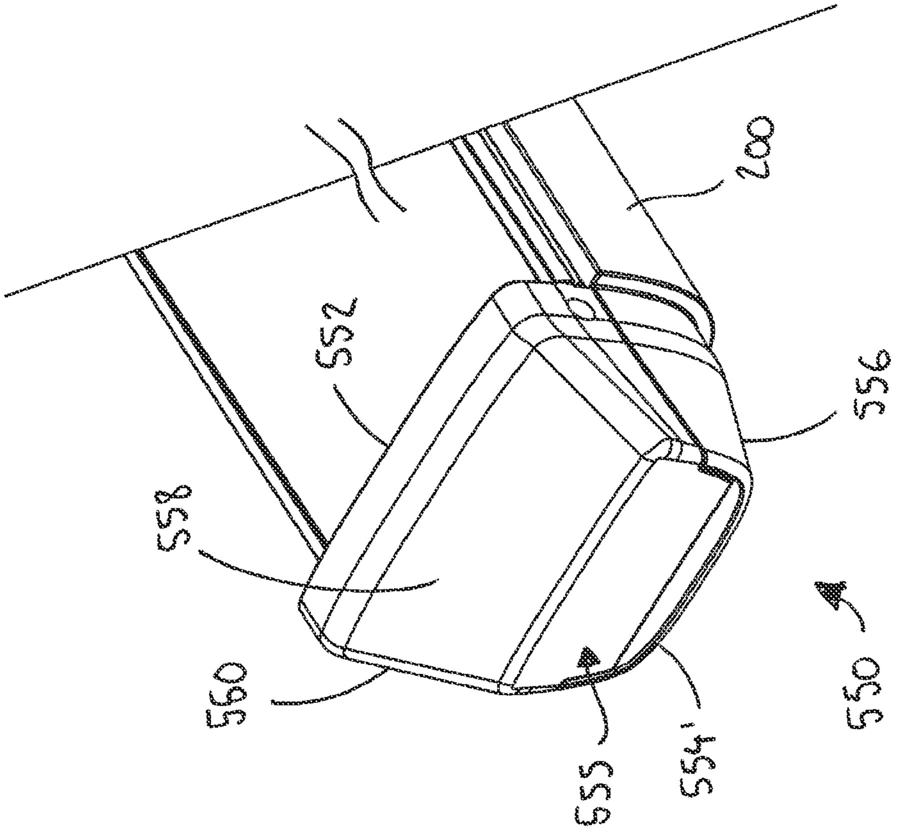
FIGS. 27A and 27B show an embodiment of a funnel for use with the apparatus of FIG. 14.
Figure 27B:
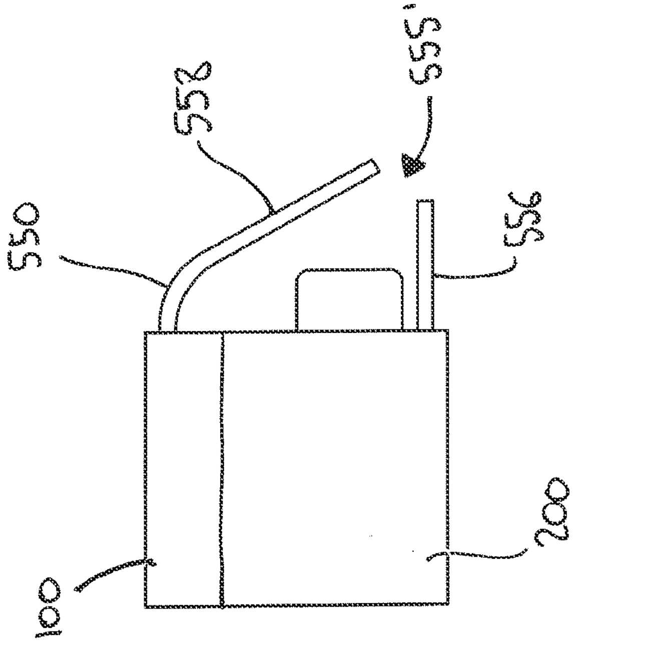

FIGS. 27A and 27B show a slight variation on the funnel 550 that is shown in FIG. 21A. The funnel 550 of FIGS. 27A and 27B comprises an inlet end 552 configured to be placed over the outlet end and/or dispensing mechanism(s) 300 of the cartridge 202, so as to receive pellets that are dispensed therefrom. The funnel 550 further comprises a modified outlet end 554' that may be positioned at least partially within the collection region 630 of the cover 600. As with the funnel 550 shown in FIG. 21A, the funnel 550 of this embodiment may be configured to direct pellets from the cartridge 202 and into the collection region 630. In this embodiment the outlet end 554' is completely open, such that a larger aperture 555' is provided for directing pellets from the cartridge 202 into the collection region 630.

The funnels 550 described herein may be modified in order to provide a controlled fallout of pellets from the cartridge 202 into the collection region 630. For example, one or more screens may extend across the outlet end 554 (or 554') of the funnel 550, wherein the one or more screens may be configured to catch pellets dispensed from the cartridge 202 and temporarily arrest them before they are dispensed into the collection region 630.

Figure 28:
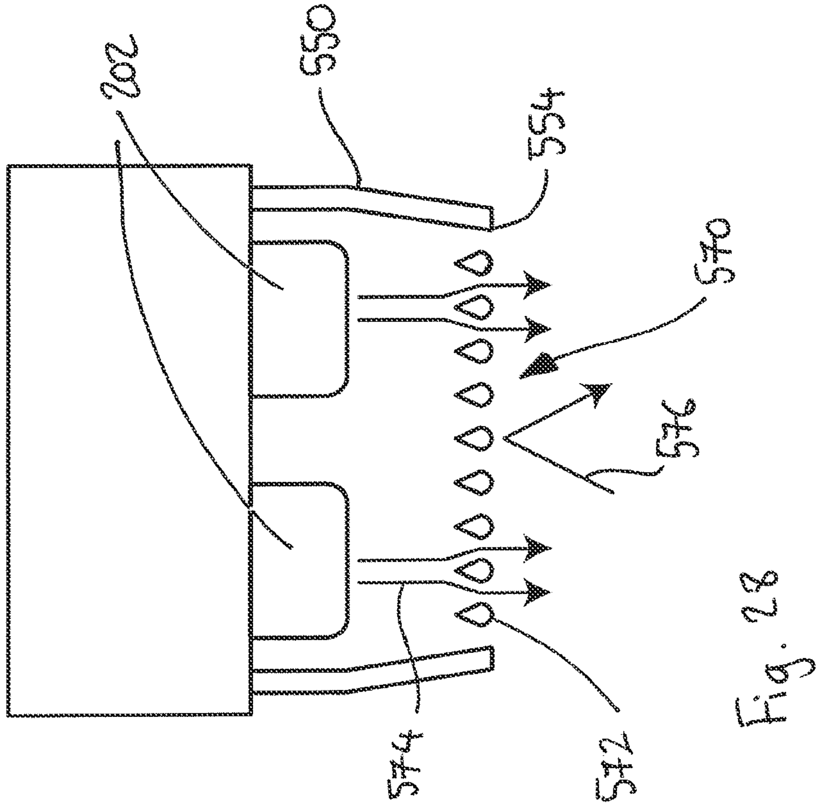
FIG. 28 shows an embodiment of the funnel of FIGS. 27A and 27B having a screen in the form of a grill for controlling the release of pellets from the funnel.

FIG. 28 illustrates an embodiment of a funnel 550 incorporating a screen in the form of a grill 570, which comprises a plurality of bars 572 that catch pellets dispensed from the dispensing mechanism of a cartridge 202, then temporarily arrest the pellets before they are further dispensed from the funnel 550 into the collection region 630. That is, pellets will fall out of the cartridge 202, become captured or arrested (e.g., slowed down) between two bars 572, before moving through and past the bars 572 into the collection region 630. The distance between the bars 572 (e.g., the smallest distance) may be slightly larger than a diameter of the pellets.

The bars 572 may be teardrop shaped, as shown in FIG. 28, wherein the pointed edge of the teardrop faces the dispensing mechanism of a cartridge 202 in use. This can aid in the ability of the grille 570 to perform its function of catching pellets that are dispensed from the dispensing mechanism for onward transmission through the grille 570 (arrow 574), whilst inhibiting pellets from re-entering the funnel 550 (arrow 576).

Providing a screen as described above, and in particular a grill 570 as shown in FIG. 28 can help protect the dispensing mechanism of the cartridge 202 from tampering (by reducing the ability of a user to access the interior of the funnel 550). In addition, especially when combined with the modified outlet end 554' that is completely open, a large region is provided for the pellets to fall through as they are dispensed, whilst providing a mechanism for controlling the dispensing of the pellets.

The one or more screens may be configured such that pellets are more inclined to fall through the screen in a first, dispensing direction (see arrow 574 in FIG. 28), and less inclined to fall through the screen in a second, non-dispensing direction (see arrow 576 in FIG. 28).

Figure 29A:
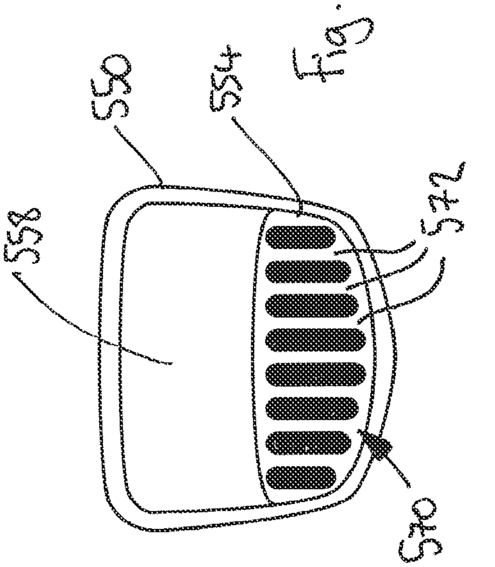
FIGS. 29A-D show various embodiments of the screen, including alternatives to the grill of FIG. 28.

The one or more screens may be provided in any suitable form, as shown in FIGS. 29A-D, in which FIG. 29A shows the funnel 550 of FIG. 28 in isolation and schematically illustrating the bars 572, which may extend vertically from one side of the outlet end 554 to the other side.

Figure 29B:
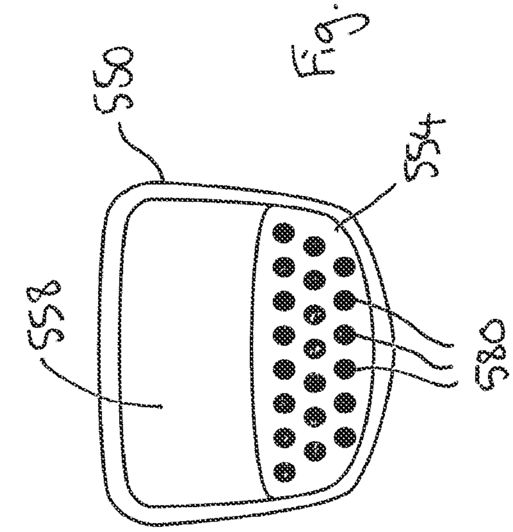

FIG. 29B shows the funnel 550 incorporating a screen located over the outlet end 554 of the funnel 550 and comprising a plurality of apertures 580, wherein the apertures 580 may comprise a diameter that is slightly larger than a diameter of the pellets held within the cartridge 202 and being dispensed from the dispensing mechanism.

Figure 29D:
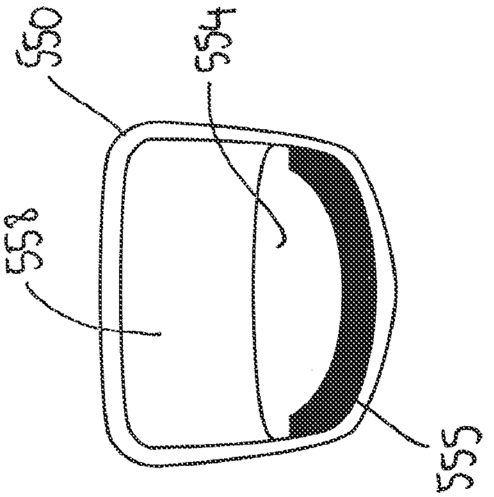
Figure 29C:
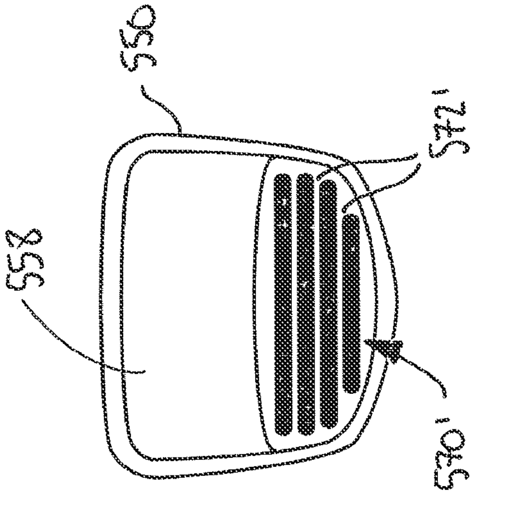

FIG. 29C shows the funnel 550 incorporating a screen located over the outlet end 554 of the funnel 550 and comprising a grill 570' similar to that of FIG. 29A, except that the bars 572' of the grille 570' extend horizontally across the outlet end 554.

FIG. 29D shows the funnel 550 incorporating a simple aperture, which may be similar to the aperture 555 as shown in FIG. 21A, wherein the aperture 555 may be in the form of a curved slit, wherein the lateral width (i.e., transverse to the longitudinal axis of the slit) is slightly larger than a diameter of the pellets held within the cartridge 202.

Figure 30A:
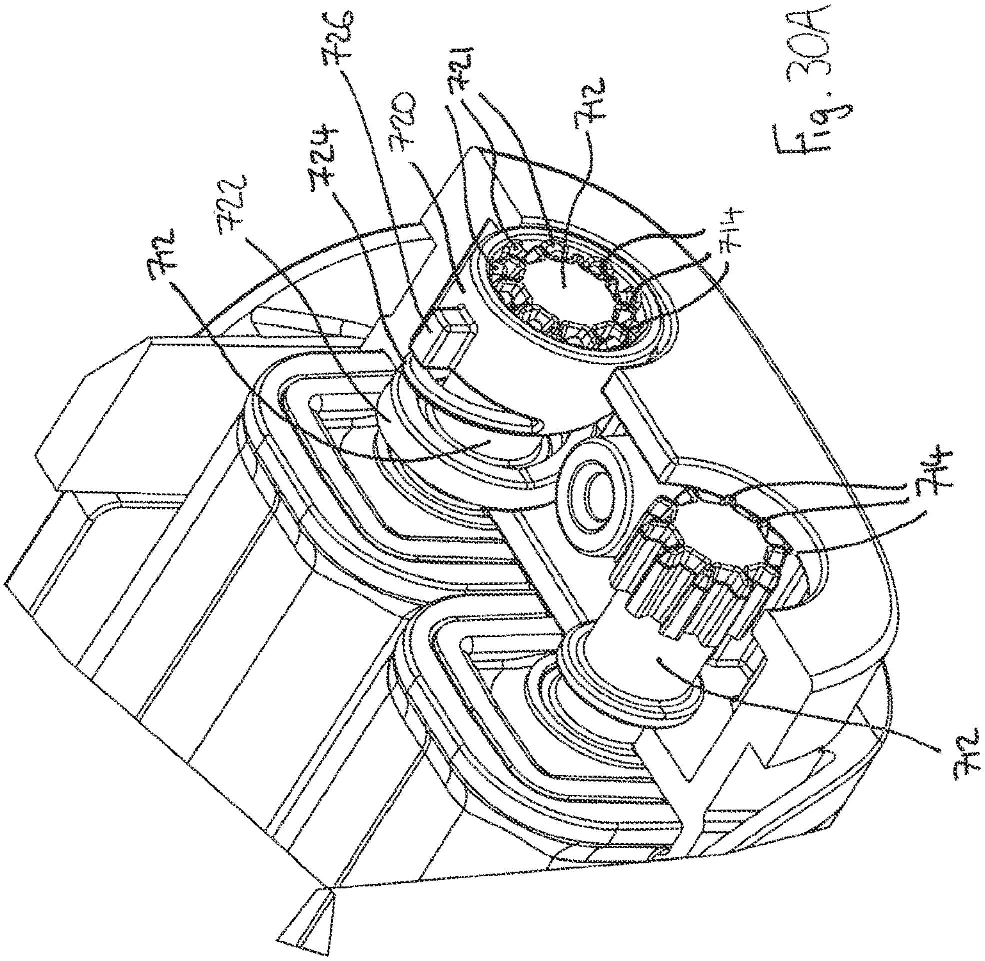
FIGS. 30 and 30A shows an embodiment similar to that discussed above in respect of FIGS. 9 to 11, but with a slightly different mechanism for operating the dispensing mechanisms of the cartridge.
Figure 30:
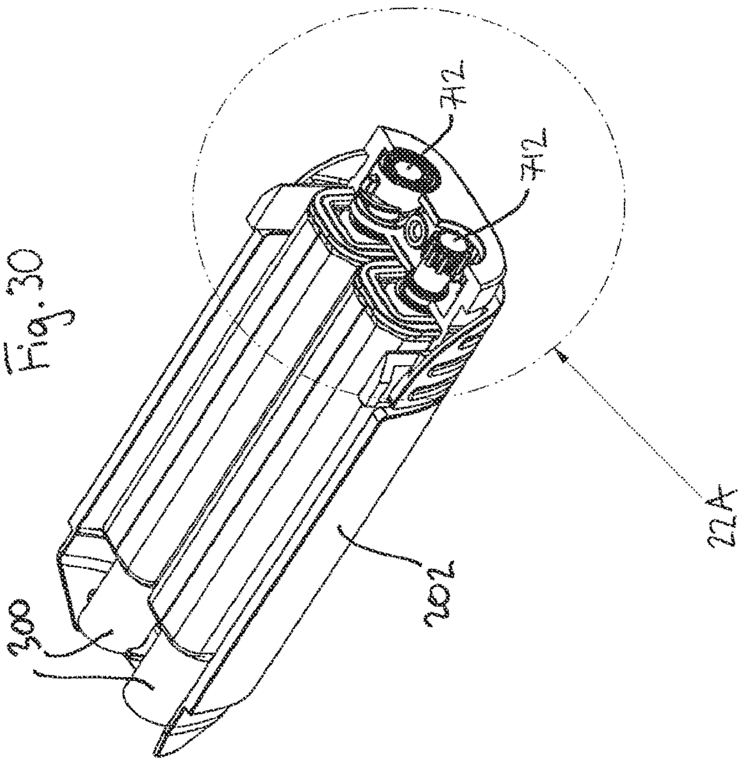

FIGS. 30 and 30A shows an embodiment similar to that discussed above in respect of FIGS. 9 to 11, but with a slightly different mechanism for operating the dispensing mechanisms of the cartridge 202. That is, instead of male and female connection elements 180, 280, the cartridge assembly 200 and control unit 100 interconnect through a splined connection.

As discussed above the cartridge assembly 200 and control unit 100 are configured to engage one another to allow the control unit 100 to operate the cartridge mechanism so as to dispense drugs contained within the cartridge 202. This engagement may be initiated by inserting the cartridge assembly 200 into the first portion 110 of the control unit 100 (see FIG. 2) such that cartridge 202 engages the control unit 100, for example using cooperating rails 245, 116 as described above and allow the cartridge assembly 202 to slide along the planar section 112 towards the interface 130 of the control unit 100.

In the embodiment of FIGS. 30 and 30A the interface 130 of the control unit 100 comprises driving elements (not shown) that are configured to drive (e.g., rotate) cooperating receiving elements 712 that are each connected to a respective dispensing mechanism 300 of the cartridge 202.

FIG. 30A shows the receiving elements 712 in more detail, wherein the driving elements (not shown) may comprise spline teeth configured to engage cooperating spline teeth 714 located on the receiving elements 712. As such, rotation of the driving elements causes a corresponding rotation of the receiving elements 712, and ultimately actuation of a respective dispensing mechanism 300. As such, upon rotation of the driving elements one or more drugs, e.g., in pellet form, are dispensed from the cartridge 202. This can provide a somewhat simpler alternative to the male and female connection elements 180, 280 described above.

FIGS. 30 and 30A also indicate an alternative type of locking arrangement to that described above in respect of the embodiment of FIGS. 8 to 11 and the locking plates 290.

That is, a locking member may be made up of a first ring 720, a second ring 722 and one or more connecting elements 724. The locking member, including the first ring 720, second ring 722 and connecting elements 724, is fixed against rotation, for example using a tab 726 that engages a non-rotating portion of the apparatus 10.

The locking member may surround each receiving element 712 and may be configured to lock the spline teeth 714 of the receiving elements 712 against rotation when the cartridge 202 is not engaged with the control unit 100. Upon engagement of the cartridge 202 with the control unit 100, part of each locking member is configured to move (as discussed in more detail below) so as to permit rotation of the receiving elements 712 and allow actuation of the respective dispensing mechanism 300.

Figure 31A:
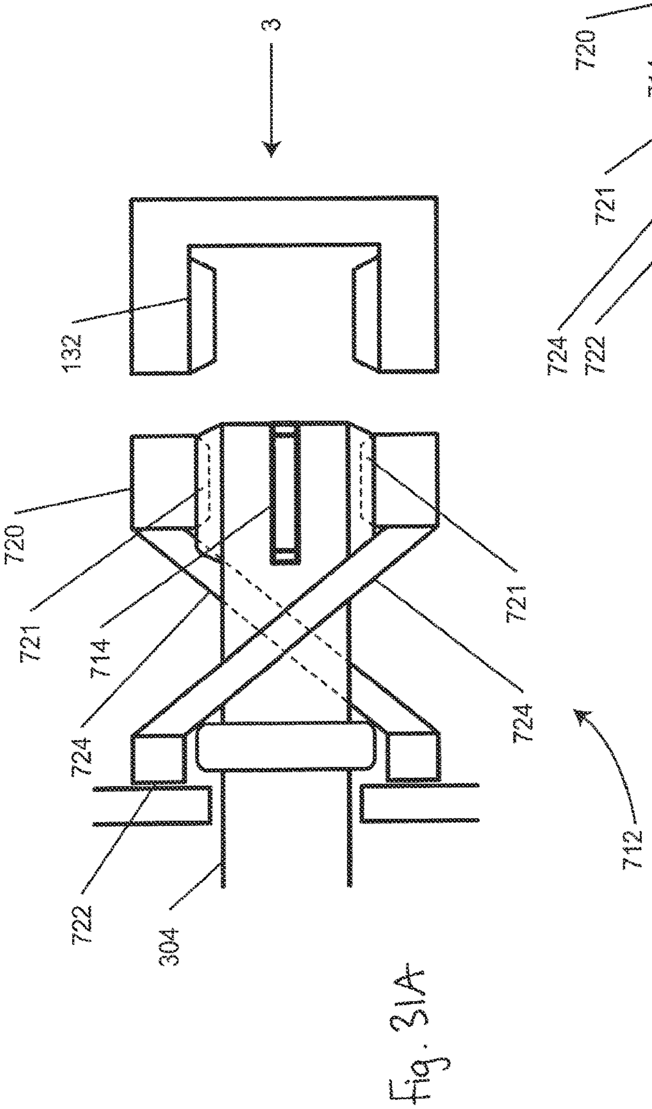
FIGS. 31A and 31B shows the mechanism of FIGS. 30 and 30A in more detail.
Figure 31B:
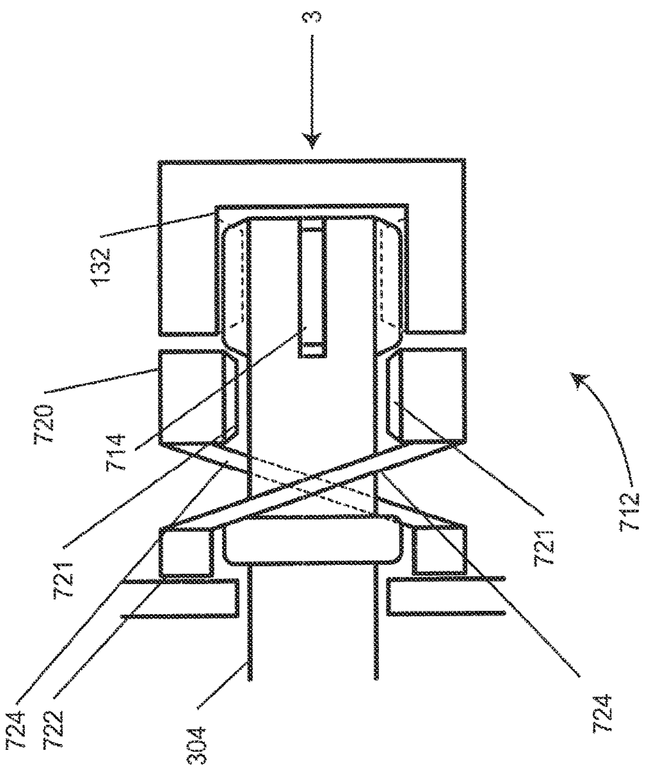

FIGS. 31A and 31B shows this mechanism in more detail. The receiving element 712 is shown as forming an end part of a shaft 304 of a dispensing mechanism 300 as described above. As such, rotation of the receiving element 712 causes rotation of the shaft 304 and, in turn, actuation of the dispensing mechanism 300 associated with the shaft 304. The first ring 720 of the locking member initially surrounds the receiving element 712, and specifically radially extending surfaces of the receiving element, wherein the first ring 720 comprises teeth 721 configured to selectively engage with the radially extending surfaces of the receiving element 712.

In this embodiment the radially extending surfaces are conveniently the radially extending surfaces of the spline teeth 714 of the receiving element 712. This has been found to simplify the number of parts required to provide the locking feature of the rotating elements (i.e., shafts 304) of the dispensing mechanisms 300 of the cartridge 202.

A second ring 722 of the locking member is connected to the first ring 720, and the first ring 720 is connected to the second ring 722 via one or more resilient connecting elements 724, which are configured to deform in the directed of arrow 3 upon application of a pressure be applied to the first ring 720 in the same direction.

The first ring 720 is slidably received on the outer surface of the shaft 304, such that the first ring 720 can slide between a first position as shown in FIG. 23A, and a second position as shown in FIG. 23B.

In the first position the teeth 721 of the first ring 720 engage with the spline teeth 714 of the receiving element 712, so as to prevent rotation of the shaft 304. In the second position the first ring 720 has moved along the axis of the shaft 304 in the direction of arrow 3, so that the teeth 721 of the first ring 720 are now disengaged from the spline teeth 714 of the receiving element 712, so as to permit rotation of the shaft 304.

The resilient connecting elements 724 permit the sliding movement of the first ring 720. The sliding movement itself may be caused by engagement of the first ring 720 with one or more elements 132 of the interface 130 on the control unit 100. These elements 132 could take the form of pins, for example similar to the pins 184 shown in FIG. 10A. The resilient connecting elements 724 may bias the first ring 720 in a direction opposite to that of the arrow 3, such that they bias the first ring 720 against the elements 132 of the interface 130 on the control unit 100.

Figure 32B:
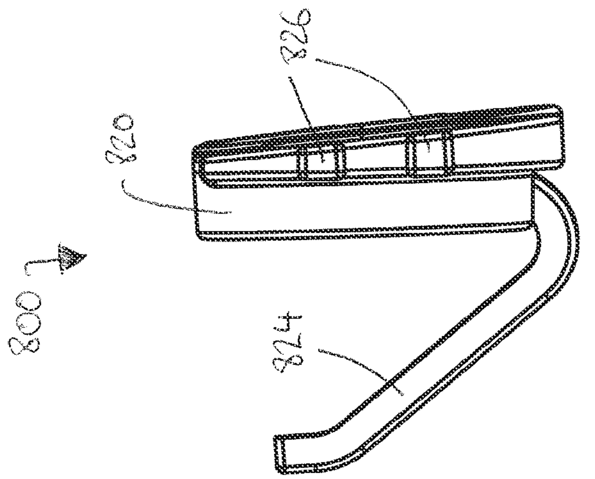
FIG. 32B shows a side view of the locking member of FIG. 32A.
Figure 32A:
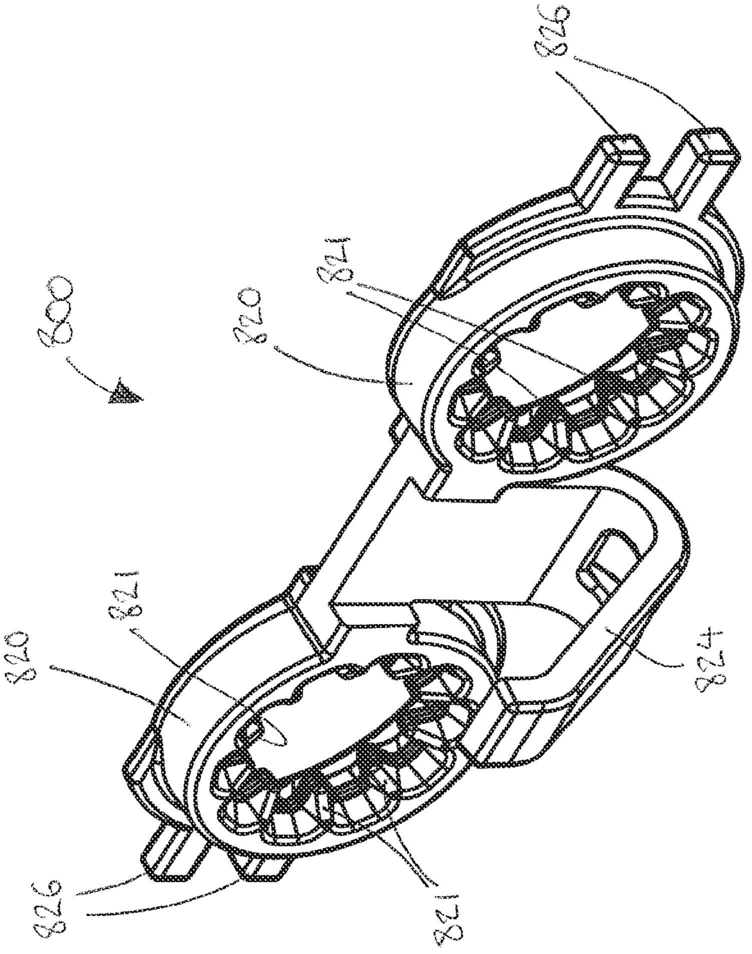
FIG. 32A shows a perspective view of an alternative locking member to that shown in respect of FIGS. 30 and 30A.

FIGS. 32A and 32B shows a slight modification to the locking members that are shown in FIGS. 30 to 31, in which a single locking member 800 is provided that is configured to prevent actuation of multiple dispensing mechanisms in a first position and permit actuation of the dispensing mechanisms in a second, different position.

The combined locking member 800 is for simultaneous locking of the two receiving elements 712 shown in FIG. 30. The locking member 800 may be made up of two rings 820 with locking teeth 821 and a single resilient element (e.g., spring) 824.

The locking member 800 (and specifically the rings 820 thereof) may surround each receiving element 712 and may be configured to lock the spline teeth 714 of the receiving elements 712 against rotation when the cartridge 202 is not engaged with the control unit 100. Upon engagement of the cartridge 202 with the control unit 100, part of the locking member is configured to move (as discussed in more detail below) so as to permit rotation of the receiving elements 712 and allow actuation of the respective dispensing mechanism 300.

The rings 820 of the locking member initially surround a respective receiving element 712, and specifically radially extending surfaces (e.g., of the spline teeth 714) of the receiving elements, wherein each ring 820 comprises teeth 821 configured to selectively engage with the radially extending surfaces of the receiving elements 712.

The locking member 800 comprises a single resilient member (e.g., spring) 824 of the locking member, which is connected to both rings 820 and configured to deform upon application of a pressure applied to the first ring 820. The resilient member 824 may be configured to become biased against a portion of the control unit 100 as the locking member 800 moves between its first and second position.

The rings 820 are slidably received on the outer surface of the shafts 304, such that the rings 820 can slide between a first position and a second position, in a similar manner to the rings 720 of FIGS. 30A, 31A and 31B (i.e., in the direction of arrow 3).

In the first position the teeth 821 of the rings 820 engage with the spline teeth 714 of the receiving elements 712, so as to prevent rotation of the shafts 304. In the second position the rings 820 have moved along the axes of the shafts 304 (e.g., in the direction of arrow 3), so that the teeth 821 of the rings 820 are now disengaged from the spline teeth 714 of the receiving elements 712, so as to permit rotation of the shafts 304.

The resilient member 724 permits the sliding movement of the rings 820. The sliding movement itself may be caused by engagement of the rings 820 with one or more elements 132 of the interface 130 on the control unit 100. These elements 132 could take the form of pins, for example similar to the pins 184 shown in FIG. 10A. The resilient member 824 may bias the rings 820 in a direction opposite to that of the arrow 3, such that they bias the rings 820 against the elements 132 of the interface 130 on the control unit 100.

As such, the combined locking member 820 comprises lock rings 820 that beneficially have a common resilient member. The rings 820 may be pushed back by the control unit 100 during docking of a cartridge 200 to the control unit 100, in a similar manner to the rings 720 of the previous embodiment. When undocking the cartridge 200 from the control unit 100, the combined locking member 820 may spring back and reengages the lock to prevent actuation of the dispensing mechanism(s).

As with the locking members 720 described earlier, the locking member 800, including the rings 820 are fixed against rotation, for example using one or more tabs 826 that engage a non-rotating portion of the apparatus 10.

Generally, the devices disclosed herein may be aimed at providing an accurate dose of medication by weight, and also providing a simple mechanism by which to adjust a dosage and/or titrate a medication during use. Various mechanical features are provided for ease of dispensing a dosage, including swallowing a dose and providing general convenience when doing this. Various embodiments are aimed at monitoring compliance as well.

The handheld apparatus 10 may combine medical knowledge with digital capabilities. The control unit 100 may be reusable, and may be combined with various different cartridge assemblies 200 that are prefilled with a prescribed medication. For ADHD, for example, a cartridge assembly 200 could be prefilled with the relevant medication for use over a one-month period. The cartridges 202 could be filled with pellets or granules (i.e., the oral dosage form) of less than 1000 nm in size (each). The granules could be taken with liquid or soft foods supporting swallowing of the medicine. The digitization of the control unit 100 can enable accurate dose setting and titration. Although the apparatus have a particular use with ADHD, the technology disclosed herein is applicable to many other treatments and especially for pediatric use or for use in psychiatry, neurology, cardiometabolic disorders or oral cancer treatments.

Example treatments that may be associated with the apparatus described herein are Attention Deficit Hyperactivity Disorder ("ADHD"—wherein the medication used in the apparatus could include amphetamines and/or methylphenidate), general pain (wherein the medication could include one or more of fentanyl, methadone, meperidine, tramadol, morphine, codeine, thebaine, oxymorphone, hydrocodone, oxycodone, hydromorphone, naltrexone, buprenorphine and methadone), immunosuppression post organ transplant (wherein the medication could include one or more of tacrolimus, sirolimus, everolimus, corticosteroids, cyclosporine, mycophenolate and azathioprine), diabetes (wherein the medication could include one or more of sitagliptin, vildagliptin, saxagliptin, linagliptin, metformin, canagliflozin, Dapagliflozin, empagliflozin and semaglutide), heart failure (wherein the medication could include one or more of carvedilol, metoprolol, bisoprolol and diurethics), Parkinson's disease ("PD"—wherein the medication could include levodopa and/or carbidopa), epilepsy (wherein the medication could include one or more of sodium valproate. carbamazepine, lamotrigine, levetiracetam, oxcarbazepine, ethosuximide and topiramate), depression (wherein the medication could include one or more of Citalopram, bupropion, paroxetine, milnacipran, fluoxetine, duloxetine, fluvoxamine and reboxetine), schizophrenia (wherein the medication could include one or more of aripiprazole, asenapine, brexpiprazole, cariprazine, clozapine, iloperidone, lurasidone and olanzapine), cancer, animal health. For example, the apparatus 10 may be combined with medication (e.g., in pellet form) that is aimed or associated with the aforementioned treatments, for example any or all of those described above.

Various embodiments disclosed herein are aimed at improving how a user is prompted to dispense the medication from the apparatus 10 to either a receptacle, liquid or soft foods or into their mouth. For example, as described above in relation to FIG. 16, a cap 600 may be constructed so that it prompts a user to remove the cap 600 in a predetermined direction.

The apparatus 10 disclosed herein may provide simpler dose setting and accurate dose titration, especially for children. Use of a medication formulated as small pellets or granules can support accurate dose adjustment and help pediatrics with swallowing issues. Developments for pediatric medicines have generally included different formulations or devices which go toward solving one or two of the challenges faced with this patient population. By combining the medication with a digital capability with the handheld apparatus 10 disclosed herein, leads to improvements in dose setting, titration, ease of use, swallow-ability and compliance. The technology can be tailored to different treatment regimens for pediatric populations including combination therapy. Other areas for treatment using the apparatus 10 disclosed herein could be epilepsy and general pain alleviation. The dispensing technology could also be developed for infectious diseases, for example in children, for example the medication used with the apparatus (e.g., in pellet form) could include amoxicillin and/or penicillin.

The control unit 100 (in any of the aspects or embodiments described herein) may include an input device or user interface 102, which may include one or more buttons for operating the apparatus 10, for example the dispensing mechanisms 300 therein. The control unit 100 may incorporate means to ensure that only the correct or a specific user, or type of user can handle and/or operate the device. For example, the control unit 100 may incorporate a fingerprint sensor configured to detect a fingerprint of a user, or a pin code technology.

The control unit 100 may comprise a control system configured to operate the various electrical and mechanical parts of the apparatus 10, for example the user interface 102, display 104 and dispensing mechanisms 300.

The control system may be configured to improve the approach to dosing oral medicines, enabled by the various features of the apparatus 10 described herein. The digitalization of medication using techniques described herein may have several advantages compared to providing, e.g., conventional pills in a bottle. A prefilled cartridge 202 (e.g., for ADHD, with a one-month prescription) may have an integrated circuit board trip that communicates relevant information to the control unit. The control unit 100, and specifically the control system thereof, may set the dosage, prevent taking more than a maximum dosage, allow titration, and ensure notification of tampering. The control system may record dispensing of medication, for example over a defined period (e.g., the one month prescription).

The control system could be configured to provide dosage reminders, and also a log of the previous dose taken, for example on the display 104 of the control unit 100. It is envisaged that further personalization could be achieved through provision of a wireless connection to external devices, such as a smart phone, smart watch or other smart device, sensors or wearables. The wireless connection could be using Bluetooth or any other suitable wireless platform. The control system could combine with an application on a smart phone, smart watch or other smart device, or could be implemented at least partially on such devices.

The control system could be configured to receive symptom reports from a user and log these in connection with the medication being provided. For example, with ADHD the symptoms could include concentration, hyperactivity, behavior, work productivity, etc., which could support a treatment program and other outcomes.

The control system may be combined with, or at least partially implemented on an application for a caregiver. For example, the control system may be configured to send reports to such an application, e.g., wirelessly and/or through the Internet. The report could include compliance data, e.g., has the user been taking dosages in line with a treatment program. The report could include data or information regarding the dose taken, and the time that the dose was dispensed, as well as the symptoms described above.

The methods, method steps, or functional features disclosed herein, for example in connection with the control system of the control unit 100 described above, may be implemented at least partially using software, e.g., computer programs. These may be located on a data processor on the control unit 100 itself. It will thus be seen that when viewed from further aspects the present invention provides computer software specifically adapted to carry out the methods, method steps, or functional features herein described when installed on data processing means, a computer program element comprising computer software code portions for performing the methods, method steps, or functional features herein described when the program element is run on data processing means, and a computer program comprising code means adapted to perform all the steps of a methods, method steps, or functional features herein described when the program is run on a data processing system. The data processor may be a microprocessor system, a programmable FPGA (field programmable gate array), etc.

This could e.g. be a fingerprint sensor or a code pattern on the display that is needed to activate the device (e.g. up, up, down, right, up, left on the D-pad) so that parents and caregivers can use the device without the need for the specific fingerprint (also lower cost without the fingerprint sensor).

Although the present invention has been described with reference to preferred embodiments, it will be understood by those skilled in the art that various changes in form and detail may be made without departing from the scope of the invention as set forth in the accompanying claims.

What is claimed is:

1. An apparatus for dispensing one or more drugs, comprising:

a cartridge assembly configured to store drugs, and dispense the drugs from one or more storage cavities within the cartridge assembly upon actuation of one or more dispensing mechanisms located within the cartridge assembly; and a control unit comprising one or more actuators configured to actuate the one or more dispensing mechanisms located within the cartridge assembly, each of the one or more actuators comprising a connection element;

wherein:

the one or more dispensing mechanisms each comprise one or more rotatable elements, and rotation of the one or more rotatable elements causes drugs to be dispensed from a respective one of the storage cavities within the cartridge assembly, each of the one or more rotatable elements comprising a connection element;

each of the one or more connection elements of the one or more rotatable elements is configured to cooperate with a connection element of the one or more connection elements of the one or more actuators, such that rotation of the one or more connection elements of the one or more actuators causes rotation of the one or more connection elements of the one or more rotatable elements to rotate the one or more rotatable elements of the dispensing mechanisms on the cartridge assembly; and the mating end of the cartridge assembly comprises one or more cavities, and each of the one or more connection elements of the one or more rotatable elements is held within a cavity of the one or more cavities.

2. The apparatus of claim 1, wherein each of the one or more connection elements of the one or more actuators is a female connection element, and each of the connection elements of the one or more rotatable elements is a male connection element.

3. The apparatus of claim 2, wherein each of the one or more cavities is a circular cavity.

4. The apparatus of claim 3, wherein each female connection element is surrounded by a cylindrical cover that fits into and engages a respective circular cavity of the one or more cavities.

5. The apparatus of claim 1, wherein each connection element of the one or more rotatable elements comprises radially extending teeth configured to cooperate with corresponding features of the connection element one or more connection elements of the one or more actuators.

6. The apparatus of claim 1, wherein the one or more connection elements of the one or more rotatable elements comprise splined teeth and the one or more connection elements of the one or more actuators comprise corresponding splined teeth such that the one or more connection elements of the one or more rotatable elements are configured to cooperate with the one or more connection elements of the one or more actuators through a splined connection.

7. The apparatus of claim 1, wherein each of the one or more connection elements of the one or more rotatable elements is held entirely within a respective cavity of the one or more cavities.

8. The apparatus of claim 1, wherein the cartridge assembly is configured to dock and undock with the control unit, and such that when the cartridge assembly is docked with the control unit each of the connection elements of the one or more rotatable elements is engaged with a said connection element of the one or more connection elements of the one or more actuators.

9. The apparatus of claim 1, wherein the apparatus is configured for dispensing one or more drugs in pellet form.

10. The apparatus of claim 9, wherein the one or more rotatable elements comprise a screw pump at a dispensing end of the cartridge assembly, and rotation of the one or more rotatable elements causes rotation of a screw of the screw pump in order to dispense the one or more drugs from the cartridge assembly.

11. The apparatus of claim 1 wherein the apparatus forms a hand-held device.

12. An apparatus for dispensing one or more drugs, comprising:

a cartridge assembly configured to store drugs, and dispense the drugs from one or more storage cavities within the cartridge assembly upon actuation of one or more dispensing mechanisms located within the cartridge assembly; and a control unit comprising one or more actuators configured to actuate the one or more dispensing mechanisms located within the cartridge assembly, each of the one or more actuators comprising a connection element, wherein:

the one or more dispensing mechanisms each comprise one or more rotatable elements, and rotation of the one or more rotatable elements causes drugs to be dispensed from a respective one of the storage cavities within the cartridge assembly, each of the one or more rotatable elements comprising a connection element; and each of the one or more connection elements of the one or more rotatable elements is configured to cooperate with said connection element of the one or more connection elements of the one or more actuators, such that rotation of the one or more connection elements of the one or more actuators causes rotation of the one or more connection elements of the one or more rotatable elements to rotate the one or more rotatable elements of the dispensing mechanisms on the cartridge assembly.

13. The apparatus of claim 12, wherein each of the one or more connection elements of the one or more actuators is a female connection element, and each of the one or more connection elements of the one or more rotatable elements is a male connection element.

14. The apparatus of claim 12, wherein each of the one or more connection elements of the one or more actuators is a male connection element, and each of the one or more connection elements of the one or more rotatable elements is a female connection element.

15. The apparatus of claim 12, wherein each connection element of the one or more connection elements of the one or more rotatable elements comprises radially extending teeth configured to cooperate with corresponding features of a connection element of the one or more connection elements of the one or more actuators.

16. The apparatus of claim 12, wherein the one or more connection elements of the one or more rotatable elements comprise splined teeth and the one or more rotatable connection elements of the one or more actuators comprise corresponding splined teeth such that the one or more connection elements of the one or more rotatable elements are configured to cooperate with the one or more connection elements of the one or more actuators through a splined connection.

17. The apparatus of claim 12, wherein the cartridge assembly is configured to dock and undock with the control unit, and such that when the cartridge assembly is docked with the control unit, each of the one or more connection elements of the one or more rotatable elements is engaged with a connection element of the one or more connection elements of the one or more actuators.

18. The apparatus of claim 12, wherein the apparatus is configured for dispensing one or more drugs in pellet form.

19. The apparatus of claim 18, wherein the one or more rotatable elements comprise a screw pump at a dispensing end of the cartridge assembly, and rotation of the one or more rotatable elements causes rotation of a screw of the screw pump in order to dispense the one or more drugs from the cartridge assembly.

20. The apparatus of claim 12, wherein the apparatus forms a hand-held device.

21. An apparatus for dispensing one or more drugs in pellet form, comprising:

a cartridge assembly configured to store drugs in pellet form, and dispense the drugs upon actuation of one or more dispensing mechanisms located within the cartridge assembly;

a control unit configured to actuate the one or more dispensing mechanisms located within the cartridge assembly; and a cap comprising a collection region configured to receive and store drugs dispensed from the one or more dispensing mechanisms;

wherein the cap is movable between a first position in which the collection region of the cap forms an enclosed cavity, and a second position in which the collection region is exposed such that a user can access drugs contained therein; and wherein the cap is completely detachable from the rest of the apparatus, so that the cap is completely detached in the second position.

22. The apparatus of claim 21, wherein the collection region of the cap takes the form of an open, generally U-shaped trough, and comprises one or more pouring lips in an upper rim thereof configured to pour the drugs in pellet form from the collection region when the cap occupies its second position.

23. The apparatus of claim 21, wherein when in the second position the cap does not contact any part of the remainder of the apparatus.

24. The apparatus of claim 21, wherein when the cap is configured to be attached and detached relative to the rest of the apparatus via a snap-fit.

25. The apparatus of claim 21, wherein when the cap is configured to contain the one or more drugs within the collection region when the cap is in the second detached position.

26. An apparatus for dispensing one or more drugs in pellet form, comprising:

a cartridge assembly configured to store drugs in pellet form, and dispense the drugs upon actuation of one or more dispensing mechanisms located within the cartridge assembly;

a control unit configured to actuate the one or more dispensing mechanisms located within the cartridge assembly;

a cap comprising a collection region configured to receive and store drugs dispensed from the one or more dispensing mechanisms; and a funnel configured to receive drugs dispensed from the one or more dispensing mechanisms, the funnel having an outlet end configured to direct the drugs to the collection region, wherein the outlet end is positioned at least partially within the collection region and/or the outlet end is offset or otherwise positioned so that pellets are directed into a specific portion of the collection region;

wherein the cap is movable between a first position in which the collection region of the cap forms an enclosed cavity, and a second position in which the collection region is exposed such that a user can access drugs contained therein; and wherein the cap is detachable from the rest of the apparatus, so that the cap is detached in the second position.

* * * * *